(12) United States Patent
Nogami et al.

(10) Patent No.: US 7,596,457 B2
(45) Date of Patent: Sep. 29, 2009

(54) ELECTRICALLY OPERATED VALVE DIAGNOSING METHOD AND DIAGNOSING APPARATUS

(75) Inventors: Takeki Nogami, Takamatsu (JP); Shigeya Yamaguchi, Takamatsu (JP)

(73) Assignee: Shikoku Research Institute, Kagawa (JP)

( * ) Notice: Subject to any disclaimer, the term of this patent is extended or adjusted under 35 U.S.C. 154(b) by 164 days.

(21) Appl. No.: 11/660,899

(22) PCT Filed: Aug. 23, 2005

(86) PCT No.: PCT/JP2005/015609

§ 371 (c)(1),
(2), (4) Date: Apr. 10, 2007

(87) PCT Pub. No.: WO2006/022408

PCT Pub. Date: Mar. 2, 2006

(65) Prior Publication Data

US 2007/0246669 A1    Oct. 25, 2007

(30) Foreign Application Priority Data

Aug. 24, 2004 (JP) ............................. 2004-243150
Mar. 14, 2005 (WO) ................. PCT/JP2005/005038

(51) Int. Cl.
*G06F 19/00* (2006.01)
*G01L 5/00* (2006.01)

(52) U.S. Cl. .......................................... 702/34; 702/41

(58) Field of Classification Search ................... 702/34, 702/41, 42, 183
See application file for complete search history.

(56) References Cited

U.S. PATENT DOCUMENTS 4,879,901 A * 11/1989 Leon ........................... 73/168
5,743,133 A *  4/1998 Watanabe ..................... 73/168

FOREIGN PATENT DOCUMENTS

| JP | 07-310845 A | 11/1995 |
|---|---|---|
| JP | 2982090 | 9/1999 |
| WO | WO-95/14186 | 5/1995 |

* cited by examiner

*Primary Examiner*—Bryan Bui
(74) *Attorney, Agent, or Firm*—Birch, Stewart, Kolasch & Birch, LLP

(57) ABSTRACT

The invention diagnoses an electrically operated valve, which is provided with a spring cartridge expanding and contracting in response to a reaction force acting on an axial direction of a worm in a valve element driving section, at both the opening and closing operations of the valve. A correlation between a driving force output signal from the valve element driving section and a driving force from a compression state of the spring cartridge is provided in a database. Then, a correlation between a driving force input signal to the valve element driving section and the driving force output signal is acquired in order to monitor a change in transmission efficiency of the driving force. Then, a driving force corresponding to a measured yoke stress is read out from the database for use in diagnosing the driving force of the electrically operated valve is diagnosed.

16 Claims, 43 Drawing Sheets

ELECTRICALLY OPERATED VALVE DIAGNOSING METHOD AND DIAGNOSING APPARATUS

TECHNICAL FIELD

The invention of the present application relates to a diagnosing method for diagnosing a driving force of an electrically operated valve and to a diagnosing apparatus suitable for implementing this diagnosing method.

BACKGROUND ART

Electrically operated valves are constructed such that a valve element is opened and closed by a motor driving force. Their major features include that a large valve element driving force is acquired and that the open and close operations can be performed by remote control. Because of these features, electrically operated valves are used widely, for example, in a large plant where large diameter piping is equipped or in the piping of a nuclear power station where operation by hand is restricted. Their major application is a valve for full open/full close of a passage in piping rather than a valve for flow rate adjustment.

Such an electrically operated valve comprises: a valve element for opening and closing a passage in piping; a valve element driving section for performing the open and close operation of the valve element in response to a revolving force of a worm revolved by a motor; and a spring cartridge into which a dish spring expanded and contracted in response to a thrust generated in the worm in the valve element driving section is installed in a state of being compressed by a prescribed compression force (this compression force is referred to as a "compressed load"). Then, the driving force obtained from the compression state of the spring cartridge, that is, a torque of the electrically operated valve, is imparted to the valve element driving section, so that the open and close operation of the valve element is performed. Then, when the compression amount of the spring cartridge reaches a restriction value, the motor is stopped. By virtue of this, an appropriate open and close holding force is achieved in the valve so that a valve function of high reliability is ensured, while an excessive driving force is avoided so that damage is prevented.

On the other hand, in the electrically operated valve, in order that its function should be maintained over a long term, soundness need be checked in the function of the electrically operated valve itself. In addition, soundness need be checked in the valve element driving section and the like (including the electric part) for transmitting the revolving force of the worm to the valve element side. The points of interest in this diagnosis include whether the valve element is driven with an appropriate torque, whether an appropriate holding torque is ensured in the full open and full close states of the valve element, whether setting is appropriate in the torque switch for stopping the motor automatically when a necessary torque has been imparted, and to what extent wear has progressed in the valve element driving section and the like. Among these diagnosis items, the diagnosis on the torque [which is a physical quantity having a fixed relation with the compression force of the spring cartridge, that is, a torque obtained from the compression force of the spring cartridge; the value is acquired in accordance with (torque)=(spring cartridge compression force)×r (where r denotes ½ of the pitch circle diameter of the worm wheel; see FIGS. 1 and 2] is expected to be most important because of the past examples where a large number of troubles are attributed to inappropriateness of the torque. Thus, in the prior art, various kinds of electrically operated valve diagnosing methods have been proposed concerning the torque.

For example, as described in Patent Document 1, a strain gauge is stuck on a part of a spring cartridge, so that the compression force of the spring cartridge, that is, the value of a torque corresponding to this, is acquired by the strain gauge in an operating state of the electrically operated valve. Then, on the basis of this acquired torque, diagnosis is performed on the torque. This approach is a so-called "built-in torque sensor method".

Further, a technique has been proposed in which in the diagnosis work, detecting means for the torque is attached to the outer end side of the spring cartridge so that on the basis of the acquired torque, the electrically operated valve is diagnosed concerning the torque (see Patent Documents 2 and 3).

The approach disclosed in Patent Document 2 is a so-called "externally attached torque sensor method". In this method, compression force detecting means for detecting the compression force acting on the spring cartridge and movement amount detecting means for detecting the compression amount of the spring cartridge, that is, the movement amount of the worm are attached to the outer end side of the spring cartridge. Then, in a state that the electrically operated valve is operated, correlation is acquired between the compression amount of the spring cartridge and the compression force corresponding to this which have been detected by these compression force detecting means and movement amount detecting means. After that, the compression amount is measured so that the actually acting compression force is acquired from this measured value with reference to the correlation. Further, on the basis of this compression force, the torque actually acting from the worm to the valve element driving section is acquired. Then, on the basis of this torque, diagnosis is performed on the torque of the electrically operated valve.

In this method, because of the structure of the compression force detecting means, the compression force can be detected only at any one of open operation and close operation of the electrically operated valve. However, regardless of whether the operation direction of the electrically operated valve is in the open operation direction or the close operation direction, the same situation occurs and no difference arises in the point that the spring cartridge is compressed. Thus, when the compression amount of the spring cartridge is merely measured at both of open operation and close operation, the compression force on the other side is also obtained. That is, in a case that the compression amount and the value obtained by converting this compression amount into the torque are acquired as data, when the compression amount is measured, the corresponding torque is obtained at each of open operation and close operation of the electrically operated valve.

On the other hand, what is disclosed in Patent Document 3 is a so-called "spring compression method". In this method, a strain gauge, position detecting means, and compressing means are attached on the outer end side of the spring cartridge (i.e., an end of the spring cartridge opposite to the worm). Then, in a state that the operation of the electrically operated valve is stopped, the dish spring of the spring cartridge is compressed from the outside by the compressing means. In this state, the compression force on the spring cartridge is acquired by the strain gauge, while the compression amount of the spring cartridge is acquired by the position detecting means, so that relation is acquired between the compression amount of the spring cartridge and the compression force corresponding to this. Next, in a state that the electrically operated valve is operated, the compression amount is measured so that the actually acting compression force is acquired from this measured value. Further, on the basis of this compression force, the torque actually acting from the worm to the valve element driving section is acquired. Then, on the basis of this torque, diagnosis is performed on the torque of the electrically operated valve.

(Patent Document 1)

International Laid-Open Patent Application No. WO95/14186 (line 19 in lower right column at page 3 through line 29 in upper right column at page 4, and FIGS. 2 and 3)

(Patent Document 2)

Japanese Patent Publication No. 2982090 (Paragraphs [0021]-[0031] and FIGS. 1-4)

(Patent Document 3)

Japanese Laid-Open Patent Application No. H7-310845 (Paragraphs [0028]-[0036] and FIG. 2)

SUMMARY OF THE INVENTION

Problems to be Solved by the Invention

Nevertheless, in the "built-in torque sensor method", the strain gauge is integrated with the spring cartridge. This has caused problems that: the structure itself becomes complicated and hence results in a high cost; in assembling of the spring cartridge equipped with the strain gauge, since modification need be performed in a state that a part of the electrically operated valve is opened, a technique requiring expertise is necessary; sealing management is necessary in a movable packing section of a strain gauge signal extracting section; and in calibration of the strain gauge, since the calibration need be performed in a state that the strain gauge is extracted from the electrically operated valve in a manner integrated with the spring cartridge, the calibration work for the strain gauge becomes complicated.

On the other hand, in the "externally attached torque sensor method", a large device need be attached to the electrically operated valve. This degrades workability. Further, a part of the electrically operated valve need be opened. Thus, time suitable for diagnosis work is restricted. Further, since such attachment work is performed at each time of torque diagnosis, a problem of increase has been caused in the amount of work and hence in the diagnosis cost.

Further, in the "spring compression method", a load meter, position detecting means, compressing means, and the like are installed temporarily for the electrically operated valve. In this case, predetermined modification need be performed on each electrically operated valve in order that a load meter and the like may be attached. Further, the load meter and the like cannot be attached permanently, and hence need be installed at each time of diagnosis. Thus, this installation takes time and effort. Furthermore, the load meter and the like are difficult to be shared among electrically operated valves, and hence need be fabricated individually for each electrically operated valve. These have caused a problem of increase in the diagnosis work.

Each of the "built-in torque sensor method", the "externally attached torque sensor method", and the "spring compression method" described above is a technique in which the torque is acquired from the compression force of the spring cartridge, and then on the basis of this torque, the electrically operated valve is diagnosed concerning the torque.

Meanwhile, in the actual operation of the electrically operated valve, the driving force outputted from the driving source such as a motor is transmitted to the valve rod via a valve element driving section constructed from a worm, a worm wheel, a drive sleeve, and a stem nut. Thus, when a frictional force arises in the valve element driving section, the driving force inputted to the valve element driving section disagrees with the force transmitted from the valve element driving section to the valve rod, so that a difference arises between these forces. For example, when run out of oil occurs in a stem nut part so that a frictional force arises, the transmission efficiency of the driving force (i.e., the ratio between the input of the valve element driving section and the output from the valve element driving section) is reduced in the valve element driving section. Thus, even when a driving force of a predetermined magnitude is inputted, the force actually acting on the valve rod becomes smaller than in a case that the oil is not run out. Thus, since the subject matter to be diagnosed in the function of the electrically operated valve is "diagnosis on the driving force, i.e., the torque", it is insufficient that diagnosis on the driving force or the torque of the electrically operated valve is performed simply by reading out a torque corresponding to the yoke stress acquired by measurement on the assumption that the correlation between torque and the yoke stress is constant, that is, the transmission efficiency of the driving force is constant. Accordingly, influence of change by aging in the transmission efficiency of the driving force in the valve element driving section and the like need be taken into consideration.

Thus, an object of the invention of the present application is to provide a diagnosing method for an electrically operated valve where on the basis of correlation between a torque and a yoke stress, a torque corresponding to a yoke stress acquired by measurement is read out so that the driving force of an electrically operated valve is diagnosed, wherein the state of change in the transmission efficiency of the driving force is reflected into calculation of the driving force so that precise and reliable diagnosis is achieved, and wherein this diagnosis can be performed by simple operation with good workability even during the operation of the electrically operated valve, as well as with precision and at a low cost. A diagnosing apparatus suitable for implementing this diagnosing method is also provided.

Means for Solving the Problem

As specific means for solving the problems, the following aspects are adopted in the invention of the present application.

A first aspect is characterized by an electrically operated valve diagnosing method for diagnosing a driving force of an electrically operated valve provided with a valve element driving section for driving open and close of a valve element by using a revolving drive force of a worm to which a revolving drive force is imparted by an electromotive power and with a spring cartridge expanded and contracted in response to a reaction force acting on an axial direction of the worm in the valve element driving section, wherein correlation between a driving force output signal from the valve element driving section and a driving force obtained from a compression state of the spring cartridge at both of open operation and close operation of the electrically operated valve is possessed as a first correlation database, wherein correlation between a driving force input signal to the valve element driving section and the driving force output signal is acquired so that on the basis of the correlation, a state of change is monitored in a transmission efficiency of the driving force in the valve element driving section, and wherein with reference to the first correlation database, the driving force corresponding to the driving force output signal acquired by measurement is read out so that on the basis of the driving force, the driving force of the electrically operated valve is diagnosed.

Here, the "transmission efficiency of the driving force in the valve element driving section" indicates the ratio between the driving force inputted to the valve element driving section side and the driving force outputted from the valve element driving section side. This ratio can be recognized as correlation between the driving force input signal and the driving force output signal. Further, the phrase "a state of change is monitored in the transmission efficiency of the driving force" indicates that the state of change in the correlation is monitored continuously or alternatively in spots when necessary. Then, this state of change in the transmission efficiency of the driving force is reflected into the diagnosis on the driving force of the electrically operated valve.

For example, when the transmission efficiency of the driving force varies at a change rate exceeding a predetermined value or alternatively into a value exceeding a predetermined one, abnormality is concluded in the driving force transmission system. Then, in accordance with the change rate or the change amount, the driving force corresponding to the driving force output signal is corrected so that the diagnosis (result) on the driving force should become appropriate, while a degradation trend in the driving force transmission system is predicted and reflected into a maintenance schedule.

Further, in the concept of "diagnosis on the driving force", to be treatment is not limited to factors directly recognized as a driving force, that is, the torque [the torque obtained from the compression force of the spring cartridge, that is, (spring cartridge compression force)×r (where r denotes ½ of the pitch circle diameter of the worm wheel] serving as a driving force input signal, the compression amount and the compression force of the spring cartridge, the current value of the motor for driving the worm, and the like, while factors recognized indirectly as a driving force, that is, the valve rod stress and the yoke stress serving as a driving force output signal are included also.

Thus, according to the first aspect, the first correlation between the driving force output signal from the valve element driving section and the driving force obtained from the compression force of the spring cartridge is acquired and possessed in advance. Then, from that time on, when the first correlation database is referred to, the driving force corresponding to the driving force output signal acquired by measurement is read out, so that on the basis of the driving force, the driving force of the electrically operated valve is diagnosed. Thus, in comparison with, for example, a case that a physical quantity of a kind comparatively difficult to be measured is acquired at each time of diagnosis on the driving force of the electrically operated valve, the diagnosis work becomes remarkably simple. Further, the work can be performed with good workability. This labor saving accelerates reduction in the diagnosis cost.

This permits, for example:

a. diagnosis of appropriateness of a set-up torque, for example, diagnosis of appropriateness of the torque value at the operation timing of a torque switch at close operation of the electrically operated valve;

b. diagnosis of appropriateness of a valve seat force, that is, diagnosis of appropriateness of the magnitude of a close holding torque of the valve element at close operation of the electrically operated valve; and c. check of the magnitude of margin in the driving force, for example, check of the magnitude of margin in the driving force relative to a pull out torque necessary at the time of pull out of the valve element where the maximum torque is required in the open operation of the electrically operated valve. As a result, overall diagnosis can be performed on the driving force transmission system of the electrically operated valve.

As an electrically operated valve diagnosing apparatus for implementing the above-mentioned electrically operated valve diagnosing method and thereby achieving the above-mentioned operation and effect, a ninth aspect is proposed. That is, the ninth aspect is characterized by an electrically operated valve diagnosing apparatus for diagnosing a driving force of an electrically operated valve provided with a valve element driving section for driving open and close of a valve element by using a revolving drive force of a worm to which a revolving drive force is imparted by an electromotive power and with a spring cartridge expanded and contracted in response to a reaction force acting on an axial direction of the worm in the valve element driving section, the apparatus comprising: a first correlation database that shows correlation between a driving force output signal from the valve element driving section and a driving force obtained from a compression state of the spring cartridge at both of open operation and close operation of the electrically operated valve; monitoring means for acquiring correlation between a driving force input signal to the valve element driving section and the driving force output signal and then, on the basis of the correlation, monitoring a state of change in a transmission efficiency of the driving force in the valve element driving section; and diagnosing means for referring to the first correlation database so as to read out the driving force corresponding to the driving force output signal acquired by measurement, and then on the basis of the driving force, diagnosing the driving force of the electrically operated valve.

A second aspect is characterized by an electrically operated valve diagnosing method according to the first aspect, wherein a state of change is monitored in the transmission efficiency of the driving force, so that the state of change is reflected into calculation of the driving force corresponding to the driving force output signal.

Here, the phrase that the state of change in the transmission efficiency of the driving force is reflected into calculation of the driving force indicates, for example, that when the transmission efficiency of the driving force varies at a change rate exceeding a predetermined value or alternatively into a value exceeding a predetermined one, the first correlation database is corrected in correspondence to the change rate or the change value, and that on the basis of the corrected first correlation database, the driving force is calculated.

Thus, according to the electrically operated valve diagnosing method of the second aspect, the driving force is calculated on the basis of the first correlation database corrected in accordance with the transmission efficiency of the driving force in the valve element driving section. Then, on the basis of this, the driving force of the electrically operated valve is diagnosed. This permits more precise and reliable diagnosis.

As an electrically operated valve diagnosing apparatus for implementing the above-mentioned electrically operated valve diagnosing method and thereby achieving the above-mentioned operation and effect, a tenth aspect is proposed. That is, the tenth aspect is characterized by an electrically operated valve diagnosing apparatus according to the ninth aspect, comprising arithmetic operation means for monitoring a state of change in the transmission efficiency of the driving force, and thereby reflecting the state of change into calculation of the driving force corresponding to the driving force output signal.

A third aspect is characterized by an electrically operated valve diagnosing method according to the first aspect, wherein the driving force output signal is a yoke stress acting on a yoke.

Here, when the yoke stress is used as the driving force output signal, the yoke stress can directly be measured by a sensors such as a strain sensor attached to the outer surface of the yoke exposed to the outside of the electrically operated valve. Further, the yoke stress can always be measured regardless of the operation state of the electrically operated valve. Thus, the state of change in the transmission efficiency of the driving force can be monitored continuously. Further, the yoke stress is acquired as a voltage signal outputted from the strain sensor. Thus, the valve rod stress cannot directly be obtained from this. However, since the yoke stress is acquired quantitatively, this provides an advantage in acquiring a change tendency in the transmission efficiency of the driving force.

Further, the yoke stress can be measured in a part exposed to the outer surface of the electrically operated valve. Thus, in comparison with, for example, a case that a part of the electrically operated valve is opened while a strain gauge is installed in the inside so that the stress is measured, the work becomes remarkably easy. This improves further the diagnosis workability. Further, this labor saving reduces further the diagnosis cost.

As an electrically operated valve diagnosing apparatus for implementing the above-mentioned electrically operated valve diagnosing method and thereby achieving the above-mentioned operation and effect, an eleventh aspect is proposed. That is, the eleventh aspect is characterized by an electrically operated valve diagnosing apparatus according to the ninth or tenth aspect, wherein the driving force output signal is a yoke stress acting on a yoke.

A fourth aspect is characterized by an electrically operated valve diagnosing method according to the third aspect, wherein a second correlation database is possessed that shows correlation between a valve rod stress acting on a valve rod and serving as the driving force output signal and the yoke stress, and wherein on the basis of the valve rod stress read out in correspondence to the yoke stress acquired by measurement with reference to the second correlation database and the driving force input signal acquired by measurement, a state of change is monitored in a transmission efficiency of the driving force in the valve element driving section.

Here, the valve rod stress is recognized as a driving force output signal from the valve element driving section. Nevertheless, its direct measuring is restricted during the operation of the electrically operated valve. However, since the yoke stress is recognized as a driving force output signal from the valve element driving section similarly to the valve rod stress, and hence can always be measured even in an operating state of the electrically operated valve. Thus, when the correlation between the yoke stress and the valve rod stress is possessed as the second correlation database, from that time on, with reference to the second correlation database on the basis of the yoke stress acquired by measurement, the valve rod stress can be read out and acquired as the driving force output signal. Thus, in comparison with, for example, a case that the valve rod stress is acquired at each time of diagnosis of the electrically operated valve so that the diagnosis is performed, the diagnosis work becomes remarkably simple. Further, the work can be performed with good workability. This labor saving accelerates reduction in the diagnosis cost.

Here, this correlation between the valve rod stress and the yoke stress are acquired, for example, by a method that when the electrically operated valve can be operated to the full close side, a load (axial force) having a known value is applied to the valve rod, and then the valve rod stress and the yoke stress (e.g., both are acquired as voltage signals by the strain sensor) are measured at that time.

Further, since the valve rod stress is obtained numerically accurately, the friction coefficient μ between the valve rod and the stem nut can be obtained so that precise diagnosis is achieved concerning whether the value falls within an appropriate range. That is, the friction coefficient μ is obtained by a well-known friction coefficient formula "=[A×(torque/valve rod stress)−B×d]/[d+C×(torque/valve rod stress)] where d denotes the effective stem diameter and A, B, and care constants". Here, in this formula, all factors other than the "torque/valve rod stress" have constant-like values. Thus, when the ratio "torque/valve rod stress" between the torque and the valve rod stress is obtained, the friction coefficient μ of the valve element driving section can be obtained so that the appropriateness of the value can be diagnosed. As such, diagnosis can be performed on the basis of quantitative comparison with a designed value or the like concerning the electrically operated valve. This permits quantitative and easy determination whether the situation of friction (situation of lubrication) of the valve element driving section is normal or abnormal. This improves the reliability in the valve element driving section.

Meanwhile, in the actual operation of the electrically operated valve, the driving force outputted from the driving source such as a motor is transmitted through the valve element driving section to the valve rod. Thus, when a frictional force arises in the valve element driving section, the driving force inputted to the valve element driving section disagrees with the force transmitted from the valve element driving section to the valve rod, so that a difference arises between these forces. For example, when run out of oil occurs in a stem nut part so that a frictional force arises, this reduces the transmission efficiency of the driving force in the valve element driving section (i.e., the ratio between the input of the valve element driving section and the output from the valve element driving section). Thus, even when a driving force of a predetermined magnitude is inputted, the force actually acting on the valve rod becomes smaller than in a case that the oil is not run out. Thus, it is important to acquire the force actually acting directly on the valve element (=[valve rod stress as driving force output signal]−[sliding resistance in packing and the like]−[fluid pressure]), that is, the valve rod stress acting on the valve rod, which is a subject matter to be diagnosed as the intrinsic function (such as a closing function) of the electrically operated valve. In this case, since the yoke stress can be acquired by measurement as a reaction force of the valve rod stress, when on the basis of the valve rod stress corresponding to the yoke stress, diagnosis is performed on the force acting directly on the valve elements like diagnosis on the closing function (the seat force), a remarkably reliable diagnostic result is obtained on the entire electrically operated valve.

As an electrically operated valve diagnosing apparatus for implementing the above-mentioned electrically operated valve diagnosing method and thereby achieving the above-mentioned operation and effect, a twelfth aspect is proposed. That is, the twelfth aspect is characterized by an electrically operated valve diagnosing apparatus according to the eleventh aspect, comprising: a second correlation database that shows correlation among a valve rod stress acting on a valve rod and serving as the driving force output signal, the yoke stress, and the valve rod stress; and monitoring means for monitoring a state of change in a transmission efficiency of the driving force in the valve element driving section on the basis of the valve rod stress read out in correspondence to the yoke stress acquired by measurement with reference to the second correlation database and the driving force input signal acquired by measurement.

A fifth aspect of the present application is characterized by an electrically operated valve diagnosing method according to the first, second, third, or fourth aspect, wherein the driving force input signal is a current value signal corresponding to the driving force, a compression amount signal corresponding to a compression amount of the spring cartridge, or a compression force signal corresponding to a compression force of the spring cartridge.

Among these driving force input signals, the current value signal can continuously be acquired by measurement during the operation of the electrically operated valve as a supply current value to the motor by a current value sensor (e.g., a magnetic sensor described later) arranged in the outer side of a conduit tube for accommodating the electric wire. Then, on the basis of the correlation between the current value and the driving force having been acquired in advance, the current value acquired by the measurement is recognized numerically as the driving force corresponding to the current value.

The compression amount of the spring cartridge can be acquired by measurement even during the operation of the electrically operated valve as the movement amount of the worm at both of open operation and close operation of the electrically operated valve, for example, by a laser sensor or a differential transformer (so-called "LVDT") attached on the outer end side in the axial direction of the spring cartridge. In particular, when a laser sensor having a compact form is employed, the laser sensor may permanently be installed in the electrically operated valve, so that the compression amount of the spring cartridge may continuously be acquired by measurement during the operation of the electrically operated valve. Then, on the basis of the spring characteristics of the spring cartridge having been acquired in advance, that is, on the basis of the correlation between the compression amount and the compression force, the compression amount acquired by this measurement is recognized numerically as the driving force.

The compression force of the spring cartridge can continuously be acquired by measurement during the operation of the electrically operated valve at both of open operation and close operation of the electrically operated valve, for example, by a strain sensor attached to the spring cartridge. From this compression force acquired by measurement, as described above, the driving force is acquired directly by arithmetic operation as the product between the compression force and the pitch circle diameter of the worm wheel.

Each of these driving force input signals is a factor of determination criterion of the transmission efficiency of the driving force in the valve element driving section. Thus, accurate correlation with the driving force need be ensured always, and hence calibration is performed by an appropriate technique. For example, the current value can be calibrated by a load cell attached to the axis end side of the spring cartridge. Further, the compression amount and the compression force of the spring cartridge can be calibrated by a method that the electrically operated valve is operated by a load cell externally attached to the spring cartridge. Alternatively, calibration may be performed by a method that the spring cartridge is operated from the outside during the operation stop of the electrically operated valve, or alternatively that after the spring cartridge is removed from the electrically operated valve, the spring cartridge is compressed in an isolated state.

As such, according to the electrically operated valve diagnosing method of the fifth aspect, the driving force input signal to the valve element driving section is the current value signal, the compression amount signal, or the compression force signal, so that the driving force is obtained numerically by these measurement and arithmetic operation. Thus, a sensor optimal for acquisition of the driving force input signal can be selected, so that the driving force is acquired with precision. Then, on the basis of this acquired driving force, the driving force of the electrically operated valve is diagnosed, so that precise and reliable diagnosis is achieved.

As an electrically operated valve diagnosing apparatus for implementing the above-mentioned electrically operated valve diagnosing method and thereby achieving the above-mentioned operation and effect, a thirteenth aspect is proposed. That is, the thirteenth aspect is characterized by an electrically operated valve diagnosing apparatus according to the ninth, tenth, eleventh, or twelfth aspect, wherein the driving force input signal is a current value signal corresponding to the driving force, a compression amount signal corresponding to the compression amount of the spring cartridge, or a compression force signal corresponding to the compression force of the spring cartridge.

A sixth aspect of the present application is characterized by an electrically operated valve diagnosing method according to the fifth aspect, wherein the driving force input signal is a current value signal corresponding to the driving force, while the current value signal is acquired on the basis of signal information outputted from a plurality of magnetic sensors attached to an outer surface of a conduit tube accommodating an electric wire.

Here, the magnetic sensor is a sensor employing a Hall device, and generates a voltage corresponding to the magnitude of magnetism when magnetism from the electric wire accommodated in the conduit tube is sensed. Then, on the basis of the correlation between the output signal and the driving force, the driving force from the motor can be acquired.

In this case, although the electric wire is accommodated in the conduit tube, positional relation within the conduit tube of this electric wire is indefinite. Thus, when a single magnetic sensor is employed, a situation can arise that the magnetism is not clearly detected depending on the position of the electric wire. Thus, in the present invention, the plurality of magnetic sensors are attached to the outside of the conduit tube, so that magnetism can be measured accurately regardless of the position of the electric wire in the inside of the conduit tube. Further, in this case, when the plurality of magnetic sensors are attached in a plane perpendicular to the axial direction of the conduit tube at the same pitch in the circumferential direction of the conduit tube, the magnetic measurement function is improved further, and so does the reliability of the driving force acquired on the basis of the measurement signal.

As an electrically operated valve diagnosing apparatus for implementing the above-mentioned electrically operated valve diagnosing method and thereby achieving the above-mentioned operation and effect, a fourteenth aspect is proposed. That is, the fourteenth aspect is characterized by an electrically operated valve diagnosing apparatus according to the thirteenth aspect, comprising driving force input signal acquiring means for acquiring the current value signal serving as the driving force input signal, on the basis of signal information outputted from a plurality of magnetic sensors attached to an outer surface of a conduit tube accommodating an electric wire.

A seventh aspect is characterized by an electrically operated valve diagnosing method according to the fifth aspect, wherein the driving force input signal to the valve element driving section is a compression amount signal corresponding to a compression amount of the spring cartridge, while the compression amount signal is acquired on the basis of displacement information concerning an axial direction of a contact element that is provided in an adaptor fixed on an outer surface side of the electrically operated valve and that can be in contact or non-contact with an axis end side of the spring cartridge so as to displace and follow compression displacement of the spring cartridge in a contacting state.

Here, since the contact element is provided in the adaptor fixed to the outer surface side of the electrically operated valve, when the compression amount is measured as the driving force input signal, the characteristics of the spring cartridge can be measured directly and easily from the outside of the electrically operated valve. Thus, together with that the yoke stress or the valve rod stress serving as the driving force output signal can also easily be measured from the outside of the electrically operated valve by the strain sensor attached to the yoke, the measurement work becomes easier.

Further, when the compression amount is not measured, the contact element may be in a state non-contacting with the axis end side of the spring cartridge. Thus, the contact element does not disturb the operation of the spring cartridge. Further, when the contact element is attached to the adaptor in an oil-tight manner, the necessity is avoided that in the measurement of the compression amount by the contact element, the outer end side of the spring cartridge should be opened. This avoids in advance, for example, grease leakage from the spring cartridge side which could occur in a case that the spring cartridge need be opened.

As an electrically operated valve diagnosing apparatus for implementing the above-mentioned electrically operated valve diagnosing method and thereby achieving the above-mentioned operation and effect, a fifteenth aspect is proposed. That is, the fifteenth aspect is characterized by an electrically operated valve diagnosing apparatus according to the thirteenth aspect, comprising driving force input signal acquiring means for acquiring the compression amount signal serving as the driving force input signal, on the basis of displacement information concerning an axial direction of a contact element that is provided in an adaptor fixed on an outer surface side of the electrically operated valve and that can be in contact or non-contact with an axis end side of the spring cartridge so as to displace and follow compression displacement of the spring cartridge in a contacting state.

An eighth aspect is characterized by an electrically operated valve diagnosing method according to the third aspect, wherein a compression force and a compression amount of the spring cartridge are acquired by measurement and possessed, while at both of open operation and close operation of the electrically operated valve, the yoke stress and an accurate compression amount where an amount of backlash in expansion and contraction directions of the spring cartridge is removed by arithmetic operation are acquired and possessed, wherein correlation between the driving force and the yoke stress at both of open operation and close operation which is obtained from the possessed compression amount, the compression force, and the yoke stress is acquired as the first correlation database, and wherein with reference to the first correlation database, a driving force corresponding to the yoke stress acquired by measurement is read out.

Here, as the compression amount, the accurate compression amount is acquired where the amount of backlash in expansion and contraction directions of the spring cartridge is removed by arithmetic operation. Then, on the basis of this, the first correlation database is acquired. Thus, when the first correlation database is referred to so that a driving force is read out in correspondence to the yoke stress acquired by measurement, the driving force becomes accurate one free from the influence of backlash. This permits precise and reliable diagnosis on the driving force.

As an electrically operated valve diagnosing apparatus for implementing the above-mentioned electrically operated valve diagnosing method and thereby achieving the above-mentioned operation and effect, a sixteenth aspect is proposed. That is, the sixteenth aspect is characterized by an electrically operated valve diagnosing apparatus according to the eleventh aspect, comprising: first acquiring means for acquiring and possessing, at both of open operation and close operation of the electrically operated valve, the yoke stress and an accurate compression amount where an amount of backlash in expansion and contraction directions of the spring cartridge is removed by arithmetic operation are; second acquiring means for acquiring by measurement and possessing a compression force and a compression amount of the spring cartridge; a first correlation database that shows correlation between the driving force and the yoke stress at both of open operation and close operation which is obtained from the possessed compression amount, the compression force, and the yoke stress; and driving force reading means for referring to the first correlation database, and thereby reading out a driving force corresponding to the yoke stress acquired by measurement.

INDUSTRIAL APPLICABILITY

As described above, the invention of the present application provides an electrically operated valve diagnosing method and an electrically operated valve diagnosing apparatus where on the basis of correlation between a torque and a yoke stress, a torque corresponding to a yoke stress acquired by measurement is read out so that the driving force (torque) of an electrically operated valve is diagnosed, wherein the state of change in the transmission efficiency of the driving force is reflected into calculation of the driving force so that precise and reliable diagnosis is achieved, and wherein this diagnosis can be performed by simple operation with good workability even during the operation of the electrically operated valve, as well as with precision and at a low cost. Further, the present invention permits diagnosis on the entire driving force transmission system from the driving section side to the valve body side of the electrically operated valve and diagnosis on the change by aging in the transmission situation of the driving force, that is, trend management of the transmission efficiency of the driving force.

DETAILED DESCRIPTION OF THE INVENTION

A diagnosing method and a diagnosing apparatus for an electrically operated valve according to the invention of the present application are described below in detail with reference to preferred embodiments.

First, before the description of a diagnosing method according to the invention of the present application, the structure and the like of a drive system of an electrically operated valve are described below with reference to FIGS. 1-7.

Figure 1:
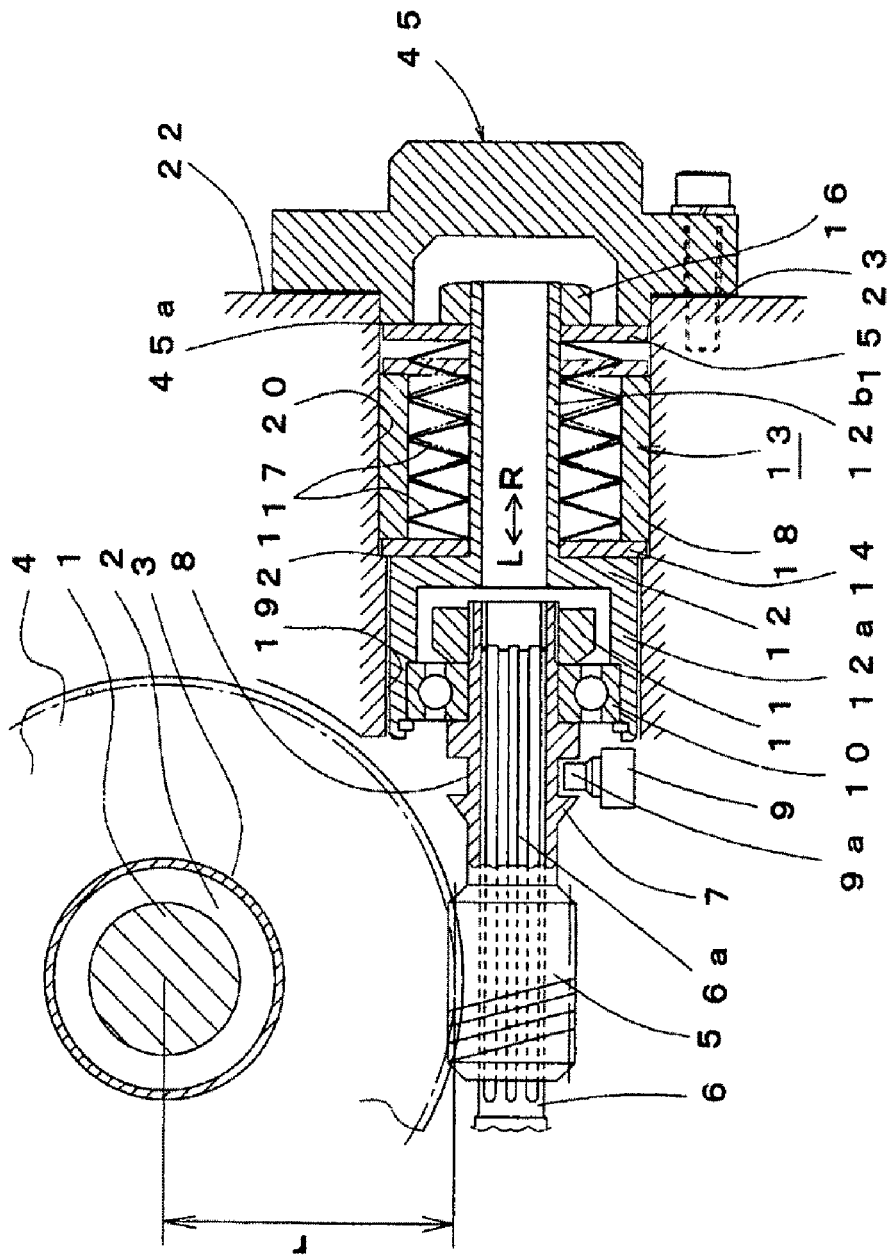
FIG. 1 is a sectional view showing a driving section of an electrically operated valve of a type without a built-in torque sensor.
Figure 2:
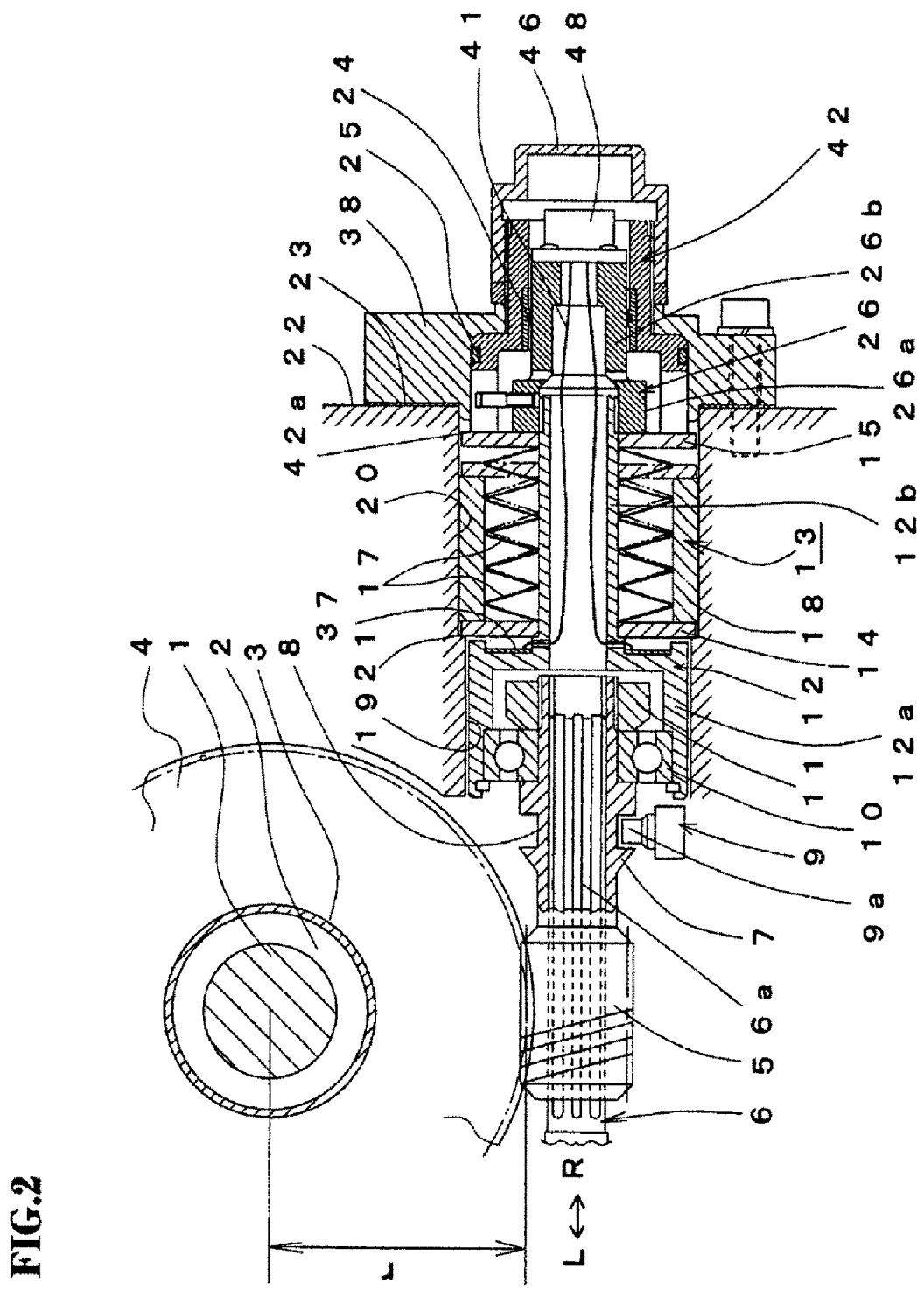
FIG. 2 is a sectional view showing a driving section of an electrically operated valve of a type with a built-in torque sensor.

FIG. 1 shows a main part of a drive system (referred to as a "first electrically operated valve driving system", herein after) of an ordinary electrically operated valve employing a diagnosing method according to the invention of the present application. FIG. 2 shows a main part of a drive system (referred to as a "second electrically operated valve driving system", herein after) of an electrically operated valve provided with a built-in torque sensor (of a type in which a strain gauge is stuck to a movable shaft near a spring cartridge).

A: First Electrically Operated Valve Driving System

In FIG. 1, numeral 1 indicates a valve rod to a lower end of which a valve element (not shown) is linked. A stem nut 2 is screwed on a thread part of an upper part of the valve rod. The stem nut 2 is inserted and fixed into a cylindrical drive sleeve 3 so as to be integrated with this. Further, the drive sleeve 3 can revolve in a manner integrated with a worm wheel 4 which is fit and arranged on the outer periphery side. The revolving force of the stem nut 2 is transmitted to the valve rod 1 as an axis directional displacement force, and thereby drives open and close (up and down) of the valve element via the valve rod 1. Here, the valve rod 1 can move only in the axial direction. That is, its rotation is restricted.

A worm 5 engages with the worm wheel 4. When the worm 5 is driven and revolved by a motor (not shown) via a motor shaft 6, the worm wheel 4 revolves. The revolving force is transmitted as an up-and-down driving force to the valve rod 1 via the stem nut 2.

A spline 6a is provided in the motor shaft 6. Since the worm 5 is attached to this spline 6a part by spline fitting, the worm 5 receives a revolving force from the motor shaft 6 but can move in the axial direction (the directions of arrows R-L).

Further, in the worm 5, one end side extends in the axial direction, and thereby constitutes an extended cylinder section 7. A circumferential groove 8 is provided in the outer periphery of this extended cylinder section 7, while an actuator element 9a of a torque switch 9 is inserted into the circumferential groove 8. When the worm 5 moves in the axial direction from a neutral position so that the movement amount reaches a predetermined value, the torque switch 9 is actuated and thereby generates a stop signal for the motor so as to stop the motor. This prevents an excessive torque from being transmitted to the valve rod 1 side, and thereby protects the rod.

At an end of the extended cylinder section 7 of the worm 5, a bearing 10 is fixed with a nut 11, while a movable shaft 12 described below is linked in a freely revolvable manner via the bearing 10. The movable shaft 12 is a hetero-diameter cylinder provided with a larger diameter cylinder section 12a to which the bearing 10 is inserted and linked and a smaller diameter cylinder section 12b that continues from the larger diameter cylinder section 12a. In association with the axis directional movement of the worm 5, the movable shaft 12 moves in the axial direction in an integrated manner. Further, a spring cartridge 13 described below is attached to the smaller diameter cylinder section 12b of the movable shaft 12.

After the valve element becomes full open or full close, the spring cartridge 13 generates a predetermined holding torque in the worm wheel 4 via the worm 5. In the spring cartridge 13, a plurality of dish springs 17 in a state that their front and rear surfaces are alternately faced opposite and that a necessary compressed load is provided are attached between one washer 14 arranged on a step surface side between the larger diameter cylinder section 12a and the smaller diameter cylinder section 12b of the movable shaft 12 and the other washer 15 arranged on the nut 16 screwed at an end of the smaller diameter cylinder section 12b.

The axial length in an isolated state of the spring cartridge 13 (i.e., the outer dimension between the washers 14 and 15 in a state that a predetermined compressed load is generated) is fixed and held at a predetermined value by the step surface between the larger diameter cylinder section 12a and the smaller diameter cylinder section 12b of the movable shaft 12 and the seating surface of the nut 16.

Further, as for the movable shaft 12 and the spring cartridge 13, the movable shaft 12 is fit into a smaller diameter hole 19 provided on the same axis the worm 5, while the spring cartridge 13 is fit into a larger diameter hole 20 that continues from the smaller diameter hole 19. The movable shaft 12 is movable in the axial direction within the smaller diameter hole 19, while the spring cartridge 13 can be expanded and contracted within the larger diameter hole 20.

When the washer 14 arranged on one end side of the spring cartridge 13 engages with a shoulder part 21 between the smaller diameter hole 19 and the larger diameter hole 20, further movement in the arrow L direction is restricted. Further, when the washer 15 arranged on the other end side of the spring cartridge 13 abuts against an end face 45a of a cartridge presser 45 attached to an outer end of the larger diameter hole 20, further movement in the arrow R direction is restricted. Here, the cartridge presser 45 has also a function of a cap that covers and thereby protects the outer end side of the spring cartridge 13 at the time of normal operation.

Then, in the first electrically operated valve driving system, when the spring cartridge 13 performs expansion and contraction in accordance with the compression force acting on this so that the torque switch 9 is operated. This avoids reliably in advance that an excessive load is inputted to the valve rod 1 side (i.e., the valve element side). Thus, safe and reliable operation is ensured in the electrically operated valve. Here, numeral 18 indicates a torque limit sleeve for restricting the amount of maximum compression displacement of the dish spring 17

B: Second Electrically Operated Valve Driving System

In FIG. 2, numeral 1 indicates a valve rod to a lower end of which a valve element (not shown) is linked. A stem nut 2 is screwed on a thread part of an upper part of the valve rod. The stem nut 2 is inserted and fixed into a cylindrical drive sleeve 3 so as to be integrated with this. Further, the drive sleeve 3 can revolve in a manner integrated with a worm wheel 4 which is fit and arranged on the outer periphery side. The revolving force of the stem nut 2 is transmitted to the valve rod 1 as an axis directional displacement force, and thereby drives open and close (up and down) of the valve element via the valve rod 1. Here, the valve rod 1 can move only in the axial direction. That is, its rotation is restricted.

A worm 5 engages with the worm wheel 4. When the worm 5 is driven and revolved by a motor (not shown) via a motor shaft 6, the worm wheel 4 revolves. The revolving force is transmitted as an up-and-down driving force to the valve rod 1 via the stem nut 2.

A spline 6a is provided in the motor shaft 6. Since the worm 5 is attached to this spline 6a part by spline fitting, the worm 5 receives a revolving force from the motor shaft 6 but can move in the axial direction (the directions of arrows R-L).

Further, in the worm 5, one end side extends in the axial direction, and thereby constitutes an extended cylinder section 7. A circumferential groove 8 is provided in the outer periphery of this extended cylinder section 7, while an actuator element 9a of a torque switch 9 is inserted into the circumferential groove 8. When the worm 5 moves in the axial direction from a neutral position so that the movement amount reaches a predetermined value, the torque switch 9 is actuated and thereby generates a stop signal for the motor so as to stop the motor. This prevents an excessive torque from being transmitted to the valve rod 1 side, and thereby protects the rod.

At an end of the extended cylinder section 7 of the worm 5, a bearing 10 is fixed with a nut 11, while a movable shaft 12 described below is linked in a freely revolvable manner via the bearing 10. The movable shaft 12 is a hetero-diameter cylinder provided with a larger diameter cylinder section 12a to which the bearing 10 is inserted and linked and a smaller diameter cylinder section 12b that continues from the larger diameter cylinder section 12a. In association with the axis directional movement of the worm 5, the movable shaft 12 moves in the axial direction in an integrated manner. Further, a spring cartridge 13 described below is attached to the smaller diameter cylinder section 12b of the movable shaft 12.

After the valve element becomes full open or full close, the spring cartridge 13 generates a predetermined holding torque in the worm wheel 4 via the worm 5. In the spring cartridge 13, a plurality of dish springs 17 in a state that their front and rear surfaces are alternately faced opposite and that a necessary compressed load is provided are attached between one washer 14 arranged on a step surface side between the larger diameter cylinder section 12a and the smaller diameter cylinder section 12b of the movable shaft 12 and the other washer 15 arranged on a later-described nut 26 screwed at an end of the smaller diameter cylinder section 12b.

The axial length in an isolated state of the spring cartridge 13 (i.e., the outer dimension between the washers 14 and 15 in a state that a predetermined compressed load is generated) is fixed and held at a predetermined value by the step surface between the larger diameter cylinder section 12a and the smaller diameter cylinder section 12b of the movable shaft 12 and the seating surface of the nut 26.

Further, as for the movable shaft 12 and the spring cartridge 13, the movable shaft 12 is fit into a smaller diameter hole 19 provided on the same axis the worm 5, while the spring cartridge 13 is fit into a larger diameter hole 20 that continues from the smaller diameter hole 19. The movable shaft 12 is movable in the axial direction within the smaller diameter hole 19, while the spring cartridge 13 can be expanded and contracted within the larger diameter hole 20.

When the washer 14 arranged on one end side of the spring cartridge 13 engages with a shoulder part 21 between the smaller diameter hole 19 and the larger diameter hole 20, further movement in the arrow L direction is restricted. Further, when the washer 15 arranged on the other end side of the spring cartridge 13 abuts against an end face 42a of a below-described cartridge presser 42 arranged near an outer end of the larger diameter hole 20, further movement in the arrow R direction is restricted.

The cartridge presser 42 is composed of a step-equipped cylinder body constructed from a larger diameter section and a smaller diameter section, and is fixed and held by an adaptor 38 fixed by bolting on the end face of a casing. Then, the end face 42a on the larger diameter side restricts the movement of the washer 15.

On the other hand, a strain gauge 37 is stuck on the end face of the larger diameter cylinder section 12a of the movable shaft 12 in a state non-contacting with the one washer 14. The strain gauge 37 is a component characteristic to the second electrically operated valve driving system, and measures as a strain displacement the load (i.e., the compression force of the spring cartridge 13) acting on the movable shaft 12 in association with the compression of the spring cartridge 13 in the directions of arrows L and R. The measurement data is extracted to the outside, and then used as diagnosis data of the electrically operated valve.

The nut 26 is composed of a modified-shaped nut having a main body 26a screwed on the end of the smaller diameter cylinder section 12b and a cylindrical extension section 26b extending coaxially from an end side of the main body 26a. Through its inner hole, a lead wire 41 is pulled out from the strain gauge 37 side, while a connector 48 is attached to the tip.

Further, the extension section 26b of the nut 26 is fit into the inside of the smaller diameter section of the cartridge presser 42, while an O-ring 24 is arranged between the extension section 26b and the inner periphery surface of the cartridge presser 42. The O-ring 24 performs shaft seal between the cartridge presser 42 and the nut 26 that displaces relative to this in the axial direction. Further, an O-ring 25 is arranged between the outer periphery surface of the larger diameter section of the cartridge presser 42 and the inner periphery surface of the adaptor 38. Here, the connector 48 faces outward from the end face of the cartridge presser 42. However, at the time of normal operation, a cap 46 is attached to the cartridge presser 42.

Meanwhile, in the electrically operated valve, as described above, in order that its intrinsic function should be maintained over a long term, for example, soundness need be checked in the valve element driving section and the like (including the electric part and the worm) for transmitting the revolving force of the worm to the valve element side. In addition, diagnosis on the driving force need be performed appropriately concerning whether the valve element is driven with an appropriate driving force and whether an appropriate holding torque is ensured in the full open and full close states of the valve element.

Among such various kinds of diagnosis items, in order that diagnosis data especially for diagnosis on the driving force should be acquired, at the time of diagnosis of an electrically operated valve in the first electrically operated valve driving system, a sensor unit 30 described below is attached temporarily in place of the cartridge presser 45. In contrast, in the second electrically operated valve driving system, the strain gauge 37 is installed permanently.

Figure 3:
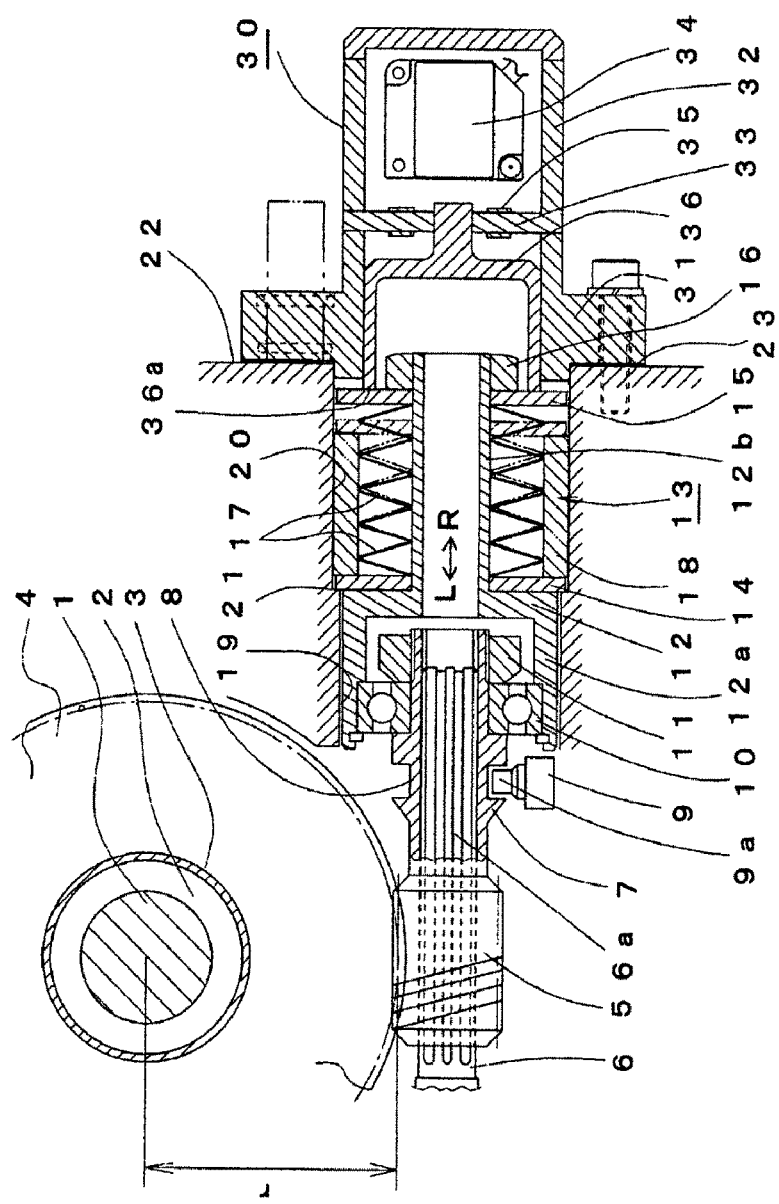
FIG. 3 is a sectional view showing a state that a sensor unit is temporarily attached to an electrically operated valve shown in FIG. 1.

First, in the first electrically operated valve driving system (see FIG. 1), as shown in FIG. 3, the cartridge presser 45 attached permanently at the time of normal operation of the electrically operated valve is removed from the casing. Then, in place of this, a sensor unit 30 described below is attached temporarily to the outer end side of the spring cartridge 13, so that the compression amount of the spring cartridge 13 and the compression force acting on this are acquired by measurement in an operating state of the electrically operated valve.

In the sensor unit 30, an adaptor 31 having the shape of a cylinder with flange is abutted against and fixed to the end face 22 of the casing via a packing 23 such as to cover the end side of the larger diameter hole 20, while a sensor holder 32 is attached to the outer end face of the adaptor 31. Then, between the outer end face of the adaptor 31 and the end face of the sensor holder 32, a plate-shaped load cell 33 is arranged across such as to bisect in the axial direction the space in between. To this load cell 33, a strain gauge 35 is stuck, while an end of a core 36 is linked. Further, the other end of the core 36 abuts against the washer 15 on the spring cartridge 13 side, and thereby restricts further movement of the washer 15 in the arrow R direction. Thus, the compression force acting on the spring cartridge 13 is transmitted from the washer 15 through the core 36 to the load cell 33, and then detected as a strain amount (voltage value) in the load cell 33 by the strain gauge 35. On the basis of this strain amount, the compression force acting on the spring cartridge 13 is acquired.

As for the interval on the adaptor 31 side and the interval on the sensor holder 32 side which are partitioned by the load cell 33, in the space on the adaptor 31 side, the nut 16 enters in such as to be arranged and located inside the core 36. Further, in the space on the sensor holder 32 side, a laser sensor 34 is arranged. The laser sensor 34 goes through a through hole (not shown) provided in the load cell 33 and the core 36, and then faces the nut 16 attached to the tip of the movable shaft 12, so as to measure the position of the top surface of the nut 16. As a result, the axis directional movement amount of the worm 5, that is, the compression amount of the spring cartridge 13, is measured. Specifically, a "measurement point" is set up on the top surface of the nut 16, and then the distance (interval) from the laser sensor 34 to the measurement point is measured.

Figure 6:
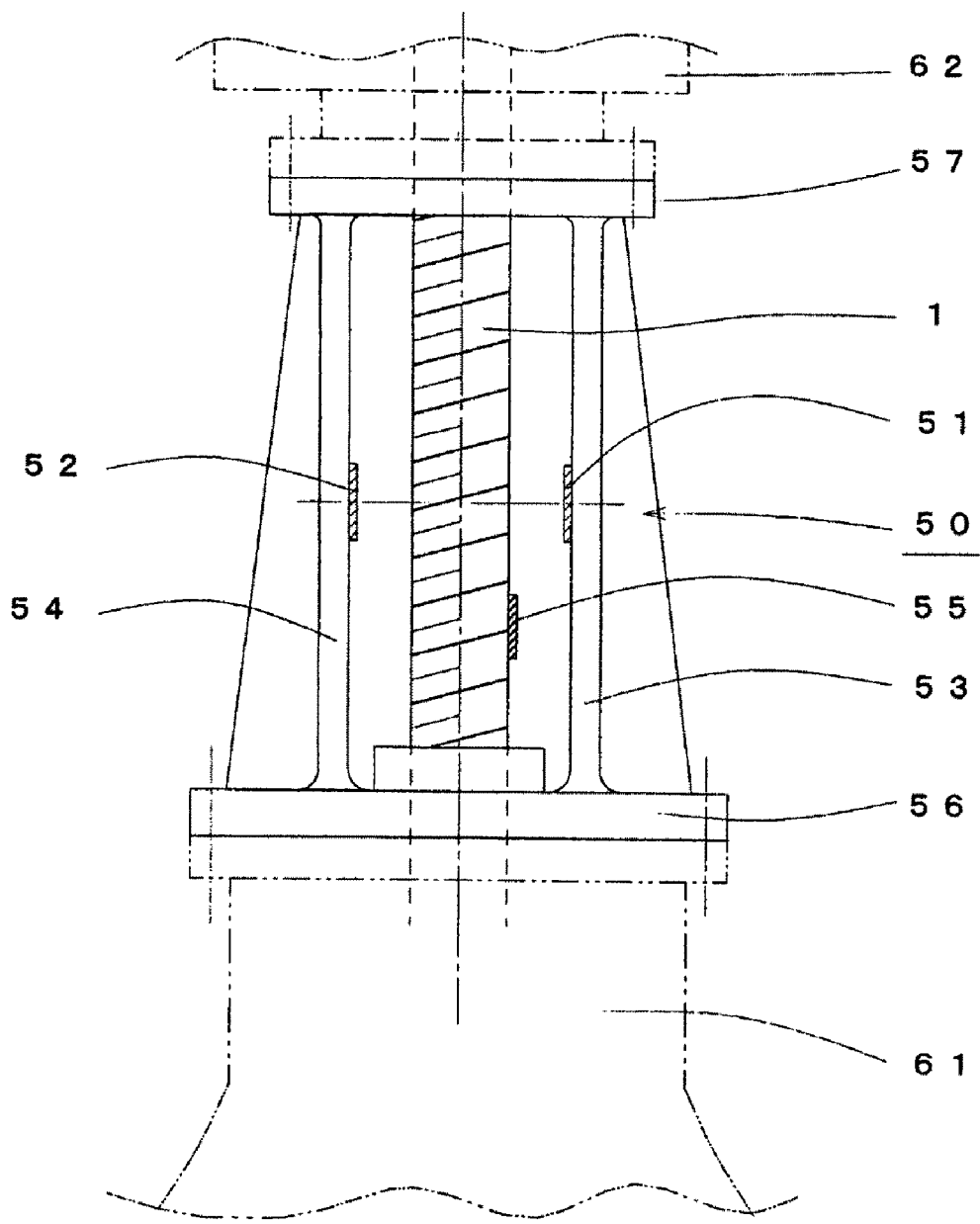
FIG. 6 is an enlarged view of a yoke section of an electrically operated valve.

Further, in addition to the load cell 33 and the laser sensor 34, as diagnosis data acquisition means, as shown in FIG. 6, between the valve box 61 accommodating the valve element and the valve element driving section 62 accommodating the worm wheel 4, the worms, and the like, strain gauges 51 and 52 for measuring the stress, that is, the yoke stress, acting on the yoke 50 arranged in between such as to cover the valve rod 1 are arranged respectively in a pair of right and left supporting rods 53 and 54 of the yoke 50. Further, a strain gauge 55 for measuring the stress, that is, the valve rod stress, acting on the valve rod 1 is arranged in the valve rod.

Since, the valve rod 1 goes up and down in association with the operation of the electrically operated valve. Thus, in many cases, the strain gauge 55 is allowed to be installed directly in the valve rod 1 only when the valve rod operates in a range that the strain gauge 55 can be seen from the outside. However, for example, when the state of change in the transmission efficiency of the driving force is desired to be monitored on the basis of the valve rod stress, the valve rod stress need be acquired continuously. In such a case, for example, a load (axial force) having a known value is applied on the valve rod when the electrically operated valve can be operated to the full close side, and then the yoke stress at that time is measured by the strain gauges 51 and 52, so that the correlation between the valve rod stress and the yoke stress is acquired as a correlation database. Then, from that time on, with reference to the correlation database, a valve rod stress corresponding to the yoke stress acquired by measurement is read out.

Figure 7:
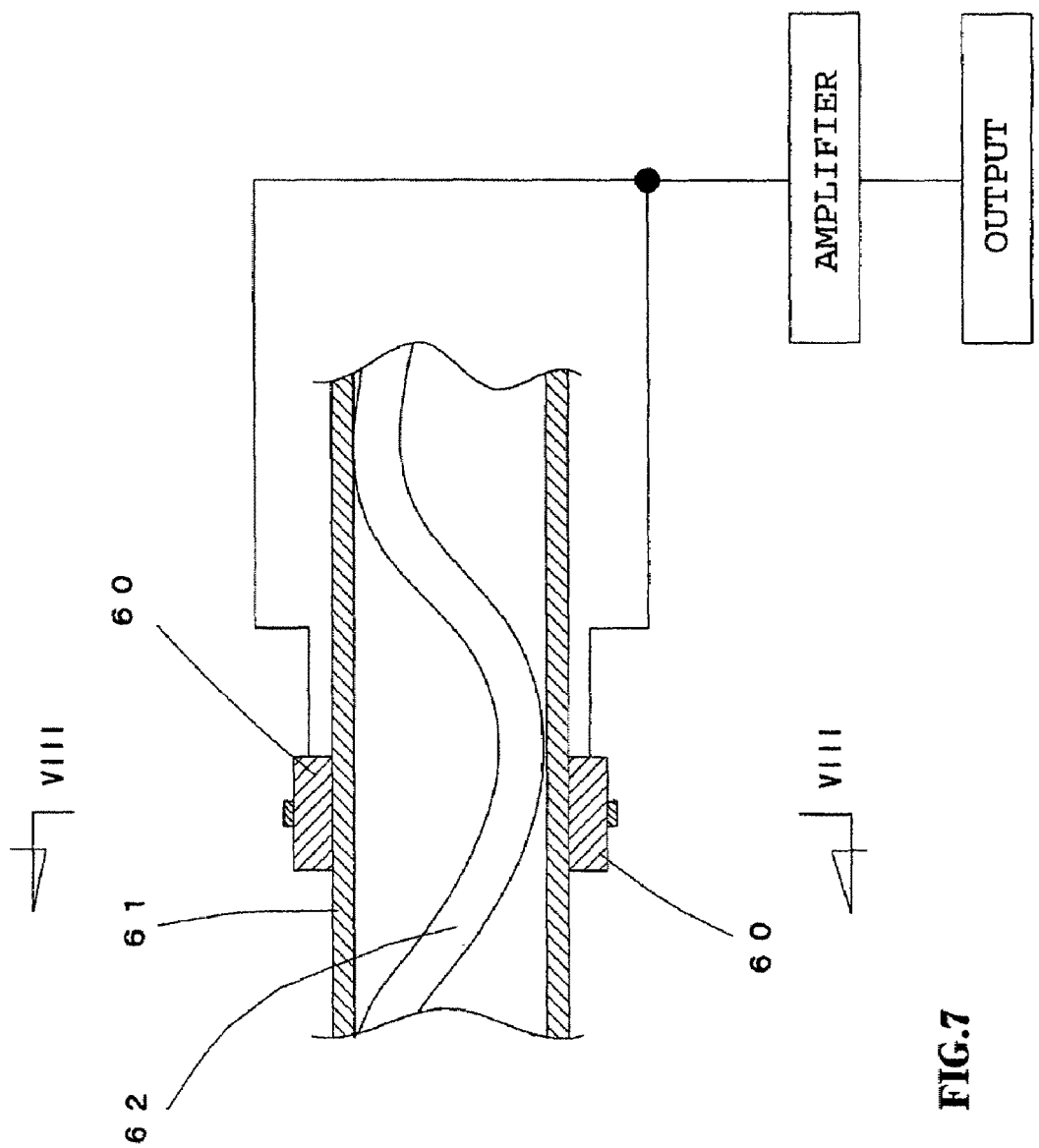
FIG. 7 is a sectional view showing a particular arrangement of attaching magnetic sensors to a conduit tube.
Figure 8:
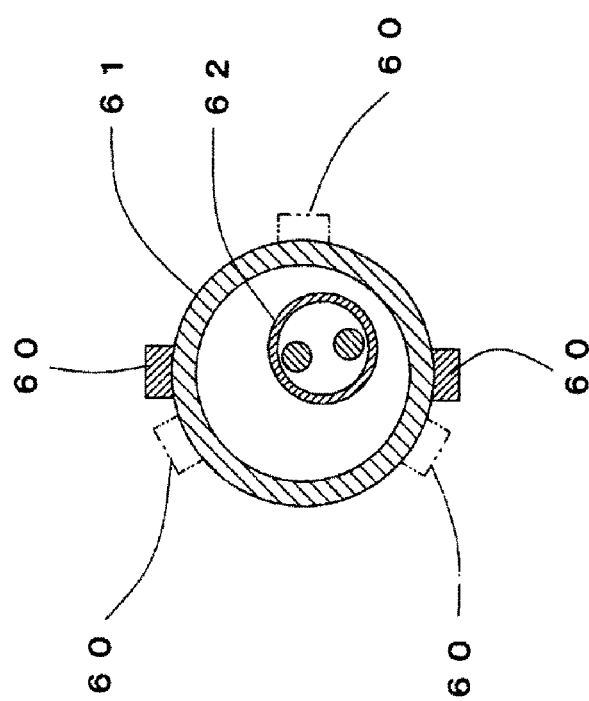
FIG. 8 is a sectional view taken along line VIII-VIII of FIG. 7.

Further, as shown in FIGS. 7 and 8, in order to measure the current value of the motor, a plurality of magnetic sensors 60 are arranged on the outer surface of a conduit tube 61 in the inside of which an electric wire 62 is arranged. Here, each magnetic sensor 60 is a sensor employing a Hall device as described above, and generates a voltage corresponding to the magnitude of magnetism when magnetism from the electric wire 62 accommodated in the conduit tube 61 is sensed. Then, on the basis of the correlation between the output signal and the driving force, the driving force from the motor can be acquired.

In this case, although the electric wire 62 is accommodated in the conduit tube 61, positional relation within the conduit tube 61 of this electric wire 62 is indefinite. Thus, when a single magnetic sensor is employed, a situation can arise that the magnetism is not clearly detected depending on the position of the electric wire. Thus, in this example, the plurality of magnetic sensors 60 are attached to the outer surface of the conduit tube 61. As for the number of attached sensors, when the electric wire 62 is a two-phase line, two or a multiple of two (i.e., four, six, or the like) sensors are arranged as indicated by a solid line in FIG. 8. In contrast, when the electric wire 62 is a three-phase line, three or a multiple of three (i.e., six, nine, or the like) sensors are arranged as indicated by a dash-dotted line in FIG. 8. Further, in this case, when the plurality of magnetic sensors 60 are attached in a plane perpendicular to the axial direction of the conduit tube 61 at the same pitch in the circumferential direction of the conduit tube 61, the magnetism signal can be obtained clearly and stably in a signal waveform as smooth as possible regardless of the position of the electric wire 62 in the inside of the conduit tube 61.

In a clamp-type magnetic sensor used generally in the prior art, since positional relation of the magnetic sensor relative to the electric wire in the conduit tube varies at each time of measurement (i.e., at each time of attachment of the magnetic sensor), stable and reliable measurement is difficult to be achieved. Thus, in this example, the magnetic sensors 60 are attached permanently to the conduit tube 61 such that the positional relation of the magnetic sensors 60 relative to the conduit tube 61 should be maintained constant. This permits always reliable measurement.

Meanwhile, in the sensor unit 30, the movement amount (i.e., the amount obtained by adding the influence of backlash of the spring cartridge to the actual compression amount of the spring cartridge 13) at both of close operation (at the time of movement in the arrow R direction) and open operation (at the time of movement in the arrow L direction) of the worm 5 can be measured by the laser sensor 34. Nevertheless, the compression force acting on the spring cartridge 13 can be measured at only any one of close operation and open operation (at close operation in the present embodiment) because of the function of the load cell 33. That is, the compression force cannot be measured at the other operation (at open operation). Thus, in the acquisition of the compression force at open operation, as described later, the compression force is acquired not by actual measurement but on the basis of the correlation between the compression amount and the compression force at close operation together with the compression amount at open operation.

On the other hand, in the second electrically operated valve driving system (see FIG. 2), the strain gauge 37 is stuck on the end face of the larger diameter cylinder section 12*a* of the movable shaft 12. Thus, the compression force of the spring cartridge 13 can be acquired by direct measurement at both of close operation and open operation.

Figure 4:
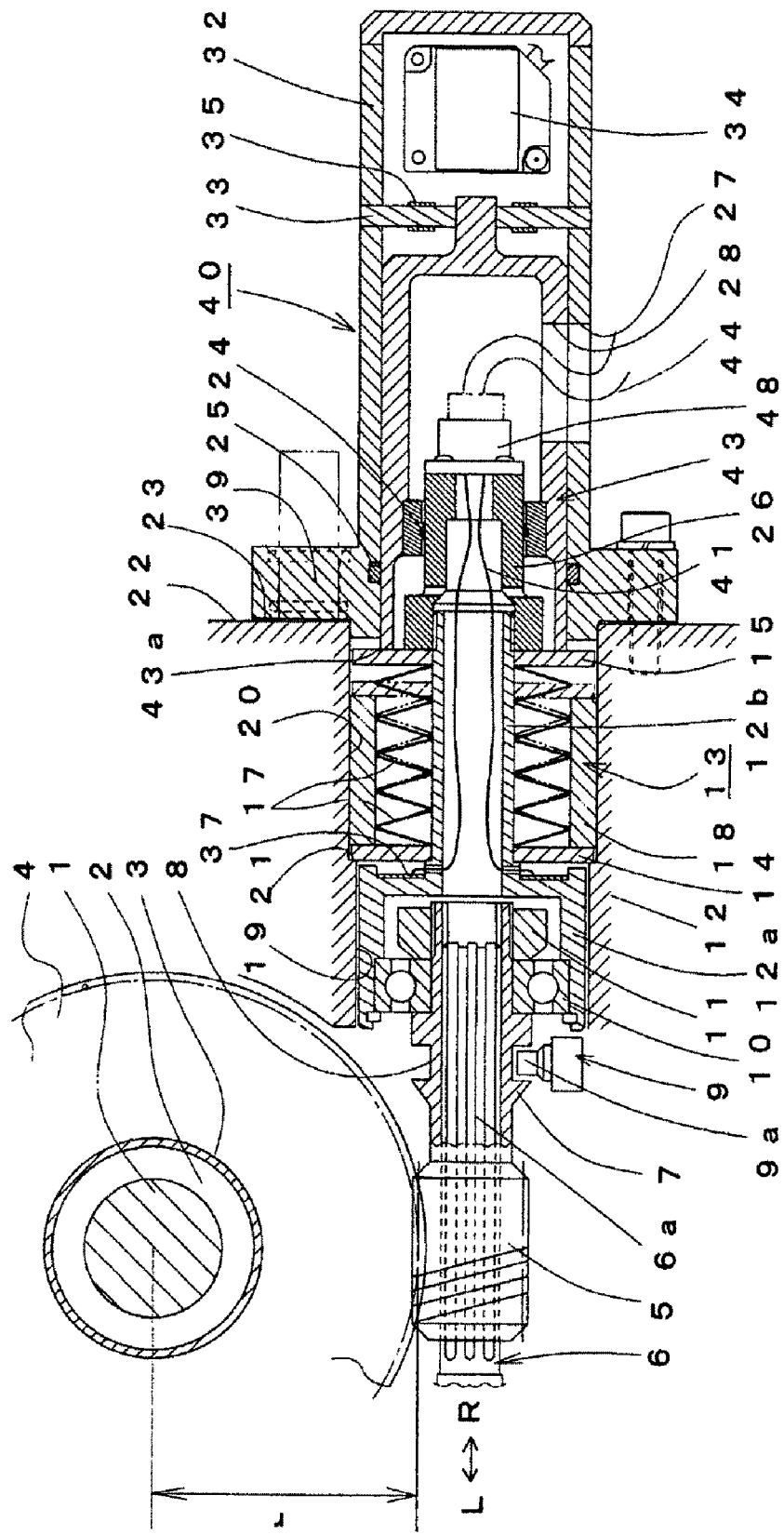
FIG. 4 is a sectional view showing a state that a sensor unit is temporarily attached to an electrically operated valve shown in FIG. 2.

Here, the strain gauge 37 need be calibrated. Thus, for the purpose of this calibration, as shown in FIG. 4, a sensor unit 40 having a configuration approximately similar to that attached to the first electrically operated valve driving system is attached temporarily to the outer end side of the spring cartridge 13 in place of the adaptor 38, the cartridge presser 42, and the cap 46, so that the strain gauge 37 is calibrated by the load cell 33 and the laser sensor 34 of the sensor unit 40.

That is, in the sensor unit 40, an adaptor 39 having the shape of a cylinder with flange is abutted against and fixed to the end face 22 of the casing via a packing 23 such as to cover the end side of the larger diameter hole 20, while a sensor holder 32 is attached to the outer end of the adaptor 39. Then, between the outer end of the adaptor 39 and the end face of the sensor holder 32, a plate-shaped load cell 33 is arranged across such as to bisect in the axial direction the space in between. To this load cell 33, a strain gauge 35 is stuck, while an end of a core 43 is linked. Further, the other end 43*a* of the core 43 abuts against the washer 15 on the spring cartridge 13 side, and thereby restricts further movement of the washer 15 in the arrow R direction. Thus, the compression force acting on the spring cartridge 13 is transmitted from the washer 15 through the core 43 to the load cell 33, and then detected as a strain amount in the load cell 33 by the strain gauge 35. On the basis of this strain amount, the compression force acting on the spring cartridge 13 is acquired.

As for the interval on the adaptor 39 side and the interval on the sensor holder 32 side which are partitioned by the load cell 33, in the space on the adaptor 39 side, the nut 26 enters in such as to be arranged and located inside the core 43. Then, in order that a signal line 44 should be extracted to the outer side from the connector 48 attached to the tip of the nut 26, slits 27 and 28 are provided respectively in the peripheral walls of the adaptor 39 and the core 43.

Further, in the space on the sensor holder 32 side, a laser sensor 34 is arranged. The laser sensor 34 goes through the through holes (not shown) provided in the load cell 33 and the core 43, and then faces the nut 26 attached to the tip of the movable shaft 12, so as to measure the position of the top surface of the nut 26 or a predetermined position of the connector 48. As a result, the axis directional movement amount of the worm 5, that is, the compression amount of the spring cartridge 13, is measured indirectly.

In this example, as described above, the strain gauge 37 is calibrated by the load cell 33 and the laser sensor 34 of the sensor unit 40. However, the present invention is not limited to this configuration. For example, the above-mentioned "spring compression method" may be applied. That is, in an operation stop state of the electrically operated valve, the dish spring of the spring cartridge may be compressed from the outside. Then, on the basis of the relation between the compression force to the spring cartridge and the compression amount corresponding to this at that time, the strain gauge 37 may be calibrated.

Figure 5:
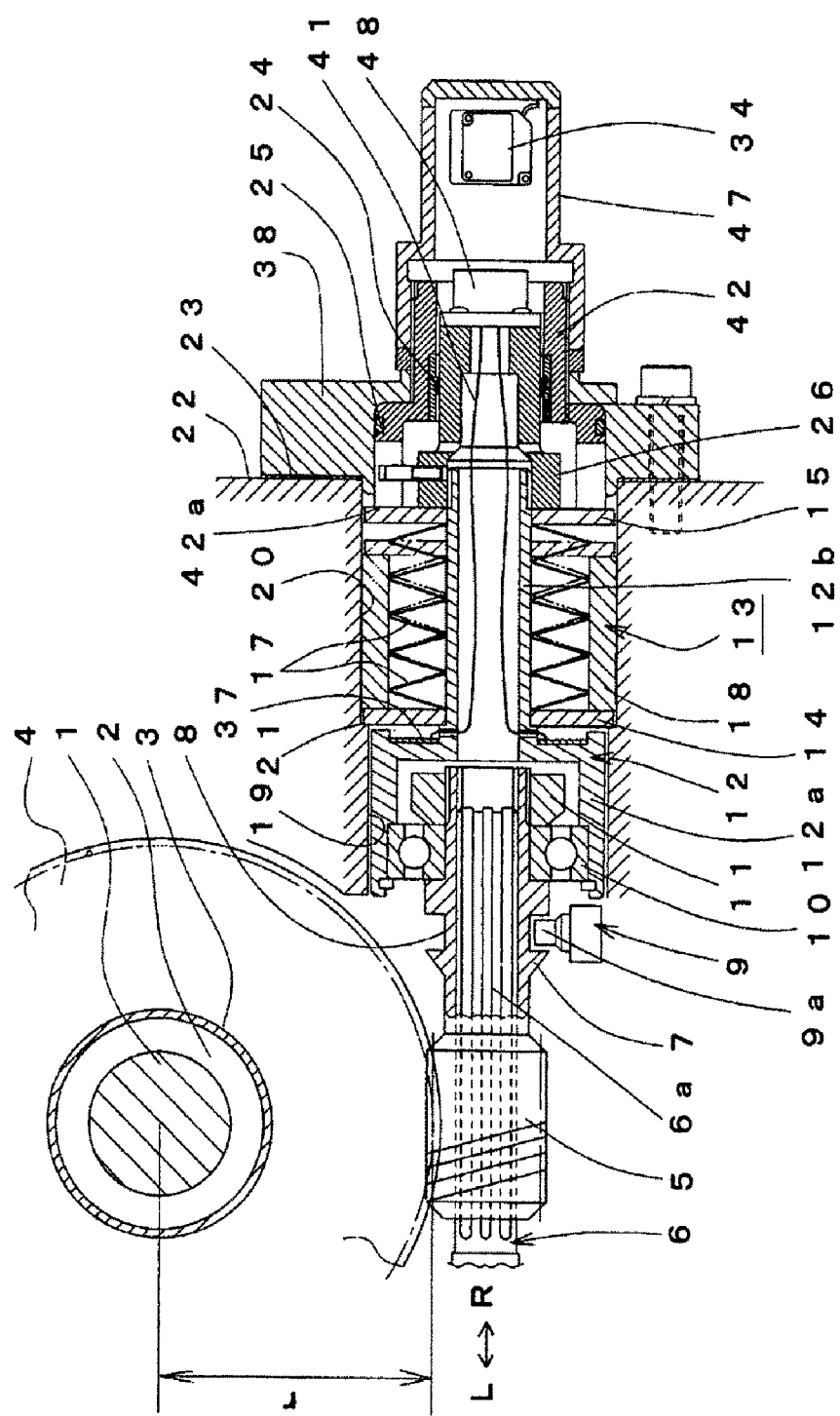
FIG. 5 is a sectional view showing a state that a laser sensor is solely attached to an electrically operated valve shown in FIG. 2.

Further, in the second electrically operated valve driving system (see FIG. 2), in a case that the strain gauge 37 has already been calibrated, on the basis of this, the compression force acting on the spring cartridge 13 can be acquired at both of close operation and open operation (for example, as described later, the compression force acting on the spring cartridge 13 and the compression amount may be measured always so that a torque curve may be acquired. Then, on the basis of a change in the torque curve, degradation in the spring cartridge 13 may be diagnosed). From the viewpoint of taking this advantage or the like, as shown in FIG. 5, in place of the cap 46, a sensor holder 47 provided only with the laser sensor 34 may be attached.

From a similar viewpoint and in order to avoid in advance that grease enclosed in the valve element driving section causes difficulty in the measurement of the reflected light in the laser sensor and that grease leaks from the valve element driving section side at the time of attachment and detachment of the sensor holder, FIGS. 9-13 show a measurement structure provided with a contact element 70.

Figure 9:
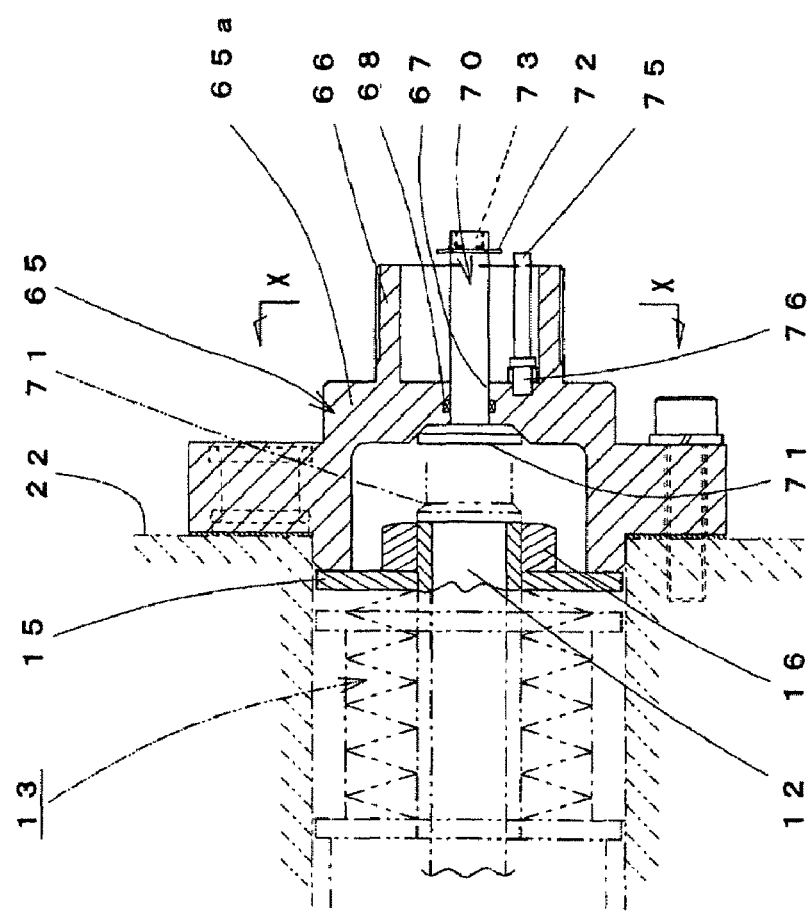
FIG. 9 is a sectional view showing another example of structure of a driving section of an electrically operated valve of a type with a built-in torque sensor.

In FIG. 9, numeral 65 indicates an adaptor fix by bolting on the end face 22 of the casing 1 in manner enclosing the nut 16 attached to the end of the movable shaft 12 on the spring cartridge 13 side. The adaptor 65 has an end face wall 65a opposing the nut 16, while on the outer surface side of the end face wall 65a, a cylinder section 66 having an outer periphery surface where a thread is engraved is formed in an integrated manner. In the axis center position of the end face wall 65a, a boss 67 is provided, while a contact element 70 described below is fit into the boss 67 in a manner freely slidable in the axial direction. Further, shaft seal is performed by an O-ring 68 provided in the boss 67.

In the contact element 70, one end near the nut 16 has an abutting body 71 having the shape of a larger diameter disk, while a C-ring 72 is attached to the other end. Then, the contact element 70 can move between a non-usage position where the contact element 70 moves outward in the axial direction so that the abutting body 71 abuts against and engages with the inner surface of the end face wall 65a as indicated by a solid line in FIG. 9 and a usage position where the contact element 70 moves inward in the axial direction so that the abutting body 71 abuts against and engages with the top surface of the nut 16 or the end face of the movable shaft 12 as indicated by a dash-dotted line in the figure. Further, in the other end face of the contact element 70, a threaded hole 73 is provided for linking an extension rod 81 described later.

Figure 10:
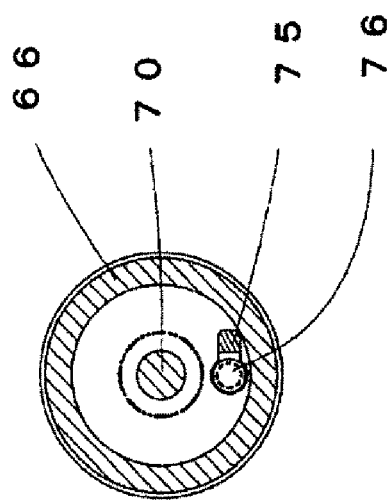
FIG. 10 is a view taken in the arrow X-X direction of FIG. 9.

Further, in the inner side of the cylinder section 66 of the adaptor 65, as shown in FIGS. 9 and 10, a stopper 75 formed in an approximate L shape is pivotably supported on the end face wall 65a side by a pin 76, and hence rotatable about the pin 76 serving as a rotation center. At that time, the stopper 75 has a length dimension such that the tip part should protrude from the end face of the cylinder section 66 to the outward by a predetermined dimension and could engage with the internal surface of the C-ring 72 on the contact element 70 side located at the non-usage position.

Then, when no external force is acting on the stopper 75 as shown in FIGS. 9 and 10, the stopper 75 rotates by self-weight, and thereby abuts against the inner periphery surface of the cylinder section 66, so that its position is held. On the other hand, in a state that a cap 69 is attached to the cylinder section 66 as shown in FIGS. 11 and 12, the stopper 75 rotates toward the axis center of the cylinder section 66, and then is held at a position between the outer surface of the end face wall 65a and the C-ring 72 on the contact element 70 side located at the non-usage position.

Figure 11:
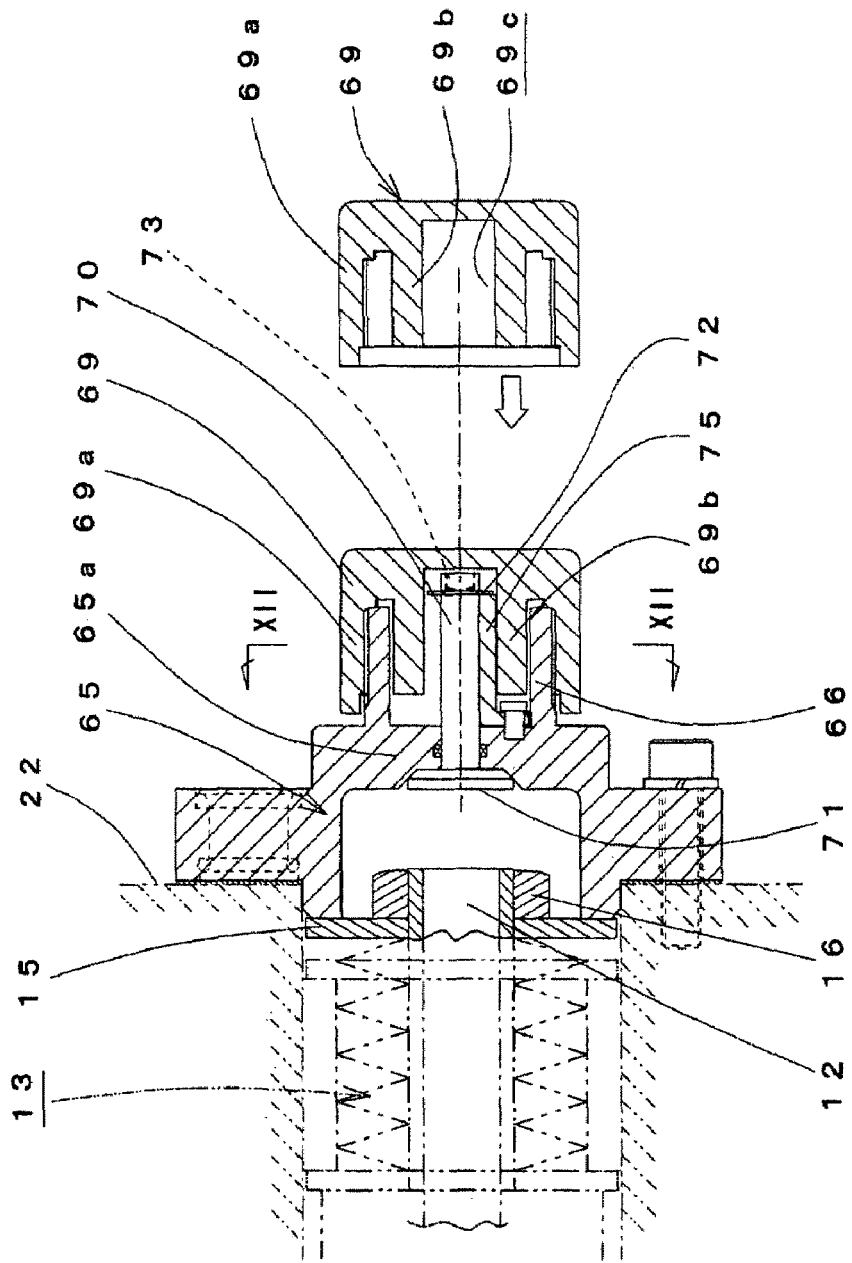
FIG. 11 is a sectional view showing a state that a cap is attached to an end of a driving section shown in FIG. 9.
Figure 12:
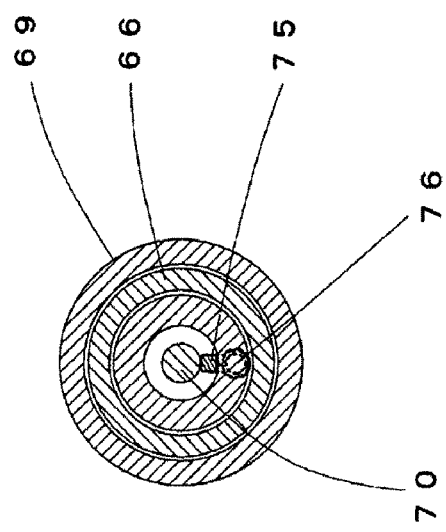
FIG. 12 is a view taken in the arrow XII-XII direction of FIG. 11.

As shown in FIG. 11, the cap 69 has the shape of a closed-end double cylinder provided with an outer cylinder 69a and an inner cylinder 69b. On the inner surface side of the outer cylinder 69a, an inner thread is formed for screwing and fitting to the outside of the cylinder section 66 of the adaptor 65. Further, in the inner side of the inner cylinder 69b, an internal hollow section 69c is formed into which the stopper 75 can fit.

Thus, as shown in FIG. 11, in a state that the cap 69 is attached to the adaptor 65, the contact element 70 is fixed at the non-usage position by the stopper 75 so that movement from the non-usage position to the usage position is restricted. Thus, the contact element 70 is always in a state non-contacting with the spring cartridge 13 side, and hence never disturbs the operation of the spring cartridge 13.

Figure 13:
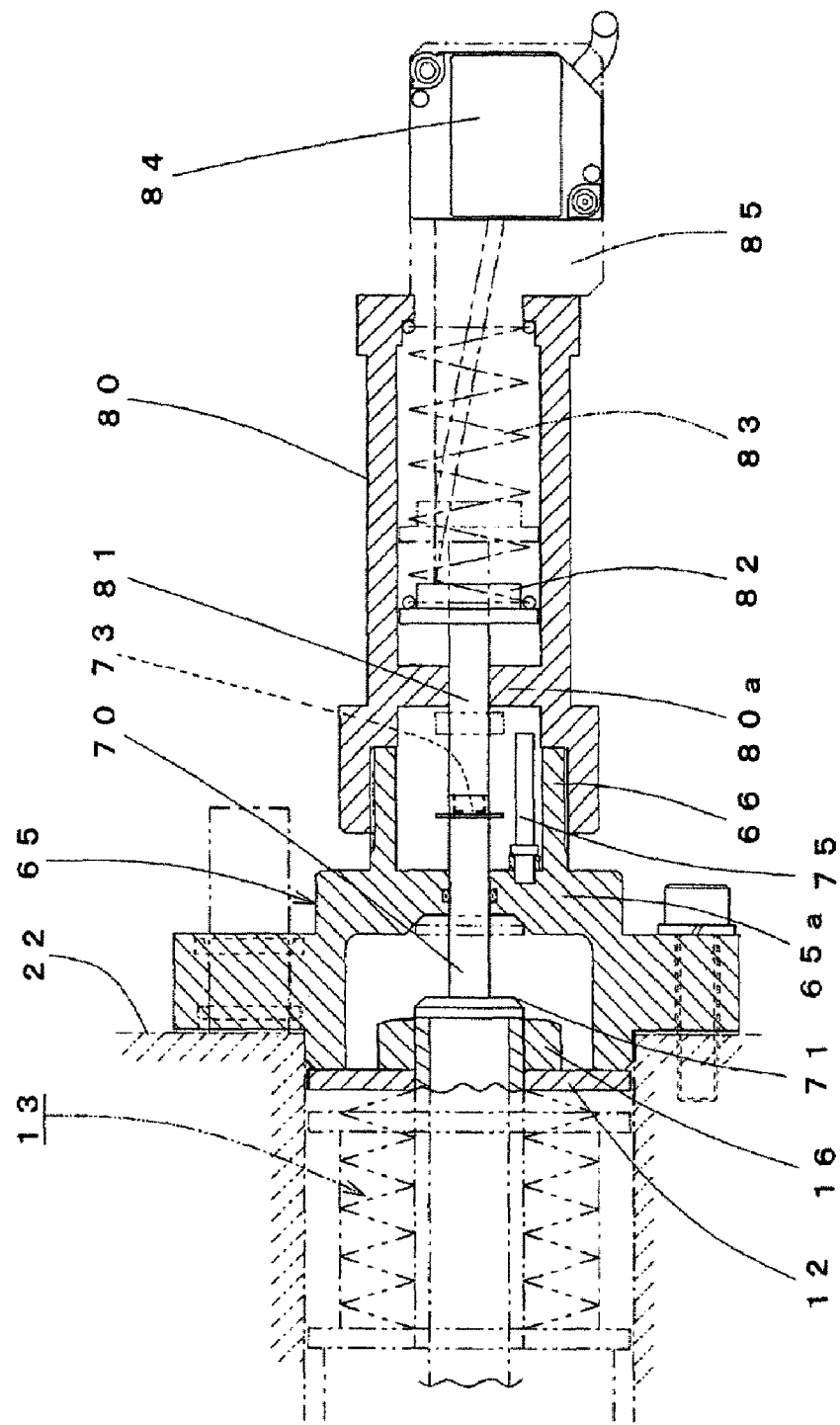
FIG. 13 is a sectional view showing a state that a sensor holder is attached to an end of a driving section shown in FIG. 9.

On the other hand, when the compression amount of the spring cartridge 13 is measured, as shown in FIG. 13, the cap 69 is removed from the adaptor 65. Then, a sensor holder 80 described below is attached in place of the cap 69. The sensor holder 80 is composed of a cylinder provided with a partition wall 80a at a middle position in the axial direction. Then, when one end side is screwed and fit to the cylinder section 66 of the adaptor 65, the sensor holder 80 is attached to the adaptor 65 side. On the other end side of the sensor holder 80, a laser sensor 84 is attached via a bracket 85.

Further, in the partition wall Boa of the sensor holder 80, an extension rod 81 is attached in a manner going through the wall in the axial direction. In the extension rod 81, one end is screwed into the threaded hole 73 of the other end of the contact element 70, so that the extension rod 81 is linked and thereby integrated with the contact element 70. On the other hand, a measurement body 82 is provided on the other end side of the extension rod 81 in an integrated manner. Then, a spring 83 is provided in a compressed manner between the measurement body 82 and the other end of the sensor holder 80. Then, the extension rod 81 and the contact element 70 linked with this are pressed in an integrated manner toward the spring cartridge 13 side by the biasing force of the spring 83. The abutting body 71 of the contact element 70 is always pressed against and in contact with the top surface of the nut 16 or alternatively the end face of the movable shaft 12.

Thus, in the state shown in FIG. 13, when the electrically operated valve is operated so that the movable shaft 12 displaces in the axial direction, the contact element 70 and the extension rod 81 move in an integrated manner in association with the displacement of movable shaft 12. The amount of this movement is measured when the laser sensor 84 measures the amount of displacement of the measurement body 82 with adopting as the measurement point the end face of the measurement body 82 serving as the reflecting surface for the laser light. As a result, the compression amount of the spring cartridge 13 can be measured continuously at both of close operation and open operation of the electrically operated valve.

Further, for example, in the laser sensor 34 provided in the sensor unit 30 shown in FIG. 3 or alternatively the sensor unit 40 shown in FIG. 4, the top surface of the nut 16 serving as the measurement point of the laser sensor 34 is located in a part where grease for the valve element driving section is enclosed. Thus, grease adhering to the top surface of the nut 16 prevents accurate measurement. However, according to the structure of the present example, as shown in FIG. 13, the contact element 70 goes through the end face wall 65a of the adaptor 65 in an oil-tight manner, and then extends to the outside. Then, the extension rod B provided with the measurement body 82 serving as the measurement point of the laser sensor 34 is linked to the end of the outer side of this contact element 70. Thus, the position of the measurement body 82 can be measured by the laser sensor 34 without disturbance from the grease enclosed in the valve element driving section. This permits precise measurement.

Further, the attachment and detachment of the sensor holder 80 does not require the attachment and detachment of the adaptor 65. This avoids in advance that the grease enclosed in the valve element driving section side leaks at the time of attachment and detachment of the sensor holder 80.

Here, the sensor unit 30 and the sensor unit 40 attached temporarily to the first and the second electrically operated valve driving systems employ the laser sensor 34 as measurement means for the worm position. This realizes a compact configuration, and permits all-the-time continuous data acquisition.

"Diagnosing method on driving force of electrically operated valve and example of apparatus"

The following description is given for a diagnosing method and a diagnosing apparatus in which the invention of the present application is applied so that diagnosis on an electrically operated valve, in particular, diagnosis on the torque, is performed using diagnosis data acquisition means such as the sensor unit 30 and other strain gauges.

First, the basic idea of the diagnosing method according to the invention of the present application is described below. As described above, the sensor unit 30 is attached at the time of diagnosis. The strain gauge 37 is installed permanently. The magnetic sensor 60 can easily be installed in the outside of the electrically operated valve, and hence need not be installed permanently unless desired. That is, the magnetic sensor 60 may be installed permanently, or alternatively attached only at the time of diagnosis. Thus, the following description is given for the case that the magnetic sensor 60 is installed permanently in the conduit tube 61. Further, the strain gauges 51 and 52 arranged in the yoke 50 do not cause a problem in the operation of the electrically operated valve even when the strain gauges 51 and 52 are installed permanently. Thus, the strain gauges 51 and 52 are installed permanently. In contrast, if the strain gauge 55 arranged in the valve rod 1 were installed permanently, the strain gauge 55 could be wound in when the valve rod 1 moves up and down in the axial direction in association with the open and close operation of the valve. Thus, in this example, as described later, the fact is utilized that correlation exists between the valve rod stress and the yoke stress and that on the basis of this correlation, the valve rod stress can be calculated on the basis of the yoke stress that can always be acquired by measurement. Thus, the strain gauge 55 is installed in the valve rod 1 only at the time of acquisition of the correlation, and not installed otherwise.

Meanwhile, it is extremely tedious that diagnosis data is acquired directly by using each of the sensors at each time of diagnosis on each of the diagnosis items of the electrically operated valve. This situation is not preferable also from the viewpoint of efficiency improvement of the diagnosis work. Thus, according to the diagnosing method of the invention of the present application, although diagnosis data is acquired at the first time by using the above-mentioned sensors and the like, correlation between the data is obtained on the basis of the data acquired at the first time, so that the correlation is possessed as a correlation database. Then, in the next and the subsequent occasions, data that can be acquired comparatively easily is solely measured. Then, with reference to the database, another data corresponding to the measurement data is read out, so that on the basis of the read-out data, diagnosis is performed on the necessary diagnosis item. As a result, the efficiency of the diagnosis work is improved. In the following description, the diagnosing method of the invention of the present application and the like are explained with reference to several embodiments.

I: First Embodiment

A diagnosing method and a diagnosing apparatus according to a first embodiment is applied to an electrically operated valve in which as shown in FIG. 1, a strain gauge is not provided on the spring cartridge 13 side, while at the time of normal operation, a cap 38 is attached on the outer end side in the axial direction of the spring cartridge 13, and in which at the time of diagnosis of the electrically operated valve, as shown in FIG. 3, the sensor unit 30 is attached temporarily in place of the cap 38. The present embodiment corresponds to aspects 1, 2, 3, 5, and 8 concerning the diagnosing method of the invention as well as aspects 9, 10, 11, 13, and 16 concerning the diagnosing apparatus.

Figure 14:
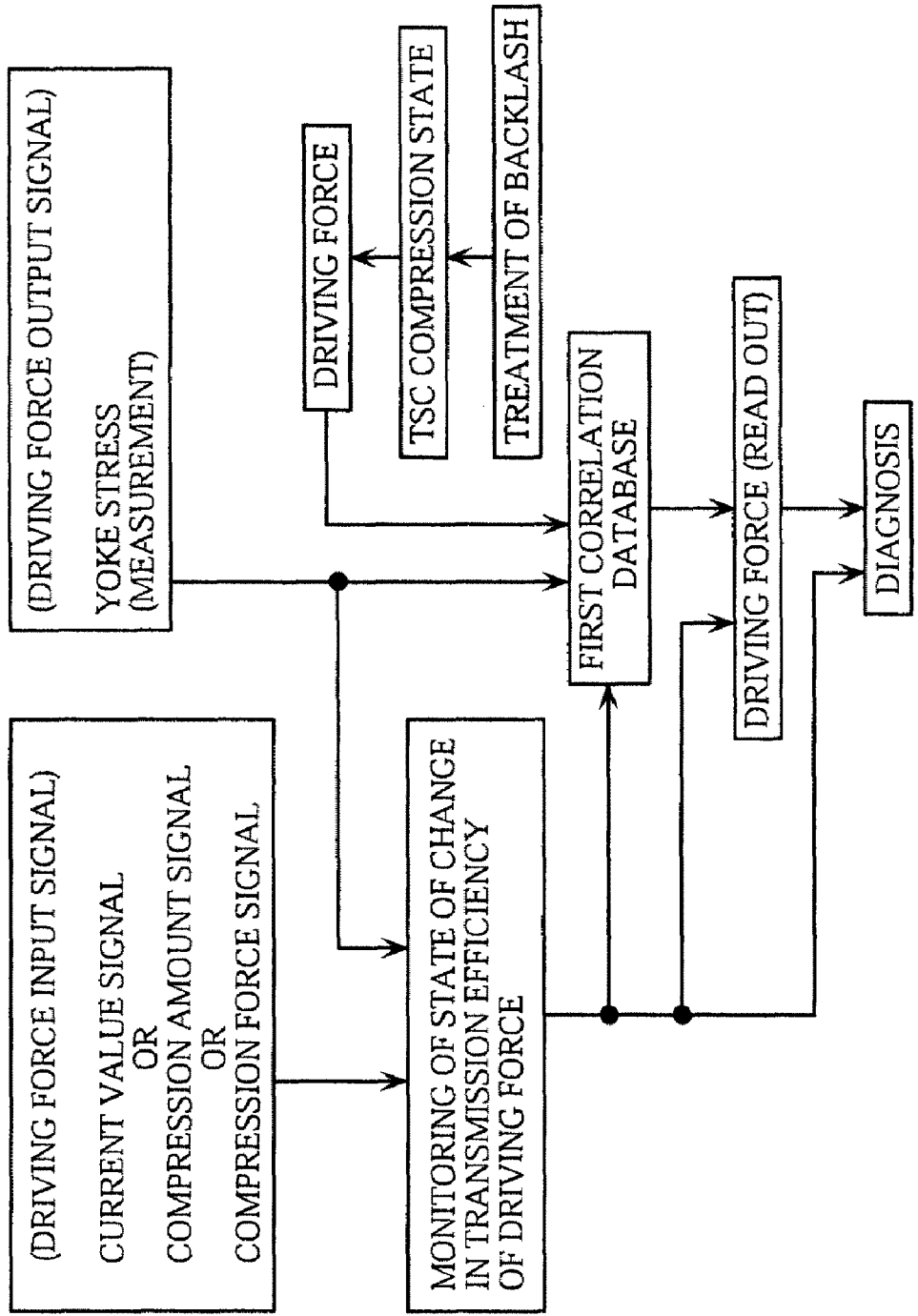
FIG. 14 is a functional block diagram in a diagnosing method for an electrically operated valve according to a first embodiment of the invention of the present application.

That is, as shown in FIG. 14, two major diagnosis modes are provided. One of these is a first diagnosis mode for diagnosing the driving force on the basis of the yoke stress acquired by measurement and a first correlation database between the yoke stress and the driving force. The other one is a second diagnosis mode in which on the basis of the driving force inputted to the valve element driving section and the driving force outputted from the valve element driving section, a state of change is monitored in a transmission efficiency of the driving force in the valve element driving section, so that the state of change is reflected into the first diagnosis mode.

I-A: First Diagnosis Mode

First, the first diagnosis mode is described below. In this diagnosis mode, at both of open operation and close operation of the electrically operated valve, correlation is acquired between the yoke stress and the driving force that is obtained from the compression state of the spring cartridge 13, and then possessed as a first correlation database.

Figure 15:
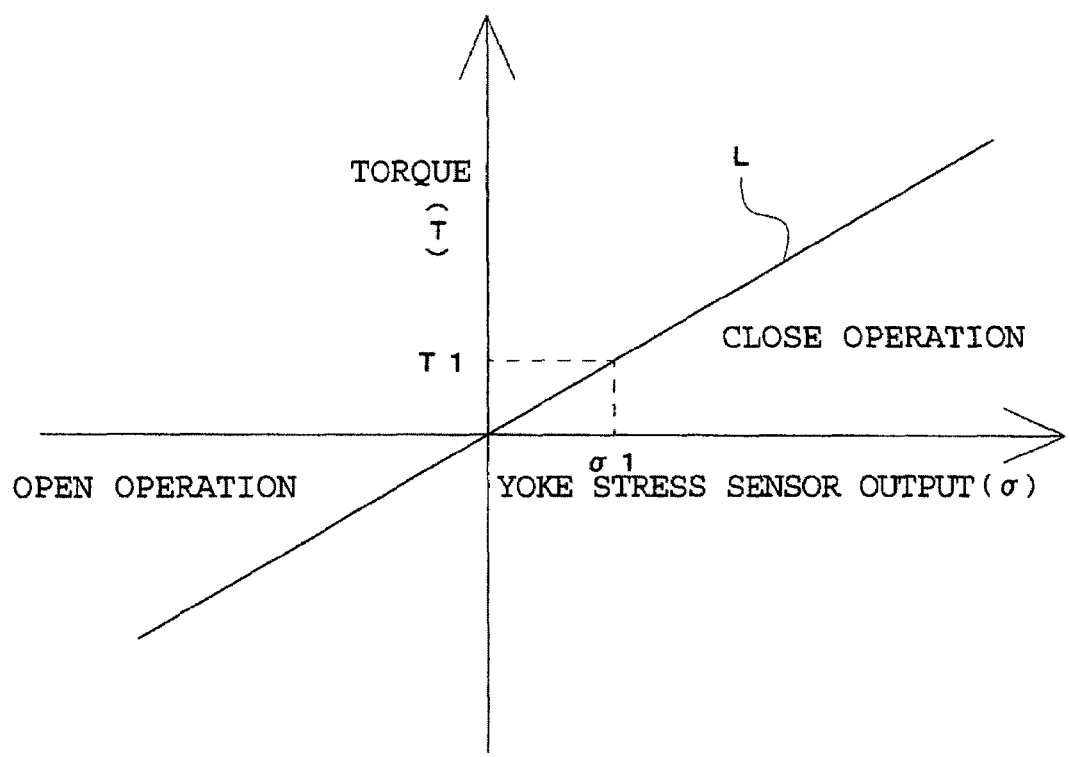
FIG. 15 is an explanation diagram of a correlation database.

Here, the first correlation database is acquired between information values having correlation. The yoke stress acting on the yoke 50 is a reaction force of the valve rod stress acting on the valve rod 1, and recognized as driving force output from the valve element driving section. Further, the torque acting on the stem nut 2 is as a product between the compression force of the spring cartridge 13 and the radius dimension of the worm wheel 4, while correlation exists between this driving force (treated as a "torque", here) and the yoke stress. Thus, as shown in FIG. 15, a correlation curve L is set up with adopting the torque and the yoke stress as parameters. This is adopted as the first correlation database.

Here, in the present embodiment, as described above, a strain gauge is not provided on the spring cartridge 13 side, while the sensor unit 30 is provided. Thus, because of the structure of the sensor unit 30, the compression force at open operation cannot be acquired by measurement. Accordingly, the sensor unit 30 acquires the compression force and the compression amount at close operation of the spring cartridge 13 and the compression amount at open operation. Then, after the spring characteristics of the spring cartridge 13 is first acquired on the basis of the compression force and the compression amount at close operation, a compression force corresponding to the compression amount at open operation is read from the spring characteristics. Then, on the basis of this, a compression force at both of open operation and close operation is obtained. Then, on the basis of this compression force, a driving force is acquired by arithmetic operation and then held.

In this case, a dimensional tolerance, that is, a "backlash", unavoidably arises between the axial length of the spring cartridge 13 and the end-face-to-end-face distance of the spring cartridge accommodating section on the valve element driving section side. Thus, in the measurement of the compression amount of the spring cartridge 13, unless the compression amount is acquired in a state that the amount of backlash is removed, an accurate compression amount is not obtained, and hence reliability is not ensured in the first correlation database itself. Thus, in the present embodiment, the invention according to claim 8 is applied. That is, "treatment of backlash" is performed in the acquisition process for the driving force, so that an accurate compression amount is obtained. Then, on the basis of this accurate compression amount, the driving force is acquired. This "treatment of backlash" is described later.

After the first correlation database is acquired and possessed as described above, in the next and the subsequent occasions of diagnosis, the yoke stress which can always be measured easily from the outside of the electrically operated valve and which serves as the driving force output signal from the valve element driving section is solely acquired by measurement. Then, with reference to the first correlation database, a torque (torque T in FIG. 15) corresponding to the yoke stress (yoke stress a in FIG. 15) acquired by measurement is read out. Then, on the basis of this read-out torque, the driving force of the electrically operated valve is diagnosed.

As shown in FIG. 6, the yoke stress is acquired by the strain gauges 51 and 52 arranged in the yoke 50. In this case, in the present embodiment, the attaching positions of the strain gauges 51 and 52 relative to the yoke 50 are set up as follows. That is, the yoke 50 has a bifurcated shape provided with a pair of right and left supporting rods 53 and 54 arranged across between the lower flange section 56 abutted against and fixed to the valve box 61 side and the upper flange section 57 abutted against and fixed to the valve element driving section 62 side as described above. Further, the valve rod 1 is arranged at the middle position between the pair of supporting rods 53 and 54 in a state of penetrating in the up and down directions.

Then, the strain gauges 51 and 52 are stuck respectively at positions near the inner centers of the pair of supporting rods 53 and 54 of the yoke 50. The present applicant and the like have confirmed, by experiment, that the inner center positions of the supporting rods 53 and 54 at which the strain gauges 51 and 52 are stuck are sites where a large strain amount is generated stably in the yoke 50. Thus, when the strain gauges 51 and 52 are arranged at these positions, the yoke stress acquired by measurement using the strain gauges 51 and 52 becomes reliable, and so does the torque that is read out in correspondence to the yoke stress with reference to the first correlation database. This improves further the precision and the reliability in the diagnostic result of the electrically operated valve.

Figure 41:
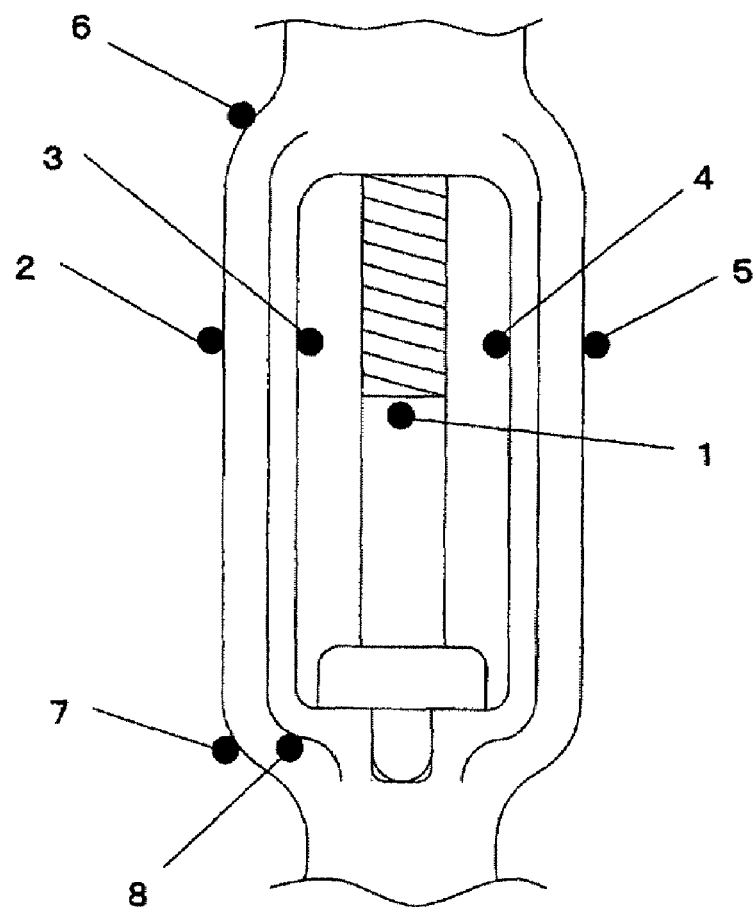
FIG. 41 is a yoke stress sensor arrangement diagram in an experiment for checking the distribution of a yoke stress.

Here, FIG. 41 is an arrangement diagram of the yoke stress sensors (strain gauges) in a yoke where a check experiment has been carried out for the yoke stress distribution in the yoke. Here, the sensor 1 is arranged on the valve rod and measures the valve rod stress directly. The sensors 2 and 5 are arranged near the outer center of the yoke. The sensors 3 and 4 are arranged near the inner center of the yoke. The sensor 6 is arranged on the outer side of the upper shoulder part of the yoke. The sensor 7 is arranged on the outer face of the lower shoulder part of the yoke. The sensor 8 is arranged on the side face of the lower shoulder part of the yoke.

Figure 42:
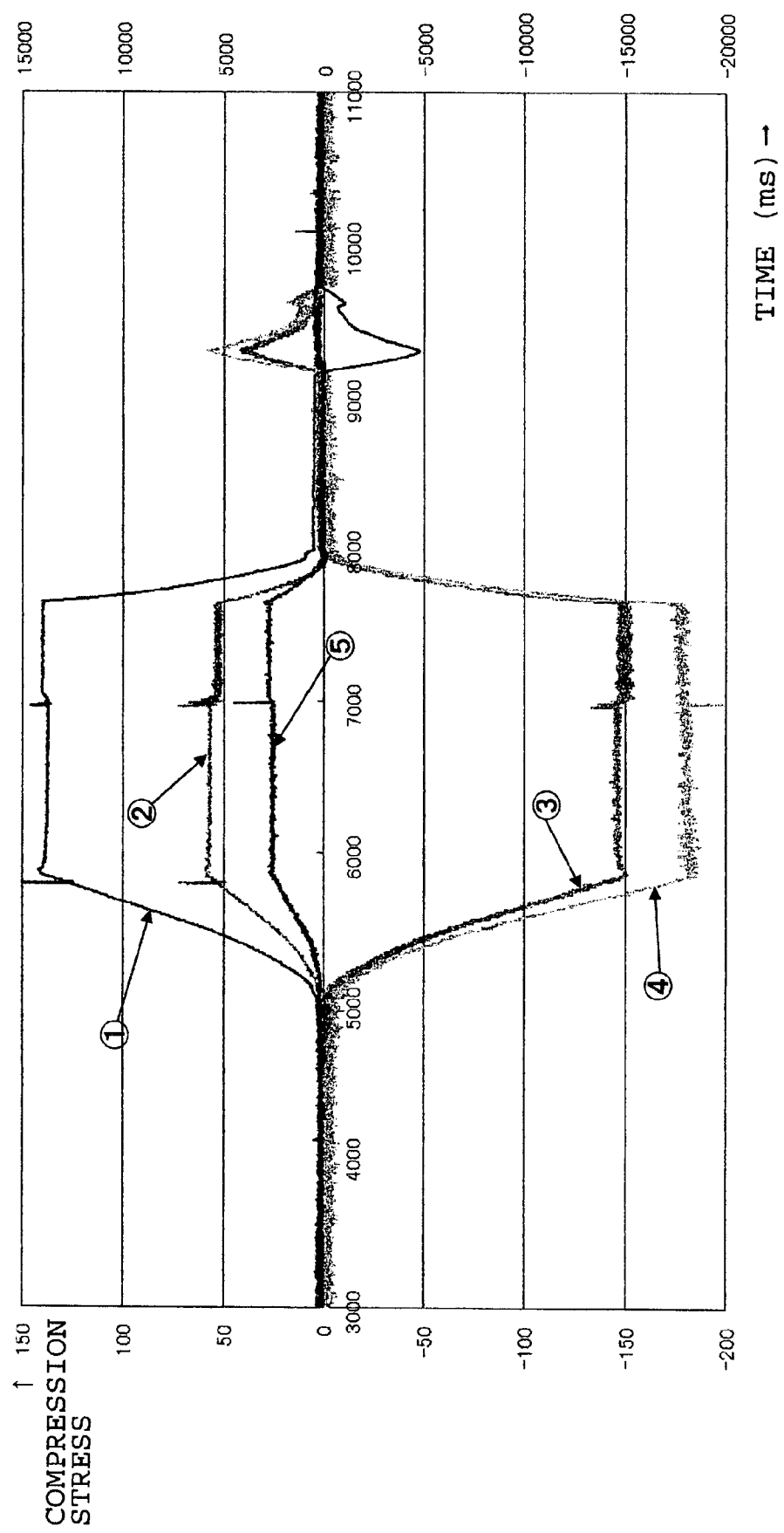
FIG. 42 shows distribution data of a yoke strain.
Figure 43:
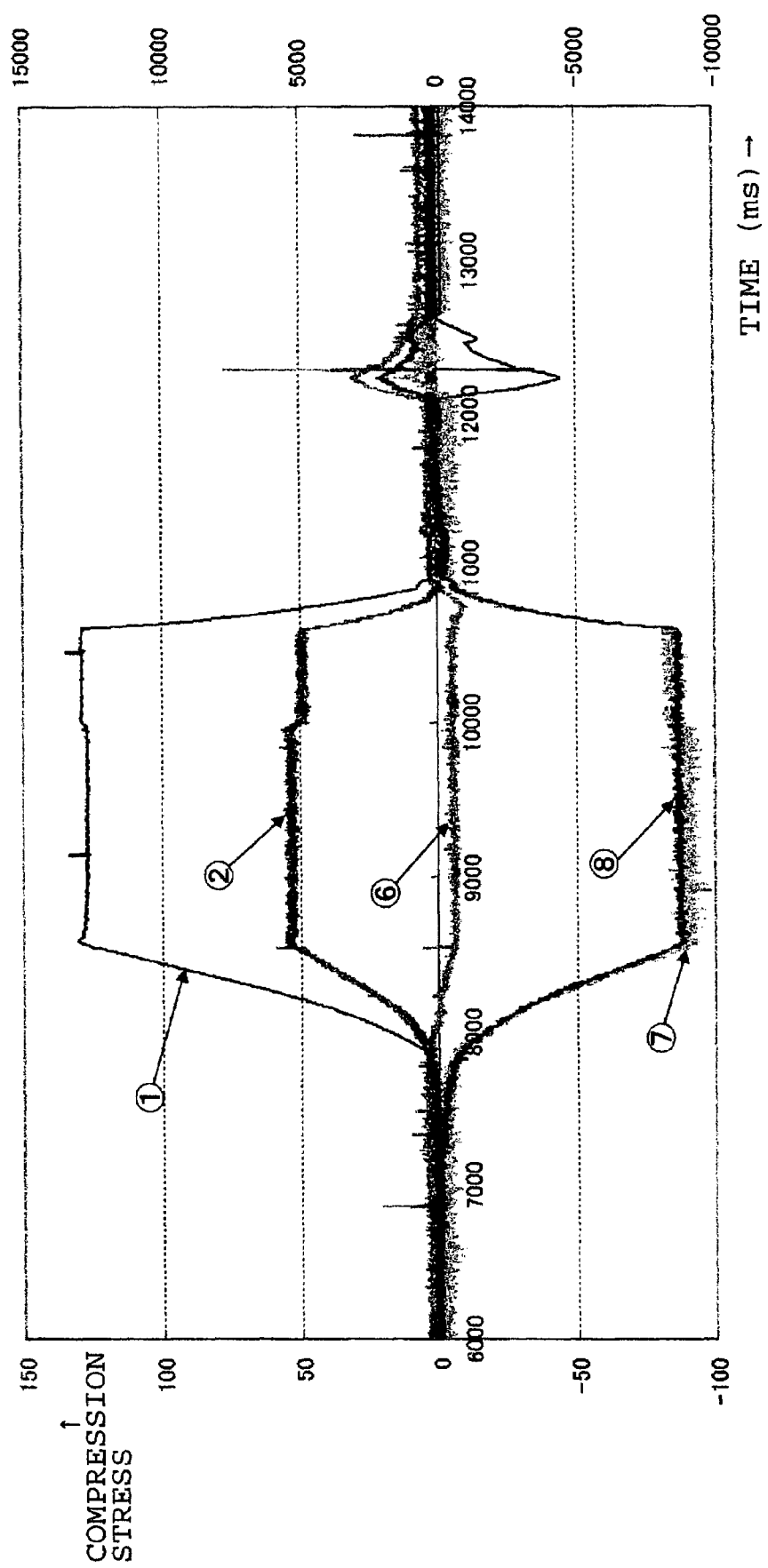
FIG. 43 shows distribution data of a yoke strain.

Then, the measurement data of the yoke stress obtained by these sensors is shown in FIGS. 42 and 43. As seen from the data, the outputs (strain amounts) of the sensor 3 and the sensor 4 among these sensors are largest and stable. With taking into consideration these experimental results, in the present embodiment, as described above, the strain gauges 51 and 52 are arranged respectively at positions near the inner centers of the pair of supporting rods 53 and 54 of the yoke 50.

Further, the strain gauges 51 and 52 are arranged respectively at symmetrical positions across the valve rod axis center part in the yoke 50, while the average of the output values of the strain gauges 51 and 52 is acquired as the yoke stress. This configuration improves further the reliability in the measured value itself of the yoke stress measured by the strain gauges 51 and 52. As a result, further improvement is expected in the precision and the reliability in the diagnostic result of the electrically operated valve.

In this case, between the strain gauges, a slight variation in the output characteristics is unavoidably caused by the manufacturing tolerance. Thus, it is preferable that the pair of strain gauges 51 and 52 attached to the yoke 50 of the same electrically operated valve are selected from those having similar output characteristics. Such setup improves further the above-mentioned effect, that is, the reliability in the measured value of the yoke stress which is achieved by acquiring the yoke stress as the average of the output values of the strain gauges 51 and 52.

Further, it is preferable that the employed strain gauge has a structure that a metal flange is attached to the sensor element part. In the strain gauge having this structure, when the strain gauge is attached to the yoke 50 of the electrically operated valve, the flange part can be welded to the surface of the yoke 50 by spot welding. This avoids, for example, the necessity that when the strain gauge is to be stuck to the surface of the yoke 50 with adhesive, the next work (such as diagnosis data measurement at open and close operation of the valve) should be stopped until the adhesive has cured so that an adhesive strength is obtained. This allows the strain gauge to be attached in a remarkably short time, and permits almost simultaneous attachment of a plurality of strain gauges. Thus, this is remarkably advantageous from the viewpoint of simplifying the strain gauge attaching work and speeding up the work. Here, the strain gauge attached to the yoke 50 is often exposed to moisture such as rain. Thus, it is preferable that the employed strain gauge is of a water-proof type in which the sensor element is molded completely.

According to this first diagnosis mode, the first correlation database is possessed as a database (see FIG. 15) indicating the correlation between the yoke stress acting on the yoke and the torque obtained from the compression force of the spring cartridge 13. Then, when the first correlation database is referred to, a torque (torque T in FIG. 15) corresponding to the yoke stress (yoke stress σ in FIG. 15) acquired by measurement is read out. Thus, in the subsequent occasions of diagnosis, only the yoke stress may be acquired by measurement. Then, when with reference to the first correlation database, the torque obtained from the compression force of the spring cartridge 13 is read out, the driving force of the electrically operated valve is diagnosed on the basis of this torque. Thus, for example, in comparison with a case that in each occasion of diagnosis on the driving force of the electrically operated valve, the torque obtained from the compression force of the spring cartridge is acquired so that the diagnosis is performed, the diagnosis work becomes remarkably simple. Further, the work can be performed with good workability. This labor saving accelerates reduction in the diagnosis cost.

Further, in this case, the yoke stress is the stress acting on the yoke 50 exposed to the outside of the electrically operated valve, and hence can be measured from the outside of the electrically operated valve. Thus, the measurement that the strain gauges 51 and 52 are attached here so that the stress corresponding the strain amount, that is, the yoke stress, is acquired becomes remarkably easy in comparison with, for example, a case that a part of the electrically operated valve is opened while a strain gauge is installed in the inside so that the stress is measured. This improves further the diagnosis workability. Further, this labor saving reduces further the diagnosis cost.

The above-mentioned "treatment of backlash" is described below in detail. As described above, the "backlash" of the spring cartridge 13 causes a problem when the compression force at open operation is to be acquired on the basis of the correlation data between the compression amount and the compression force at close operation as well as the compression amount at open operation.

That is, in the present configuration, as described above, the compression amount of the spring cartridge 13 is not acquired directly from the measurement of the two ends, but measured by the laser sensor 34 in the sensor unit 30 as the movement amount in the direction of the worm shaft of the nut 16 that moves in a manner integrated with the worm 5 as shown in FIG. 3. On the other hand, as shown also in FIG. 1, the axial length of the spring cartridge 13 in the isolated state is defined by the outer dimension of a pair of the washers 14 and 15 located at the two ends of the direction of the successively installed dish springs 7. Further, in the spring cartridge 13, when one washer 14 abuts against the step surface 21 between the larger diameter hole 20 and the smaller diameter hole 19 of the casing, the movement in the arrow L direction is restricted. When the other washer 15 abuts against the end face 36a of the core 36 arranged in the inside of the adaptor 31 abutted against and fixed to the end face 22 of the casing, the movement in the arrow R direction is restricted.

In this case, when the axial length of the spring cartridge 13 agrees with the interval dimension between the step surface 21 and the end face 36a of the core 36, the movement amount of the nut 16 may be measured and acquired as the compression amount of the spring cartridge 13. That is, the relation "nut movement amount=spring cartridge compression amount" holds always, so that no problem arises even when the "spring cartridge compression amount" acquired indirectly from the nut movement amount is adopted as the above-mentioned "compression amount".

Nevertheless, as a matter of practice, the fabrication tolerances in the spring cartridge 13, the adaptor 31, and the like, their assembling tolerances, and "fatigue" and or like in the packing 23 cause a dimensional difference, that is, a "backlash", unavoidably between the axial length of the spring cartridge 13 and the interval dimension between the step surface 21 and the end face 36a of the core 36. Thus, under the presence of the "backlash", the movement amount (movement distance) of the nut does not agree with the actual compression amount of the spring cartridge 13. Thus, when the movement amount of the nut 16 is measured and acquired as the compression amount of the spring cartridge 13 so that the acquired "nominal compression amount" is adopted as the above-mentioned "compression amount", a problem arises as described later.

First, the following description is given for a general technique in which the compression amount of the spring cartridge 13 is acquired indirectly from the movement amount (movement distance) of the nut 16 at the time that the electrically operated valve performs close operation and then performs open operation.

Figure 21:
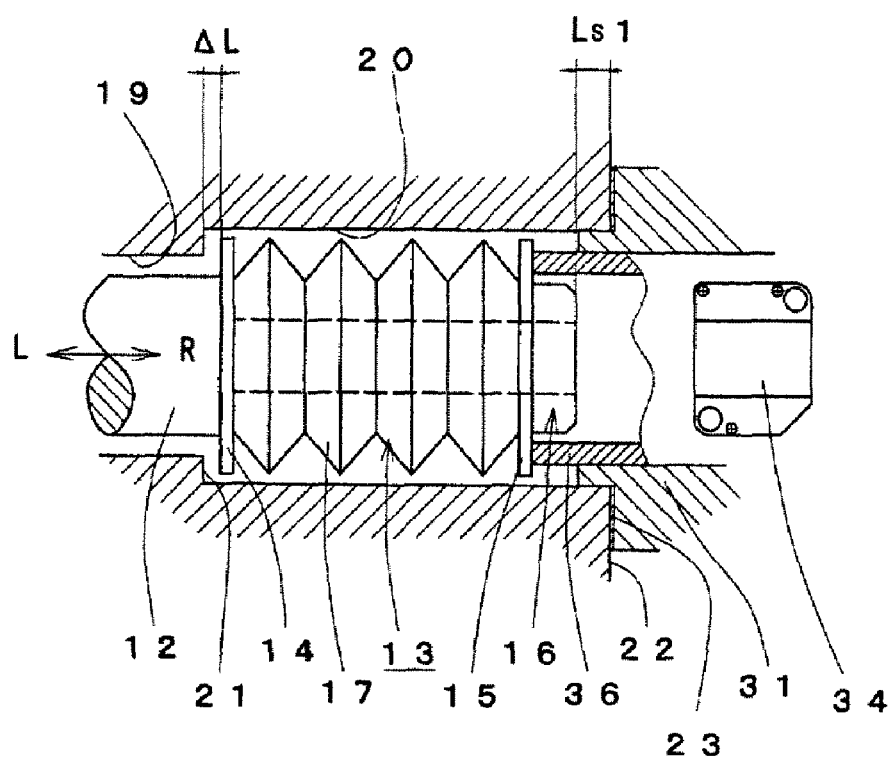
FIG. 21 is a schematic diagram showing a state before the start of close operation in a spring cartridge.

FIG. 21 shows the spring cartridge 13 in a state that close operation is not yet started in the electrically operated valve. In the state that close operation is not yet started in the electrically operated valve, the spring cartridge 13 is brought into a state of being below the compressed load, while the one washer 15 abuts against the end face 36a of the core 36. At that time, the other washer 14 of the spring cartridge 13 opposes the step surface 21 with a gap of a backlash ΔL. Then, the laser sensor 34 measures the distance Ls1 from the end face 22 to the nut 16 with adopting the end face 22 of the casing as a measurement reference position.

Figure 22:
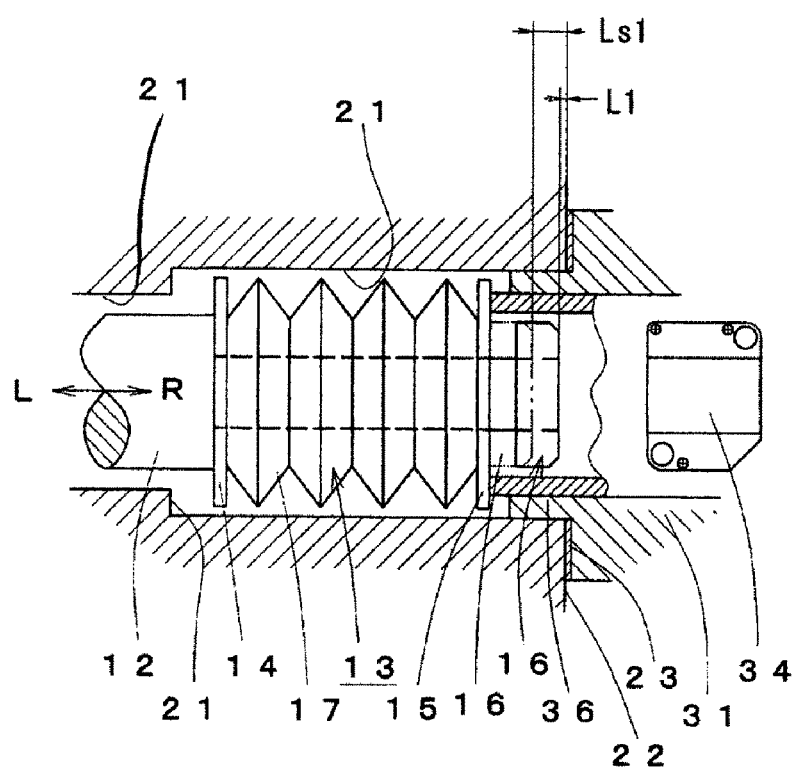
FIG. 22 is a schematic diagram showing a state during close operation in a spring cartridge.

When the worm 5 moves from the state shown in FIG. 21 in the close operating direction, as shown in FIG. 22, the movable shaft 12 moves in the arrow R direction in a manner integrated with the worm 5, so that the spring cartridge 13 is compressed. At that time, the laser sensor 34 measures the distance L1 from the end face 22 to the nut 16 with adopting the end face 22 of the casing as a measurement reference position. Thus, the compression amount at close operation of the spring cartridge 13 is obtained as Ls1-L1.

Figure 23:
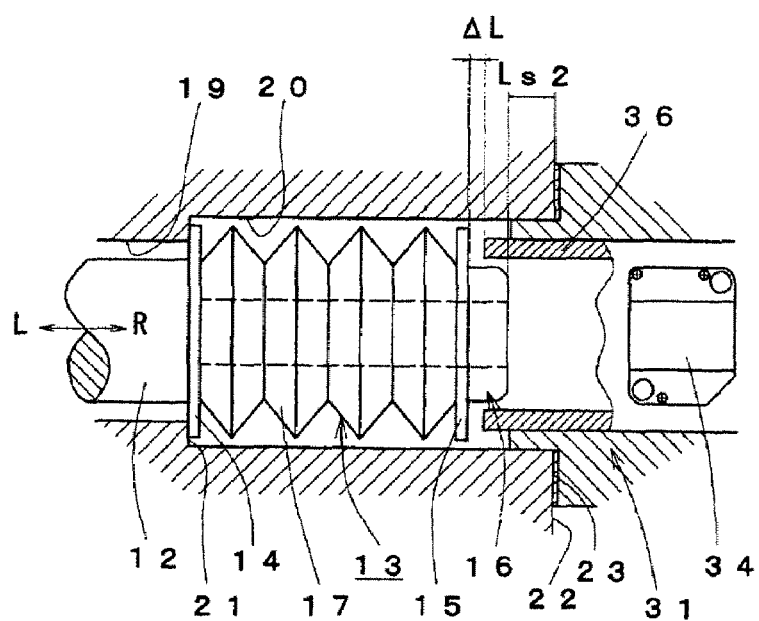
FIG. 23 is a schematic diagram showing a state before the start of open operation in a spring cartridge.

On the other hand, FIG. 23 shows the spring cartridge 13 in a state that open operation is not yet started in the electrically operated valve. In the state that open operation is not yet started in the electrically operated valve, the spring cartridge 13 is brought into a state of being below the compressed load, while the other washer 14 abuts against the step surface 21. At that time, the one washer 15 of the spring cartridge 13 opposes the end face 36a of the core 36 with a gap of a backlash ΔL. Then, the laser sensor 34 measures the distance Ls2 from the end face 22 to the nut 16 with adopting the end face 22 of the casing as a measurement reference position.

Figure 24:
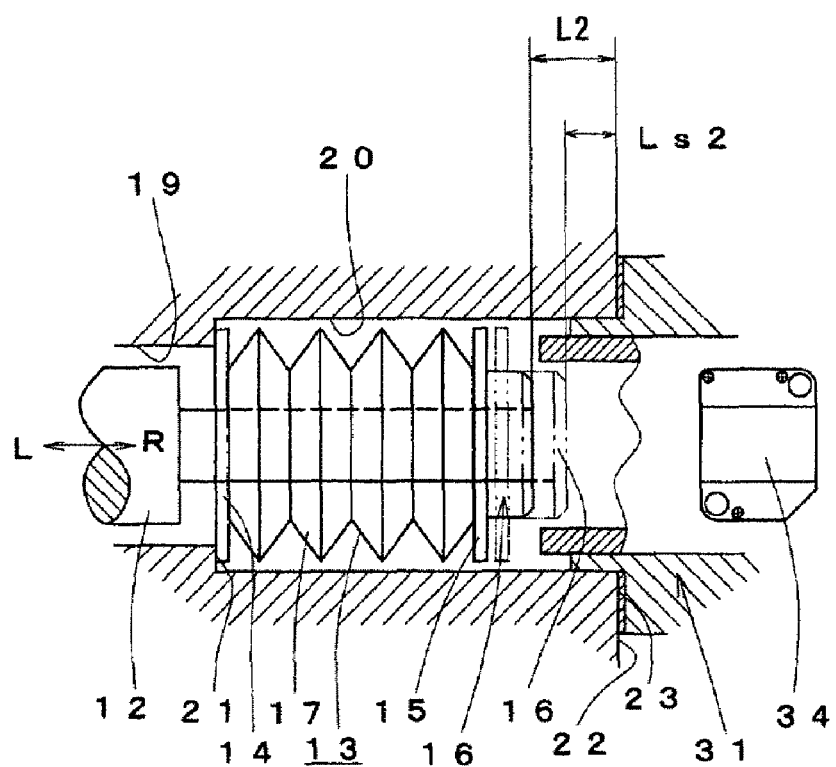
FIG. 24 is a schematic diagram showing a state during close operation in a spring cartridge.

When the worm 5 moves from the state shown in FIG. 23 in the open operating direction, as shown in FIG. 24, the movable shaft 12 moves in the arrow L direction in a manner integrated with the worm 5, so that the spring cartridge 13 is compressed. At that time, the laser sensor 34 measures the distance L2 from the end face 22 to the nut 16 with adopting the end face 22 of the casing as a measurement reference position. Thus, the compression amount at open operation of the spring cartridge 13 is obtained as Ls2-L2.

As such, in the case that the compression amount of the spring cartridge 13 is acquired indirectly as the movement amount (movement distance) of the nut 16, the position of the nut 16 shown in FIG. 21 need be adopted as the origin at close operation, while the position of the nut 16 shown in FIG. 23 need be adopted as the origin at open operation.

Here, it is generally recognized that when the movement amount is to be measured for the same measurement target object that moves to both sides in the axial directions, the measurement is simplified when a single position is adopted as the origin. (This is premised on the absence of the "backlash".) Thus, for example, in a case that the spring cartridge 13 moves in the close operating direction and in the open operating direction as in the above-mentioned measurement example, the measurement is performed in many cases with adopting a single position (e.g., the position shown in FIG. 21) as the origin for both of these operating directions.

Here, in the case that the spring cartridge 13 moves in the close operating direction and the open operating direction, even if the measurement were performed by adopting the position of the nut 16 shown in FIG. 21 as the origin for both directions, no problem would be caused in the close operating direction, since a backlash is absent in that direction. Nevertheless, when the operating direction would change from the close operating direction to the open operating direction so that the open operation would be performed, the measured value obtained here would contain the backlash ΔL. (In this measurement example, the measured value acquired actually would become L2+ΔL). Thus, the measured value for the compression amount of the spring cartridge 13 at open operation would have an error corresponding to the backlash ΔL.

Figure 25:
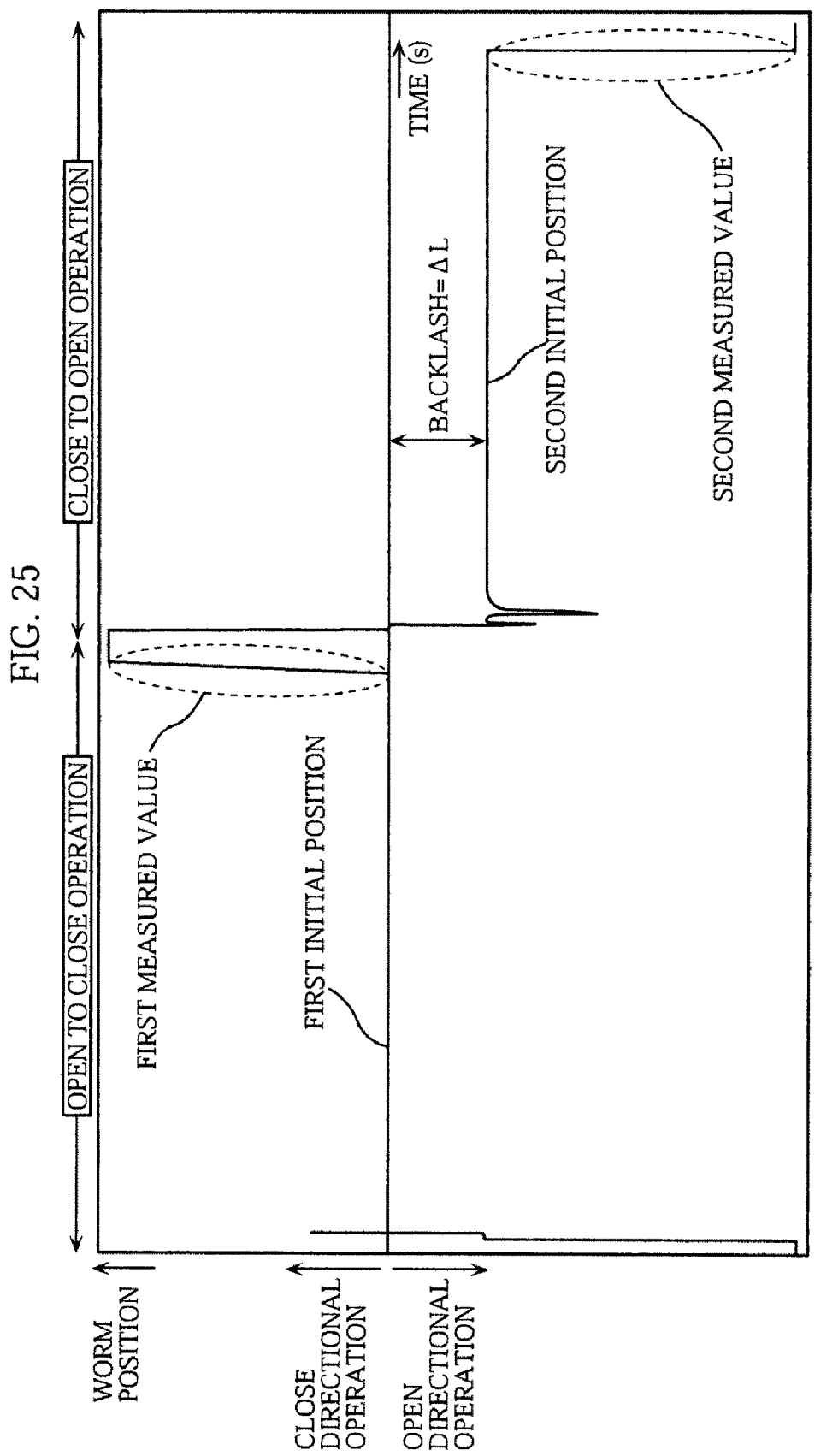
FIG. 25 is a time series graph which showing a time-dependent change in the worm position at close operation and open operation of an electrically operated valve.

FIG. 25 is a time series graph showing the state at the operation of the spring cartridge 13 shown in FIGS. 21-24.

In this FIG. 25, a first initial position serving as the reference position of the spring cartridge 13 at close operation corresponds to the state shown in FIG. 21. That is, the end face position of the nut 16 in this state serves as the origin in the movement amount measurement in the close operating direction. Then, a first measured value in FIG. 25 is the movement amount of the nut 16 from the origin at close operation.

Further, in FIG. 25, a second initial position serving as the reference position of the spring cartridge 13 at open operation corresponds to the state shown in FIG. 23. That is, the end face position of the nut 16 in this state serves as the origin in the movement amount measurement in the open operating direction. Then, a second measured value in FIG. 25 is the movement amount of the nut 16 from the second initial position serving as the origin at open operation.

Thus, when attention is focused on the movement amount at open operation with reference to the first initial position on the close operation side, a graph is obtained in which the second measured value is shifted to the open operating direction by the movement amount corresponding to the backlash ΔL. Thus, in the measurement of the movement amount at open operation, if the origin were set up to be the same point as the origin at close operation, an error corresponding to the backlash ΔL would arise.

With considering this situation, in the case that the compression amount of the spring cartridge 13 is acquired indirectly from the movement amount of the nut 16 by the sensor unit 30 so that this value is used in the diagnosis on the torque of the electrically operated valve, in order that a reliable diagnostic result should be obtained, a measurement technique need be devised such that an actual compression amount should be obtained where the influence of the above-mentioned "backlash ΔL" is eliminated.

Here, since the operating state of the spring cartridge 13 shown in FIGS. 21-24 described above has been considered, with focusing attention on the correspondence with these and with reference to FIGS. 16-20, the following description is given for a particular technique in which the compression force at open operation is acquired on the basis of the correlation data between the compression amount and the compression force at close operation as well as the compression amount at open operation. The points to be considered are also described.

Figure 16:
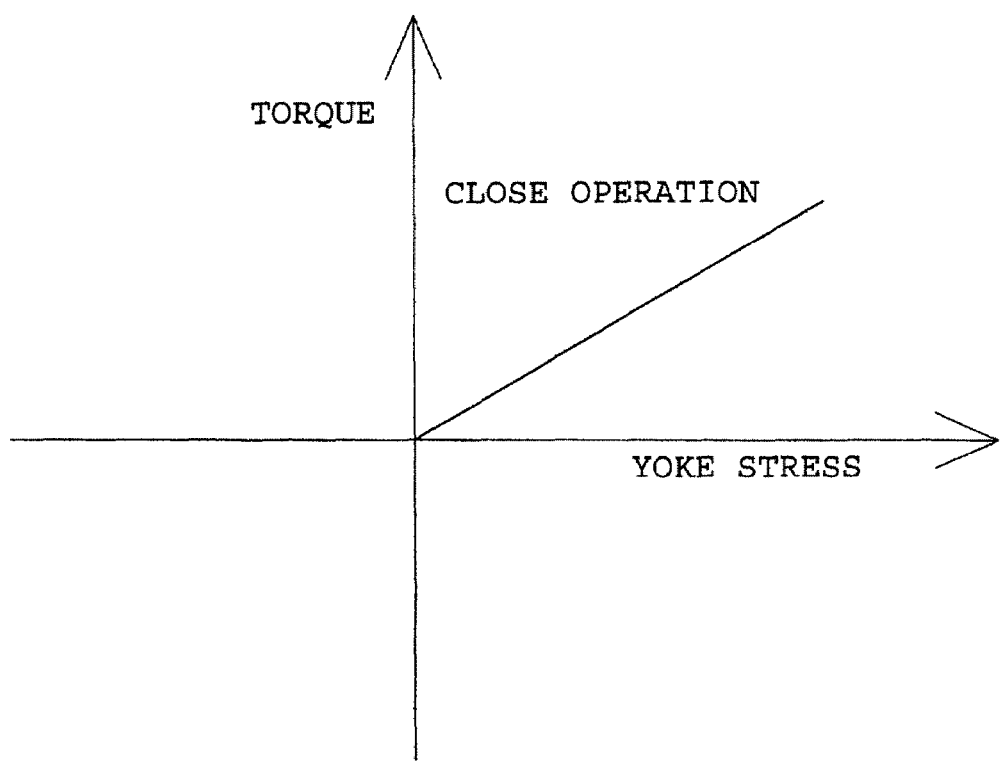
FIG. 16 shows a correlation database between a yoke stress and a torque.
Figure 17:
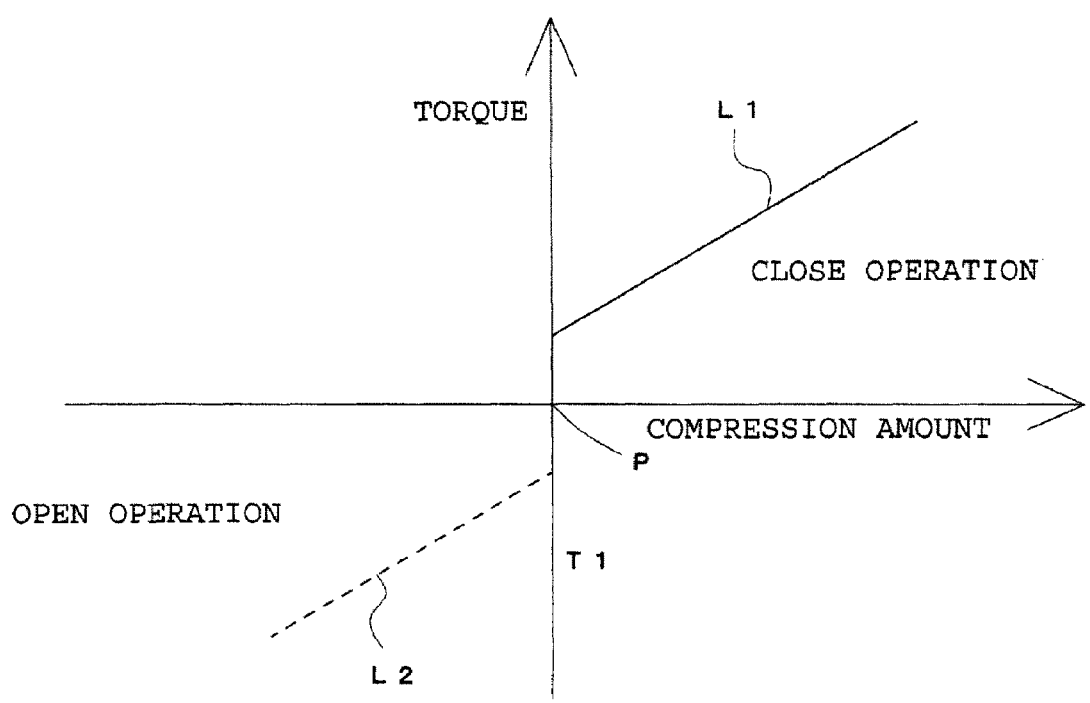
FIG. 17 shows a correlation database between a compression amount and a torque.

First, correlation data as shown in FIG. 16 is acquired for "yoke stress versus torque (obtained by numerical conversion of the compression force of the spring cartridge)" at close operation. Further, a torque curve L1 is acquired as the correlation data of "compression amount versus torque" at close operation as shown in FIG. 17. Then, the torque curve L1 is moved under point symmetry with respect to the origin P, so that a torque curve L2 at open operation is obtained.

Figure 18:
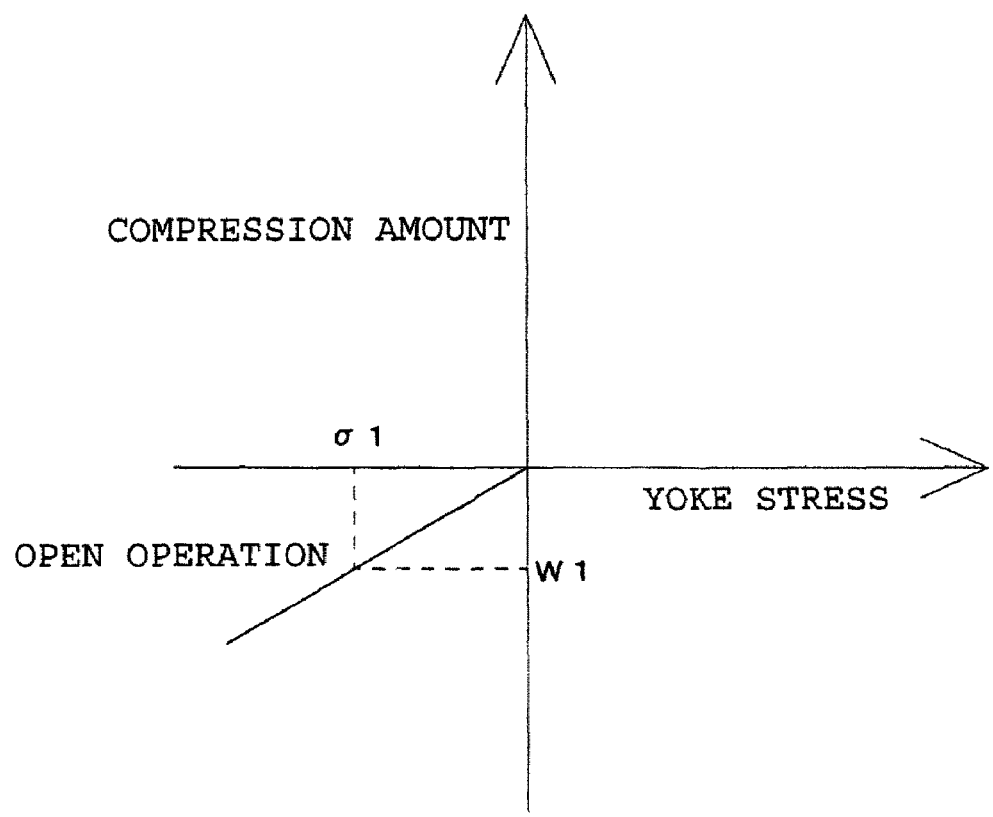
FIG. 18 shows a correlation database between a yoke stress and a compression amount.
Figure 19:
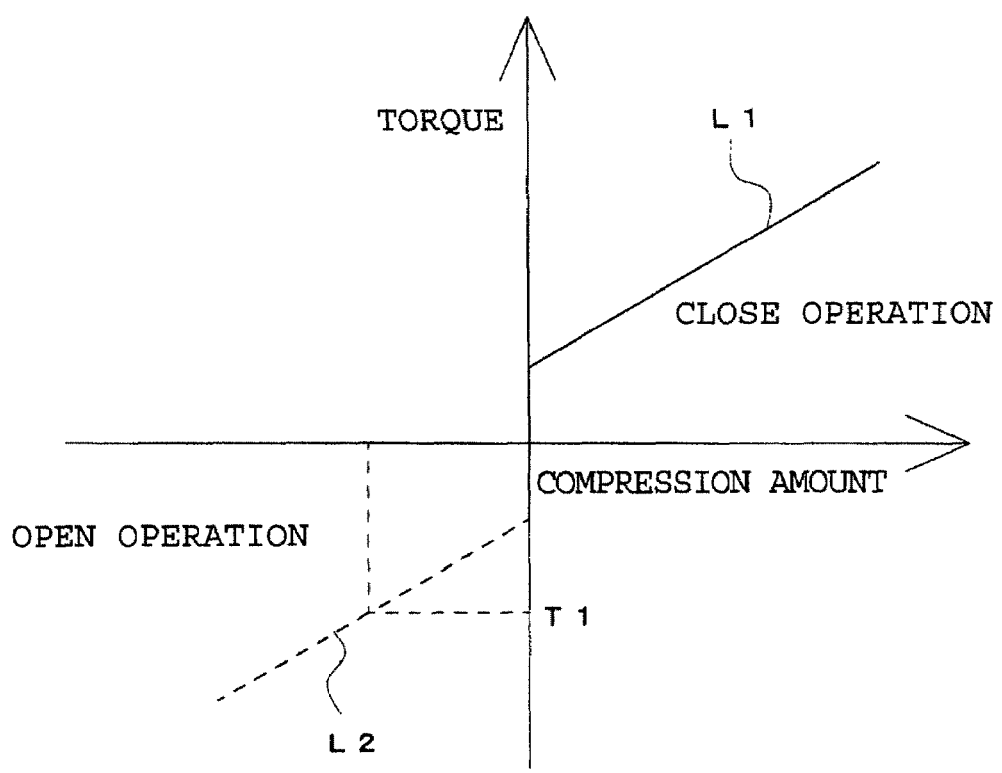
FIG. 19 shows a correlation database between a compression amount and a torque.

Next, correlation data of "yoke stress versus compression amount" at open operation is acquired as shown in FIG. 18. Then, on the basis of the correlation data of "yoke stress versus compression amount" at open operation shown in FIG. 18, the compression amount W1 of the spring cartridge 13 is obtained in correspondence to the yoke stress σ1 at open operation acquired by actual measurement. After that, in accordance with FIG. 19 (the same as FIG. 17 but presented as an independent drawing for convenience), the torque T1 at open operation is obtained in correspondence to the compression amount W1 at open operation.

Meanwhile, in the compression amount W1 at open operation obtained here, the backlash ΔL of the spring cartridge 13 is not taken into consideration. Nevertheless, as described above, the backlash ΔL is actually present unavoidably in the compression direction of the spring cartridge 13.

Thus, in a case that the reference position of the spring cartridge at close operation is adopted as the reference position of the spring cartridge at open operation, if the backlash ΔL were not taken into consideration when the torque obtained from the compression force of the spring cartridge 13 at open operation is to be acquired on the basis of the compression amount and the torque at close operation, a precise diagnostic result could not be obtained in the diagnosis of the electrically operated valve.

That is, when the backlash ΔL is present in the compression direction of the spring cartridge 13 as shown in FIGS. 25 and 21-24, as described above, the torque curve at open operation is shifted to the open operating direction by the compression amount corresponding to the backlash ΔL in comparison with the case that the backlash ΔL is absent. Thus, the torque curve L2 at open operation shown in FIG. 19 (i.e., a torque curve in the case of absence of a backlash ΔL) and the torque curve L3 at open operation in the case of presence of a backlash ΔL are as shown in FIG. 20.

That is, the torque curve L2 at open operation where a backlash ΔL is absent is set up in the point symmetry to the torque curve L1 at close operation with respect to the origin P. In contrast, the torque curve L3 at open operation where a backlash ΔL is present is shifted from the torque curve L2 to the compression amount side (negative) by the backlash ΔL so that the origin is set up to be Q.

Figure 20:
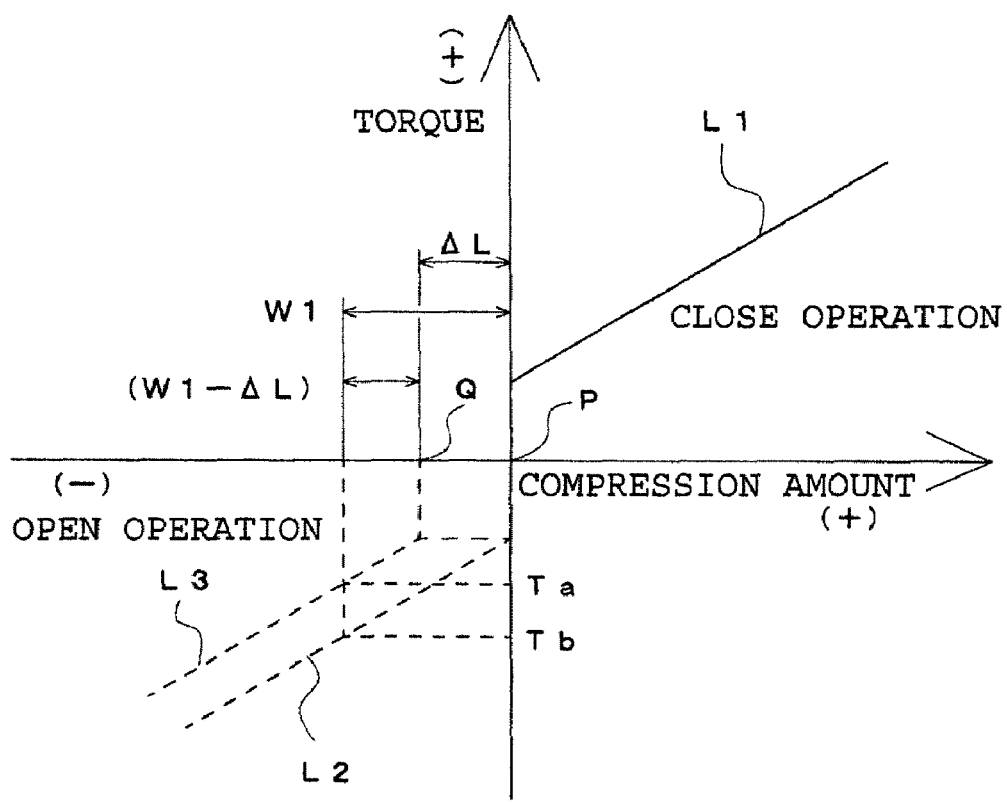
FIG. 20 shows a correlation database between a compression amount and a torque.

Thus, for example, in the case that the torque corresponding to the compression amount W1 (value on the basis of the origin P) at open operation is to be acquired on the basis of the torque curve L3 of FIG. 20, the compression amount W1-ΔL is considered with reference to the origin Q, so that a torque corresponding to this is obtained as torque=Ta. This torque T is an actual torque at open operation in the case of presence of the backlash ΔL.

In contrast, for example, if the reference position for the compression amount of the spring cartridge at open operation were setup not at the origin Q but at the origin P (the reference position for the compression amount of the spring cartridge at close operation), torque=Tb would be obtained as the torque corresponding to the compression amount W1. This could cause an error Tb-Ta in the read-out torque when compared between the case that the origin P is adopted as the reference and the case that the case that the origin Q is adopted as the reference.

As such, when the backlash ΔL of the spring cartridge 13 is taken into consideration in the acquisition of the torque at open operation, the actually acting torque can be acquired with precision. Thus, when diagnosis on the torque of the electrically operated valve is performed using this torque, remarkably precise diagnosis is achieved.

On the basis of the correlation data of "compression amount versus torque" on the open side and of "compression amount versus yoke stress" on the open side acquired as described above, a correlation database of "yoke stress versus torque" on the open side is acquired. Then, the correlation database acquired as described here is used together with the yoke stress acquired by measurement in the diagnosis on the torque at open operation. Here, in the diagnosis on the torque at close operation, the correlation data of "yoke stress versus torque" of FIG. 16 acquired by actual measurement is used.

I-B: Second Diagnosis Mode

In a second diagnosis mode, as described above, on the basis of the driving force inputted to the valve element driving section and the driving force outputted from the valve element driving section, a state of change is monitored in the transmission efficiency of the driving force in the valve element driving section, so that the state of change is reflected into the first diagnosis mode.

First, the "transmission efficiency of the driving force in the valve element driving section"[1] indicates the ratio between the driving force inputted to the valve element driving section side and the driving force outputted from the valve element driving section side. This ratio can be recognized as correlation between the driving force input signal and the driving force output signal. Further, the phrase "a state of change is monitored in the transmission efficiency of the driving force" indicates that the state of change in the correlation is monitored continuously or alternatively in spots when necessary. The present embodiment is described for the case that the monitoring is performed continuously.

Then, this monitoring result of the state of change in the transmission efficiency of the driving force is reflected into the diagnosis on the driving force of the electrically operated valve. For example, when the transmission efficiency of the driving force varies at a change rate exceeding a predetermined value or alternatively into a value exceeding a predetermined one, abnormality is concluded in the driving force transmission system. Then, in accordance with the change rate or the change amount, the driving force corresponding to the driving force output signal is corrected so that the diagnosis (result) on the driving force should become appropriate, while a degradation trend in the driving force transmission system is predicted and reflected into a maintenance schedule. In the present embodiment, as described below, the yoke stress is adopted as the driving force outputted from the valve element driving section. Thus, the transmission efficiency of the driving force is acquired not numerically but in the form of a change rate.

Further, in a manner that the state of change in the transmission efficiency of the driving force is reflected, the following is achieved:

a. diagnosis of appropriateness of a set-up torque, for example, diagnosis of appropriateness of the torque value at the operation timing of a torque switch at close operation of the electrically operated valve;

b. diagnosis of appropriateness of a valve seat force, that is, diagnosis of appropriateness of the magnitude of a close holding torque of the valve element at close operation of the electrically operated valve; and c. check of the magnitude of margin in the driving force, for example, check of the magnitude of margin in the driving force relative to a pull out torque necessary at the time of pull out of the valve element where the maximum torque is required in the open operation of the electrically operated valve.

As a result, overall diagnosis can be performed on the driving force transmission system of the electrically operated valve.

The following description is given for: a monitoring technique of the state of change in the transmission efficiency of the driving force; a diagnosis technique where its monitoring result is reflected into various kinds of diagnosis in the first diagnosis mode; and the like.

In FIG. 14, the yoke stress acquired by the strain gauges 51 and 52 by measurement is adopted as the driving force output signal from the valve element driving section, while any of the current value signal, the compression amount signal, and the compression force signals is adopted as the driving force input signal. Here, among these output signals, the current value signal is adopted as the driving force input signal. This current value signal is used for generating a voltage corresponding to the magnitude of magnetism when the magnetic sensor 60 (see FIG. 7) senses magnetism from the electric wire 62 accommodated in the conduit tube 61. Thus, the current value signal does not directly serve as the drive force input signal. Accordingly, for example, correlation between this current value and the compression force of the spring cartridge 13 is obtained in advance. Then, on the basis of this correlation, a driving force corresponding to the current value is acquired and adopted as the driving force inputted to the valve element driving section.

Then, the driving force input signal obtained from this current value signal is compared with the driving force output signal obtained on the basis of the yoke stress, so that a state of change is monitored in the transmission efficiency of the driving force in the valve element driving section.

Figure 26:
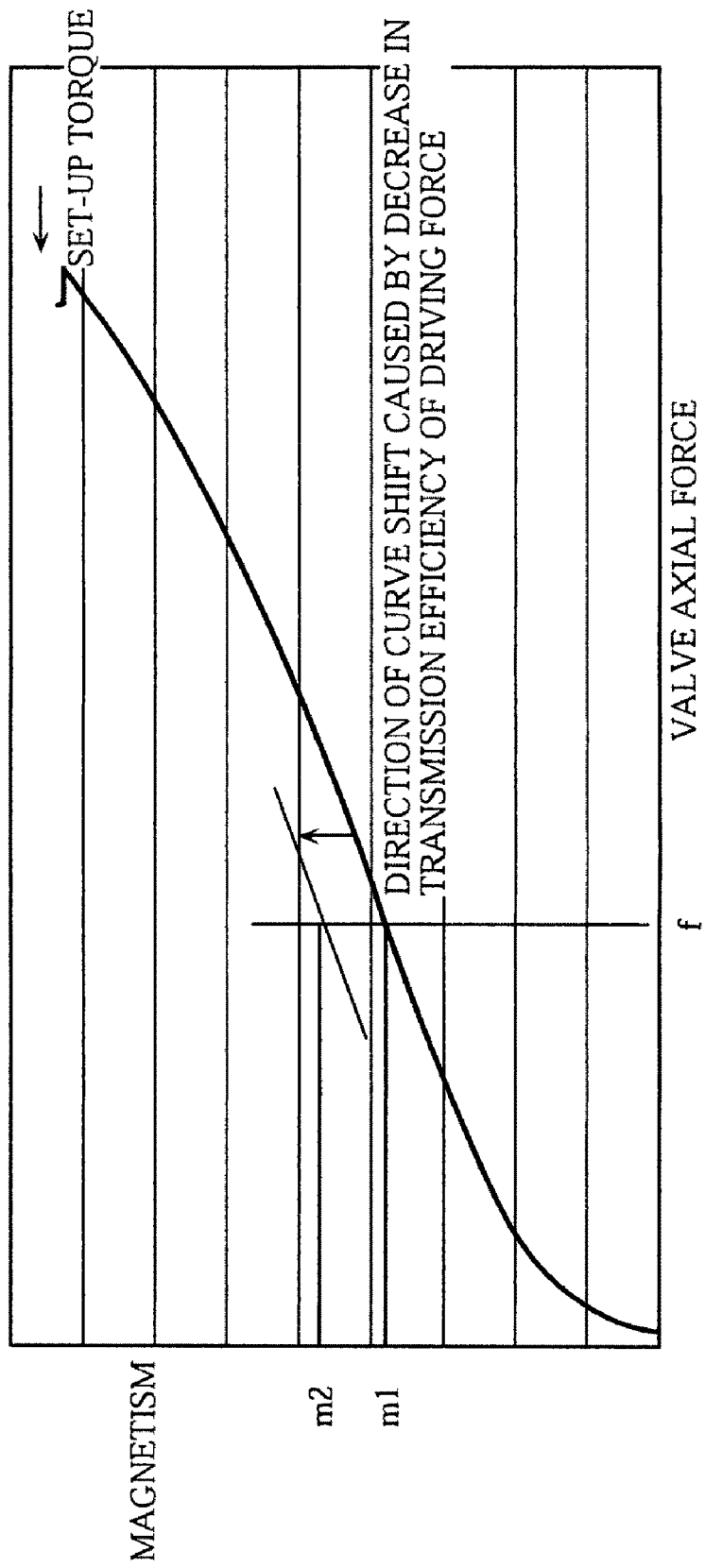
FIG. 26 shows a correlation data curve of "valve axial force versus magnetism" among correlation data obtained by performing X-Y transformation on acquired data.

Here, FIG. 26, shows the correlation between the driving force output signal and the driving force input signal. In FIG. 26, the yoke stress serving as the driving force output signal is described as the "valve axial force", while the current value signal serving as the driving force input signal is described simply as "magnetism". In accordance with the correlation data of FIG. 26, the driving force transmitting state in the valve element driving section can be checked on the basis of the correspondence relation between the driving force output signal and the driving force input signal. For example, the correlation shown in FIG. 26 is assumed to be the correlation of the case that the transmission efficiency of the driving force is appropriate. Then, at the time that the correlation is acquired continuously from that time on, for example, when the correlation curve is shifted and displaced in parallel upward (in the arrow direction), that is, in the direction of increasing magnetism signal, relative to the initial correlation curve acquired at the time of acquisition of the first correlation database, it is determined that the transmission efficiency of the driving force has decreased.

Further, when the position of the correlation curve in FIG. 26 has not varied (that is, the correlation between the driving force output signal and the driving force input signal itself has not varied) but the set-up torque value has varied to the low side, it is determined that the transmission efficiency of the driving force has not decreased but that setting of the torque switch has shifted.

Figure 27:
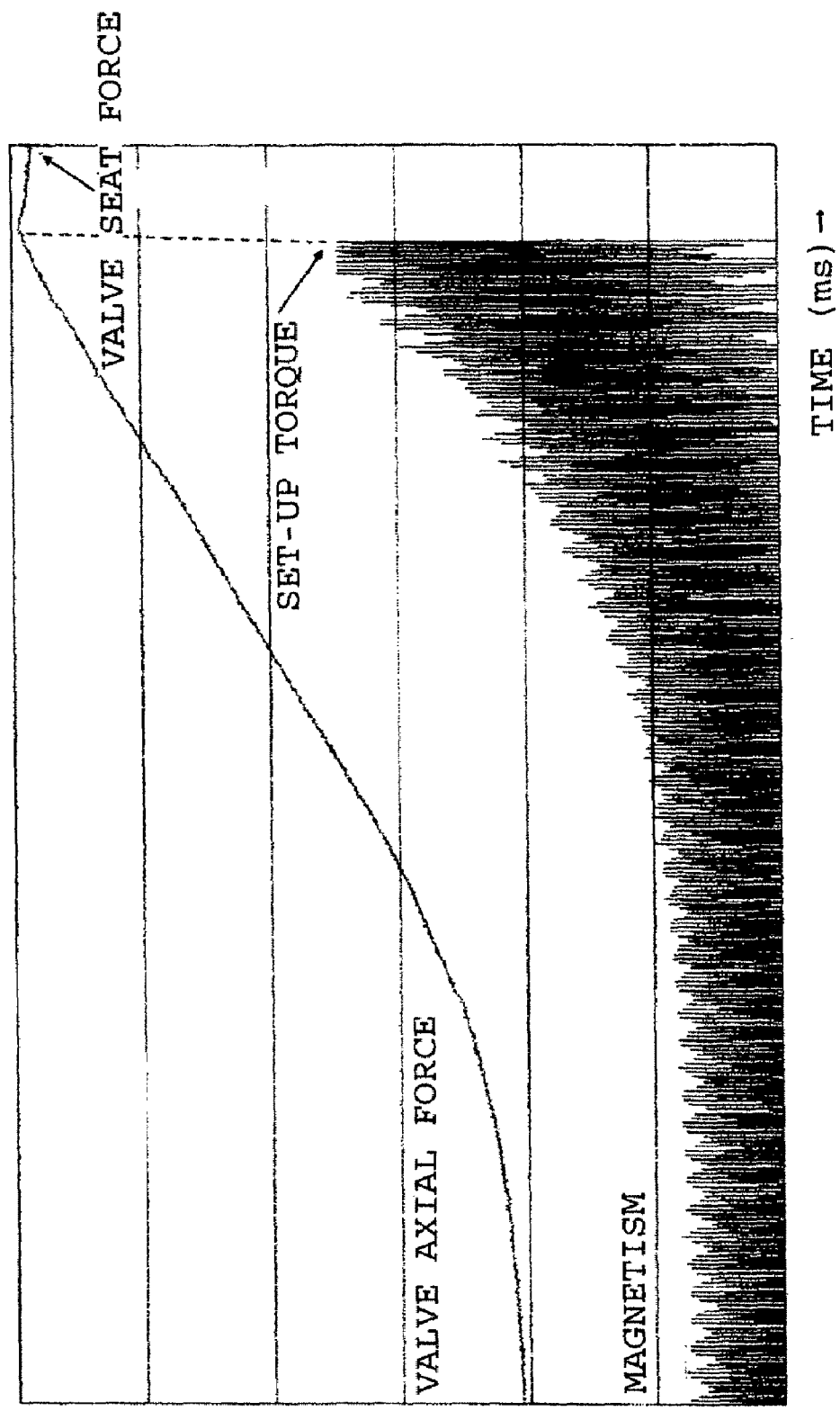
FIG. 27 is a raw waveform chart of a valve axial force signal and a magnetism signal at the time of torque seat of an electrically operated valve.

FIG. 27 shows raw waveforms at the time of torque seat for the output signals of the strain gauges 51 and 52 for measuring valve axial force (i.e., yoke stress) and the output signal of the magnetic sensor 60 serving as a current value sensor. On the basis of FIG. 27, the correlation curve of FIG. 26 is obtained. Then, on the basis of FIGS. 26 and 27 and the first correlation database, the following is achieved:

a. diagnosis of appropriateness of a set-up torque, for example, diagnosis of appropriateness of the torque value at the operation timing of a torque switch at close operation of the electrically operated valve; and b. diagnosis of appropriateness of a valve seat force, that is, diagnosis of appropriateness of the magnitude of a close holding torque of the valve element at close operation of the electrically operated valve.

For example, in the diagnosis of appropriateness of the set-up torque of the above-mentioned item "a", first, a valve axial force (i.e., yoke stress) at the time of disappearance of the magnetism signal in association with the stop of the motor power supply caused by a torque switch operation is acquired in FIG. 27. Then, using this valve axial force and the first correlation database, the present set-up torque is acquired so that the appropriateness is diagnosed. Here, when no change is present in the transmission efficiency of the driving force in the valve element driving section, the situation has no problem. Nevertheless, when a change has arisen in the transmission efficiency of the driving force, precise and reliable diagnosis could not be performed if the appropriateness were diagnosed on the basis of the set-up torque. Thus, from the correlation of "valve axial force versus magnetism" shown in FIG. 26, the state of change is checked in the transmission efficiency of the driving force in the valve element driving section. Then, when the transmission efficiency of the driving force in the valve element driving section is determined as having decreased (that is, when the correlation curve acquired at present has shifted in the positive direction in the Y-axis, that is, upward, relative to the initial correlation curve), the first correlation database is corrected in accordance with the amount of decrease. Then, on the basis of the corrected first correlation database, a torque corresponding to the valve axial force is read out, so that the appropriateness is diagnosed by adopting this value as the set-up torque. As such, the appropriateness is diagnosed on the basis of the accurate set-up torque into which the change in the transmission efficiency of the driving force in the valve element driving section is reflected. This permits more precise and reliable diagnosis.

The above-mentioned technique of correction is described below in detail. In this correction, as schematically shown in FIG. 26, for example, in a case that the correlation curve (partly shown) acquired in this measurement occasion has shifted upward relative to the initial correlation curve and that the magnetism signal at a particular valve axial force (f) has varied from a signal value m1 to m2, the change rate m2/m1 of this magnetism signal is adopted as the correction coefficient. Then, the torque (m2/m2)×T acquired by multiplying by this correction coefficient m2/m1 the torque T obtained from the first correlation database is adopted as the set-up torque.

Here, the correlation between the magnetism signal and the output signal of the load cell 33 may be used in order that the set-up torque should be obtained from the magnetism signal. However, as shown in FIG. 27, the valve axial force signal has denser signal information than the magnetism signal. Thus, from the viewpoint of precise diagnosis, it is preferable that the set-up torque is acquired on the basis of the valve axial force as described above.

On the other hand, in the diagnosis of appropriateness of the valve seat force of the above-mentioned item "b", first, the valve axial force (i.e., yoke stress) at the time of valve seat is acquired in FIG. 27. Then, using this valve axial force and the first correlation database, the present valve seat force is obtained, so that the appropriateness of the magnitude is diagnosed. Here, when no change is present in the transmission efficiency of the driving force in the valve element driving section, the situation has no problem. Nevertheless, when a change has arisen in the transmission efficiency of the driving force, precise and reliable diagnosis could not be performed if the appropriateness were diagnosed on the basis of the valve seat force. Thus, from the correlation of "valve axial force versus magnetism" shown in FIG. 26, the state of change is checked in the transmission efficiency of the driving force in the valve element driving section. Then, when it is determined that the transmission efficiency of the driving force in the valve element driving section has decreased, the first correlation database is corrected in accordance with the amount of decrease. Then, on the basis of the corrected first correlation database, a valve seat force corresponding to the valve axial force is read out, so that the appropriateness of the valve seat force is diagnosed. As such, the appropriateness is diagnosed on the basis of the accurate valve seat force into which the change in the transmission efficiency of the driving force in the valve element driving section is reflected. This permits more precise and reliable diagnosis.

Figure 28:
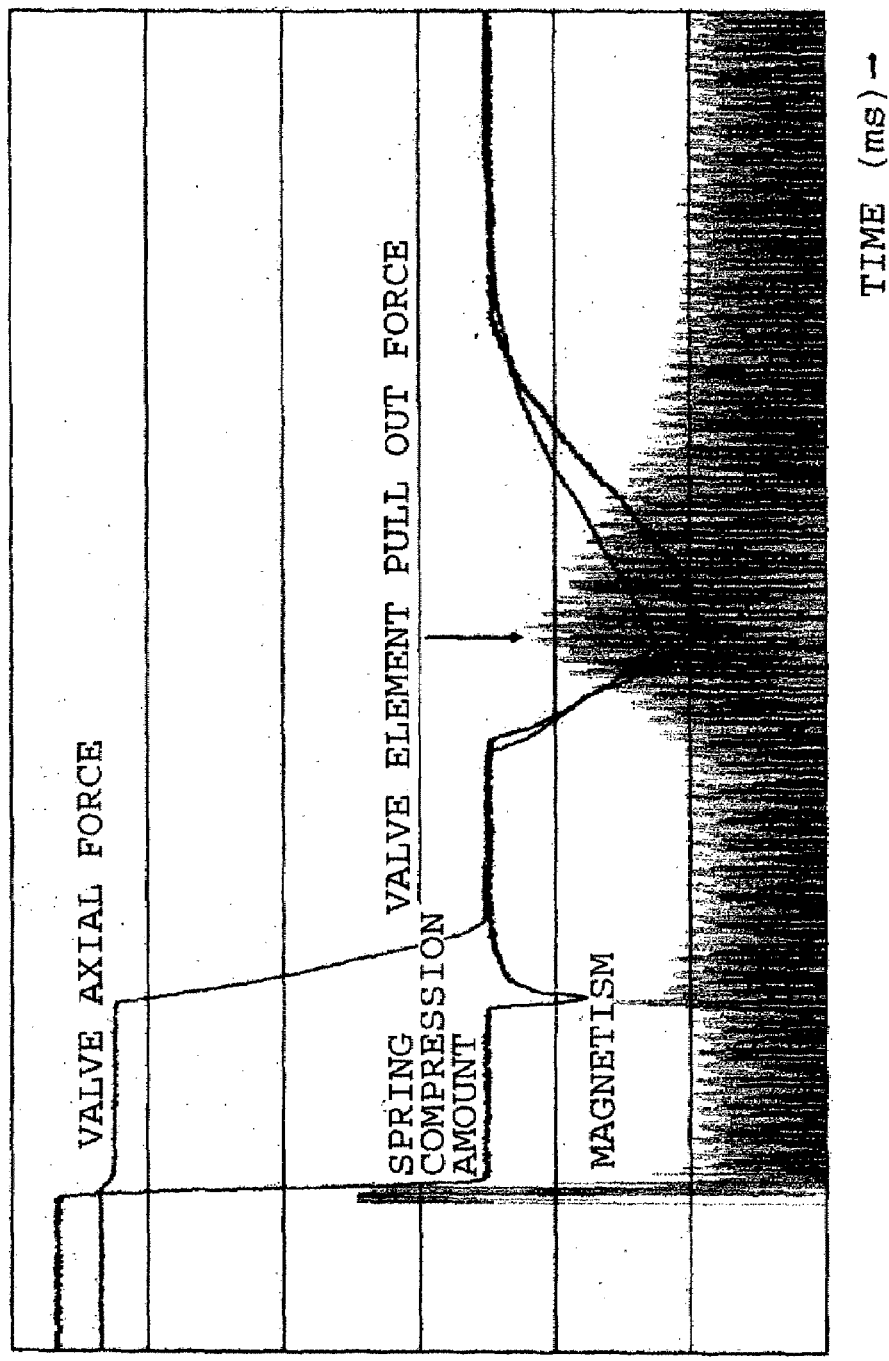
FIG. 28 is a raw waveform chart of a valve axial force signal, a spring compression amount signal, and a magnetism signal in a vicinity of the time of pull out of a valve element of an electrically operated valve.
Figure 29:
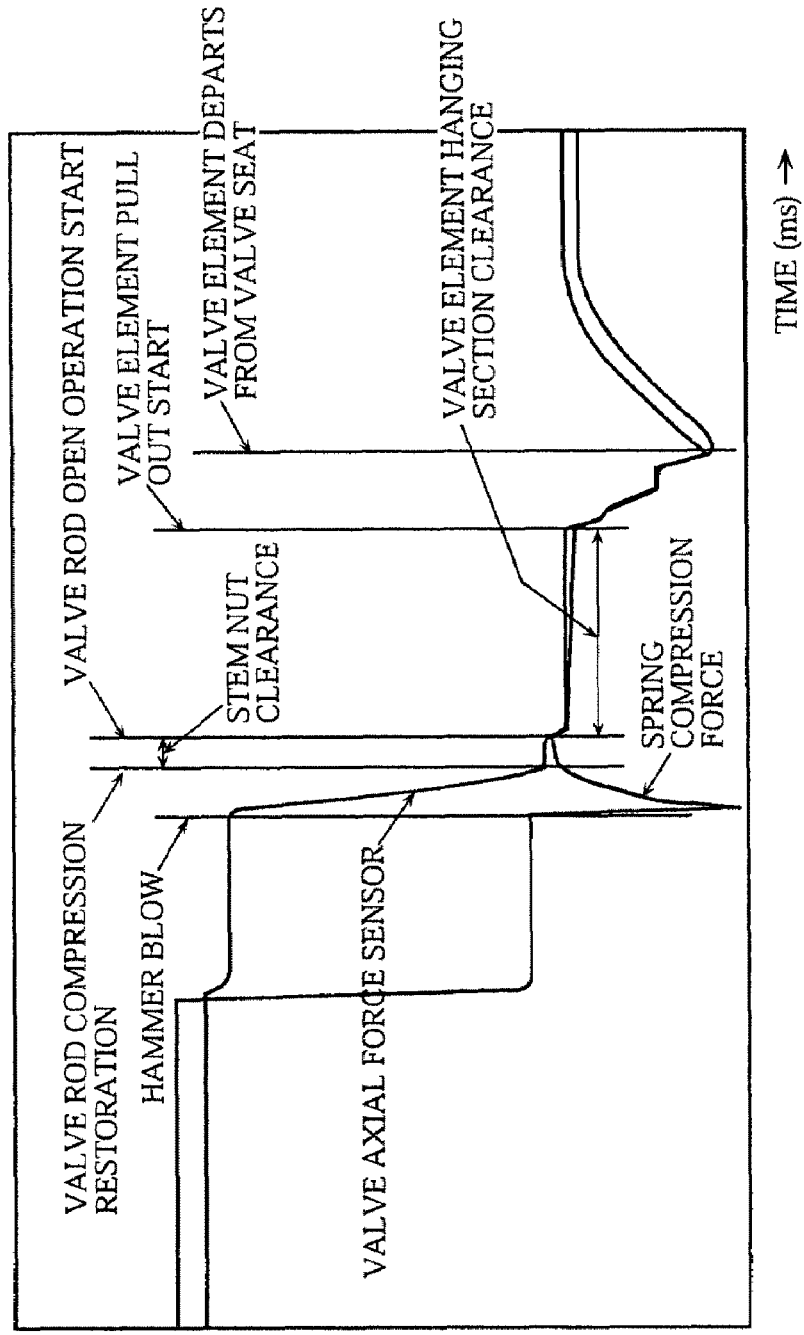
FIG. 29 is a raw waveform chart of a valve axial force signal and a spring compression force signal, where the operation relation of each section of an electrically operated valve is described in a vicinity of the time of pull out of a valve element of an electrically operated valve.

FIG. 28 shows raw waveforms for the output signals of the strain gauges 51 and 52 for measuring the valve axial force (i.e., yoke stress), the output signal of the magnetic sensor 60 serving as a current value sensor, and the output signal of the laser sensor 34 for measuring the compression amount of the spring cartridge 13 serving as a reference, in the vicinity of the time of pull out of the valve element. Further, FIG. 29 shows the operation state of each section in correspondence to the raw waveforms of the valve axial force and the spring compression force (measured by the strain gauge 35) in the vicinity of the time of pull out of the valve element.

Using this FIG. 28, the magnitude of margin can be checked in the driving force of the electrically operated valve.

The check of the magnitude of margin in the driving force is important from the viewpoint of ensuring the reliability in the electrically operated valve. That is, in the case of a small magnitude of margin in the driving force, for example, when the pull out resistance of the valve element has increased in association with an increase in the surface roughness of the valve element caused by corrosion, the open operation of the valve can become difficult.

Thus, from this viewpoint of the magnitude of margin in the driving force, the above-mentioned monitoring of the state of change in the transmission efficiency of the driving force has a large meaning. That is, even if the magnitude of margin in the driving force were checked on the basis of the valve axial force corresponding to the measured yoke stress so that the margin were determined as sufficient, this determination was obtained merely on the basis of the data on the output side of the driving force. That is, the transmission efficiency of the driving force in the valve element driving section was not involved into the determination. Thus, for example, even if a sufficient margin were determined as being present in the driving force from the valve axial force, the transmission efficiency of the driving force could actually have decreased, so that the motor side could require a driving force input signal higher than that corresponding to the driving force obtained from the valve axial force and the first correlation database, that is, merely a small magnitude of margin could actually be present in the driving force.

With taking such a case into consideration, the following approach would remarkably be effective. That is, a state of change is monitored in the transmission efficiency of the driving force. Then, when the degree of change exceeds a predetermined rate, abnormality is concluded in the driving force transmission system so that the first correlation database is corrected in accordance with the state of change in the transmission efficiency of the driving force, or alternatively, the value of the driving force obtained with reference to the correlation database is corrected in accordance with the change rate. As seen also from the description of FIG. 26, the "change rate" of the transmission efficiency of the driving force described here does not indicate a change in the shape of the correlation curve of "valve axial force versus magnetism" shown in FIG. 26, but obviously indicates a movement rate (change ratio) relative to the initial correlation curve when the entire correlation curve moves in the Y-axis direction in association with a change in the transmission efficiency of the driving force, that is, a change in the correlation.

First, the valve axial force (yoke stress) at the time of pull out of the valve element is obtained from FIG. 28. Then, a torque corresponding to the obtained valve axial force is read out from the first correlation database, and then adopted as the "pull out torque". Then, the pull out torque is compared with the full torque intrinsically owned by the electrically operated valve, so that the magnitude of margin (full torque minus pull out torque) is checked in the torque (driving force). Here, when no change is present in the transmission efficiency of the driving force in the valve element driving section, the situation has no problem. Nevertheless, when a change has arisen in the transmission efficiency of the driving force, precise and reliable diagnosis could not be performed if the magnitude of margin in the torque were diagnosed on the basis of the pull out torque. Thus, from the correlation of "valve axial force versus magnetism" shown in FIG. 26, the state of change is checked in the transmission efficiency of the driving force in the valve element driving section. Then, when it is determined that the transmission efficiency of the driving force in the valve element driving section has decreased, the first correlation database is corrected in accordance with the amount of decrease. Then, on the basis of the corrected first correlation database, a torque corresponding to the valve axial force is read out, so that this corrected accurate torque is adopted as the "pull out torque". When this torque is used in the diagnosis, precise and reliable diagnosis is achieved. This avoids reliably in advance a failure in the out of the valve element. Thus, in particular, the function necessary for ensuring the safety in a nuclear power station can be maintained.

Further, other than the above-mentioned method for checking the magnitude of margin in the driving force, a state of change in the waveform of the magnetism signal of FIG. 28 may be monitored so that the state of change may be checked in the driving force inputted to the valve element driving section at the time of pull out of the valve element.

Figure 30:
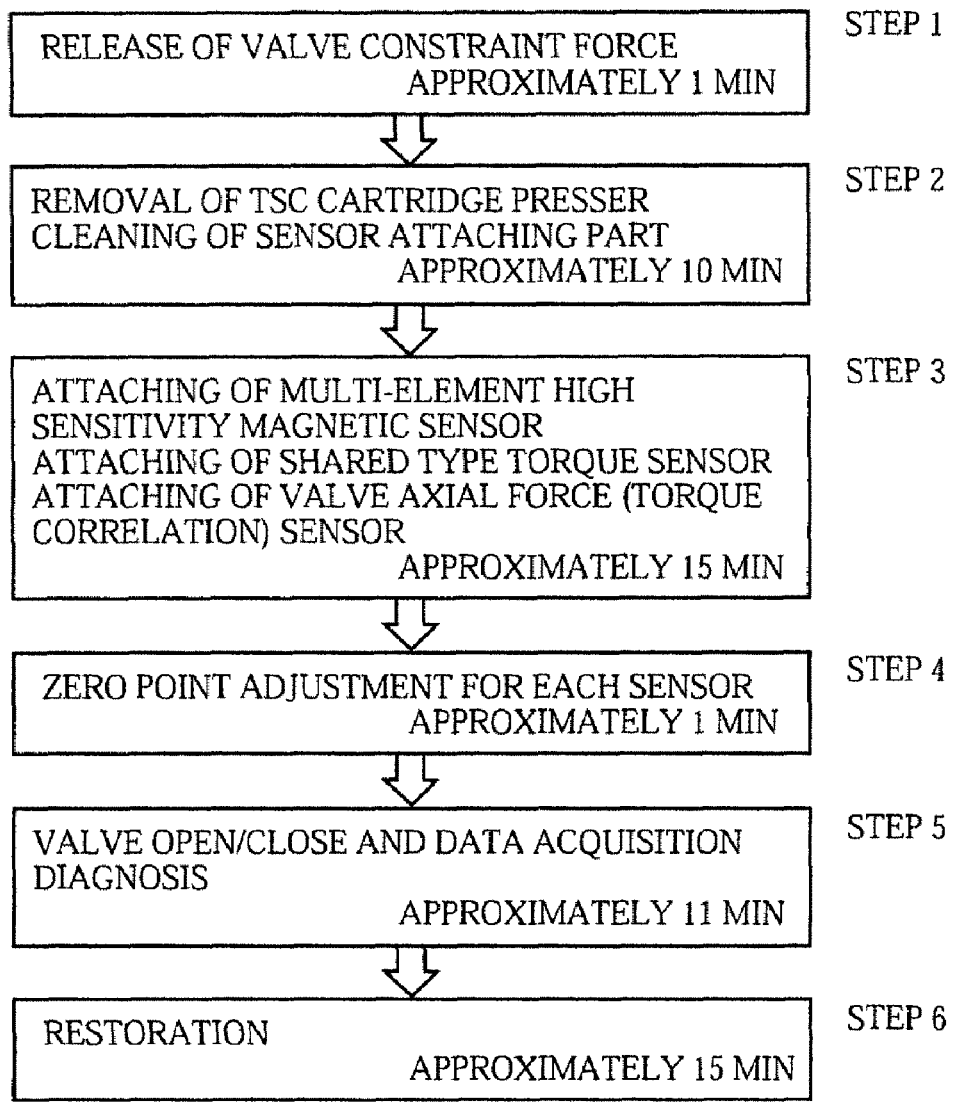
FIG. 30 is a flow chart of diagnosis work.

FIG. 30 shows an example of the procedure of acquiring the first correlation database and the correlation database of "magnetism versus torque" as well as the actual time that the work has taken.

At Step 1, first, a constraint force on the electrically operated valve is released as a preparation step of the diagnosis work. The constraint force on the electrically operated valve need be released as such in order that the strain gauge should be attached in a state that no strain is present in the yoke 50 and the like.

At Step 2, the cartridge presser 45 is removed that is attached to the valve element driving section such as to cover the outer end side of the spring cartridge (abbreviated as TSC). Then, cleaning is performed on the attachment site for the sensor unit 30 attached in place of the cartridge presser 45 and on the inner part of the pair of right and left supporting rods 53 and 54 of the yoke 50 which is the attachment part for the strain gauges 51 and 52 serving as the yoke stress sensors. This work actually took approximately 10 minutes.

Next, at Step 3, the magnetic sensor 60 (referred to as a multi-element high sensitivity magnetic sensor in FIG. 30) is attached to the conduit tube 61, while the sensor unit 30 (referred to as a "shared type torque sensor" in FIG. 30) is attached to the valve element driving section side. Further, the strain gauges 51 and 52 serving as yoke stress sensors are attached to the yoke 50.

In this case, the attaching positions for the magnetic sensor 60 and the sensor unit 30 are both in the upper part of the electrically operated valve, while the attaching positions for the strain gauges 51 and 52 are in the middle part of the electrically operated valve. These sites are distant from each other in the up and down directions. Thus, the work of attaching the magnetic sensor 60 and the sensor unit 30 to the upper part of the electrically operated valve and the work of attaching the strain gauges 51 and 52 to the middle part of the electrically operated valve can simultaneously be performed by a plurality of workers without spatial restriction. Thus, for example, in contrast to the case that the sensors are to be attached to the yoke and the valve rod which are mutually near parts in the electrically operated valve, the situation is avoided that when one sensor is attached, the other sensor cannot be attached because of a restriction in the workspace so that the attaching work need be waiting. This speeds up the sensor attaching work. Further, in particular, when the work of attaching the strain gauges 51 and 52 to the yoke 50 is performed by spot welding, the work is completed in a remarkably short time. This work actually took approximately 15 minutes.

At Step 4, zero-point adjustment is performed on each of the sensors composed of the above-mentioned strain gauges. This work actually took approximately 1 minute.

Then, at Step 5, the electrically operated valve is opened and closed, so that various data is acquired using each sensor. Then, on the basis of this acquired data, a correlation database is obtained for the first correlation database "magnetism versus torque" of the electrically operated valve. This diagnosis work actually took approximately 11 minutes.

Finally, at Step 6, restoration work such as removal of the sensors is performed so that the entire work is completed. This restoration work actually took approximately 15 minutes.

The above-mentioned work has actually completed in approximately 53 minutes including the entirety from the preparation step to the restoration work. That is, in contrast to the work according to the prior art technique that takes approximately 3 hours, the work according to the present invention is performed easily and rapidly in a remarkably short time. This reduction in the working time is attributed mainly to: that the electric box of the electrically operated valve need be opened at the time of attaching of the sensors; that the work of attaching the magnetic sensor 60 and the sensor unit 30 to the upper part of the electrically operated valve and the work of attaching the strain gauges 51 and 52 to the middle part of the electrically operated valve can be performed simultaneously without a work waiting time; and that the strain gauge can be attached to the yoke by spot welding in a remarkably short time.

Here, in the first occasion of diagnosis work, the entire work of Steps 1-6 need be performed. However, in the next and the subsequent occasions of diagnosis work, the work of attaching the sensor unit 30 and the strain gauges 51 and 52 at Steps 1, 2, and 3 becomes unnecessary. Further, when the magnetic sensor 60 is permanently installed, the attaching work at Step 3 is also unnecessary, so that the work of Step 5 (data acquisition for the valve axial force sensor and the magnetic sensor) and short-time restoration work are solely performed.

Meanwhile, the first and the second diagnosis modes have been described for a diagnosis technique based on the correlation between the driving force and the yoke stress, the correlation between the yoke stress and the current value, and the like. However, when correlation is acquired between factors other than these, diagnosis can be performed on the change by aging in the transmission situation of the driving force as follows. Thus, a diagnosis technique is described below in detail for the change by aging in the transmission situation of the driving force.

Figure 33:
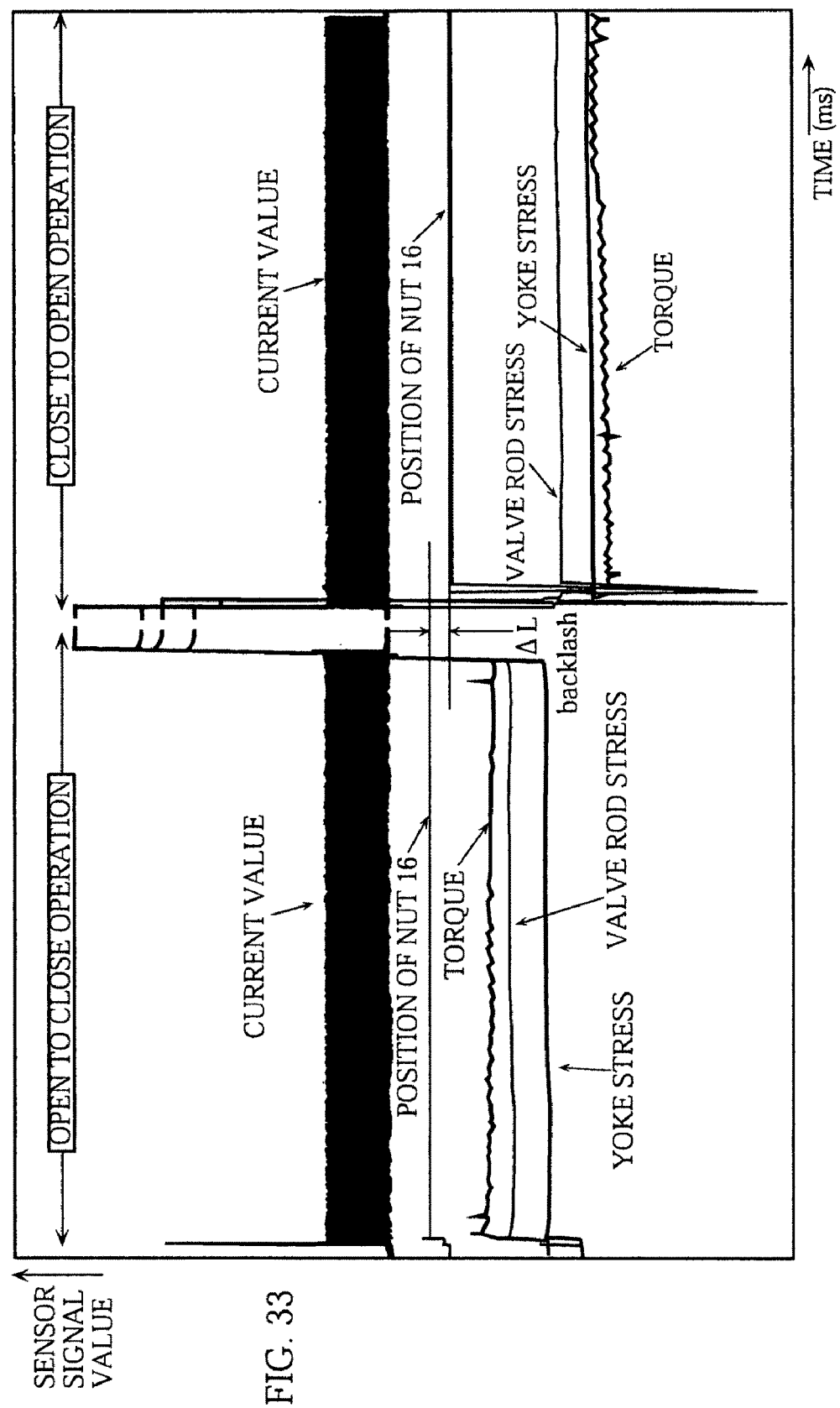
FIG. 33 is an explanation diagram of acquired data.
Figure 34:
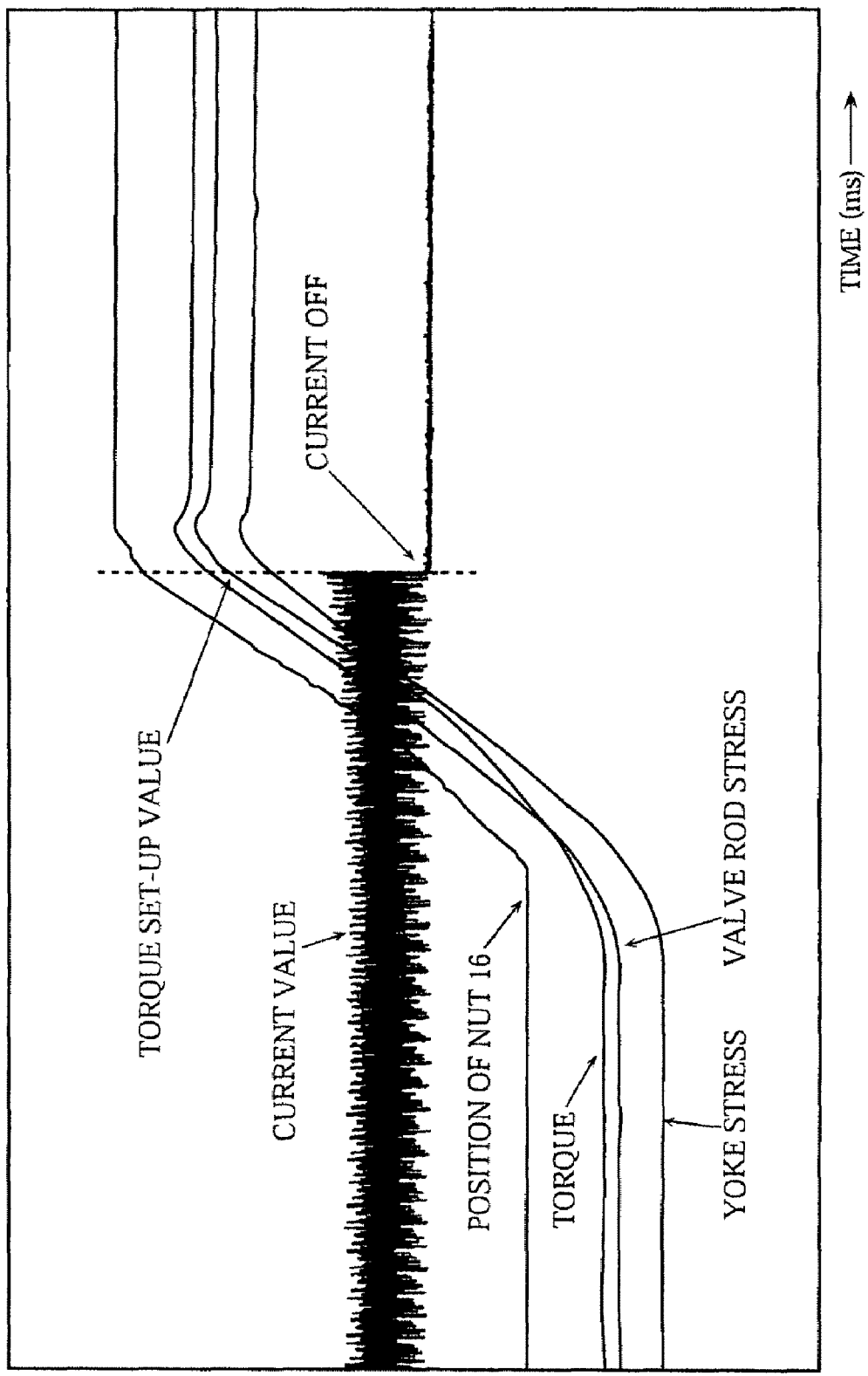
FIG. 34 is an enlarged view of an ending part of close operation in FIG. 27.

As an example of data actually acquired as a time-dependent change, FIG. 33 shows actual measurement data of "current value", "valve rod stress", "nut position (i.e., worm position)", "torque (spring cartridge compression force×r)", and "yoke stress" at both of close operation from the open state and open operation from the close state in the electrically operated valve. When X-Y transformation is performed on any two of these measurement data pieces (one is adopted as X, while the other is adopted as Y, and then relation between X and Y is obtained), various kinds of correlation databases are acquired. FIG. 34 shows enlargement of the ending part of the close operation in FIG. 33.

Such a correlation database can be set up arbitrarily between individual data factors measured actually. In this example, correlation between data factors that can be adopted as a to-be-diagnosed factor of the change by aging in the transmission situation of the driving force or the like of the electrically operated valve is illustrated by a correlation diagram of "compression amount versus torque" shown in FIG. 35, a correlation diagram of "valve rod stress versus yoke stress" shown in FIG. 36, a correlation diagram of "yoke stress (or valve rod stress) versus torque (or compression amount) and current value)" shown in FIG. 37, and a correlation diagram of "yoke stress (or valve rod stress) versus torque (or compression amount) and integrated current value" shown in FIGS. 38 and 39.

Figure 35:
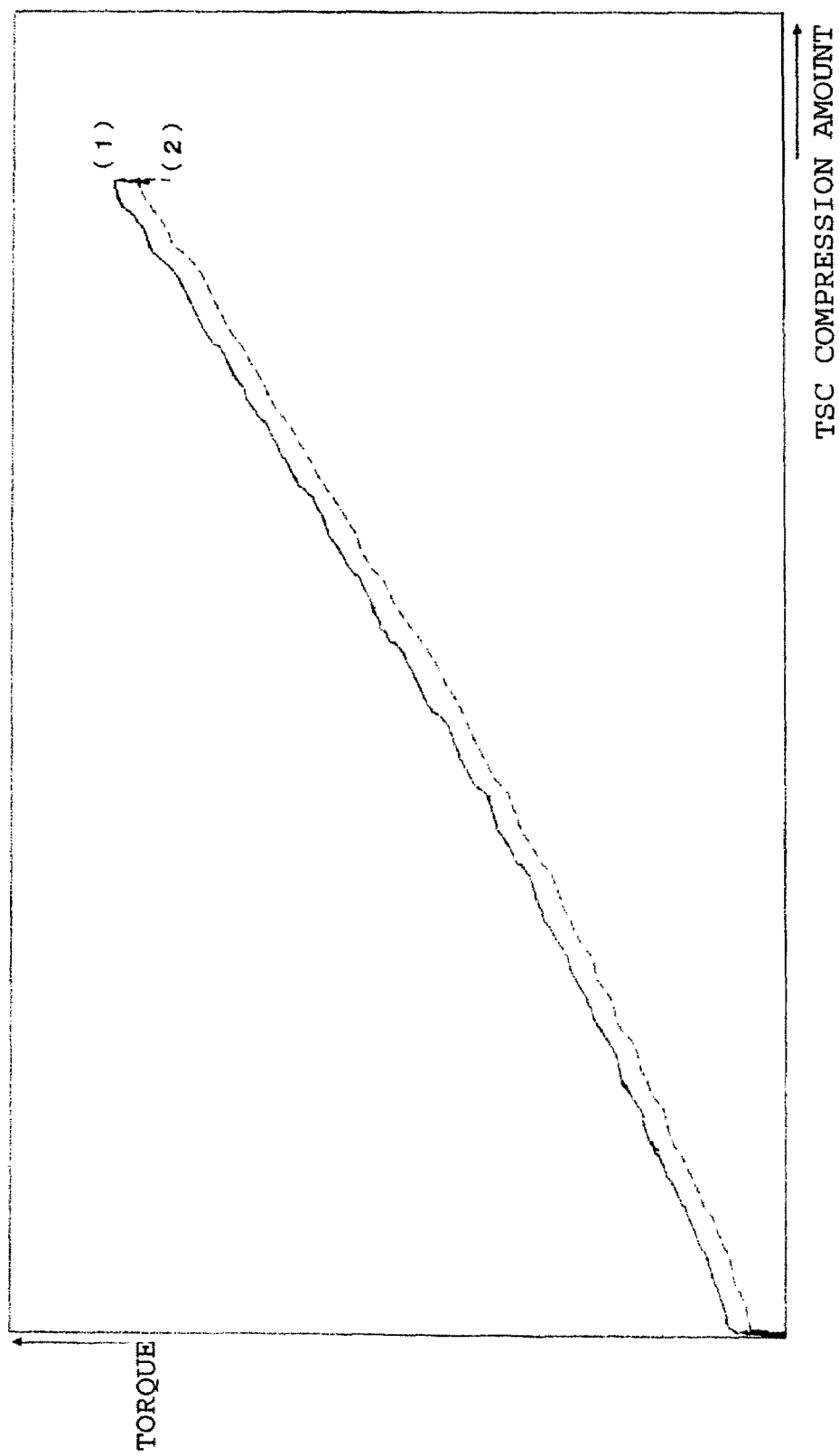
FIG. 35 shows correlation data between a spring cartridge compression amount and a torque among correlation data obtained by performing X-Y transformation on acquired data.

When the correlation diagram (i.e., torque curve) of "compression amount versus torque" shown in FIG. 35 is used, the change by aging in the compressed load of the spring cartridge 13 can be diagnosed accurately. For example, as shown in FIG. 35, when the torque curve (1) acquired at the time of installation of the spring cartridge 13 is compared with the torque curve (2) acquired after the elapse of a predetermined time, it is obviously recognized that the compressed load has varied and decreased so that the torque curve (2) has changed toward the low torque side relative to the torque curve (1). The decrease change in the compressed load can be attributed, for example, to degradation (wear or the like) in the dish spring constituting the spring cartridge 13. Thus, on the basis of the degree of decrease of the compressed load, it is diagnosed that the change by aging has progressed in the dish spring and that the dish spring need be changed soon. Further, when trend management is performed on the degree of decrease in the compressed load acquired at predetermined time intervals, the next change time can be predicted for the dish spring.

The above-mentioned description has been given for a technique in which the state of change in the compressed load of the spring cartridge 13 acquired continuously so that the change tendency is monitored, and then the change by aging is recognized in the dish spring of the spring cartridge 13 so that the next exchange time is predicted. However, such a prediction method based on the change by aging is not limited to that based on the change by aging in the dish spring. That is, the method may widely be applied to various kinds of factors concerning the diagnosis items on the driving force of the electrically operated valve. Further, when the change tendency in the torque curve, the change tendency in the current value of the motor, the change tendency in the yoke stress, and the like are recognized, this permits, for example, prediction of the next maintenance time required by the change by aging in the drive system and prediction of the next exchange time for the valve element and the valve rod required by wear, deformation, and the like. Thus, the present invention is remarkably effective from the viewpoint of ensuring stable and reliable operation of the electrically operated valve for a long term.

Figure 36:
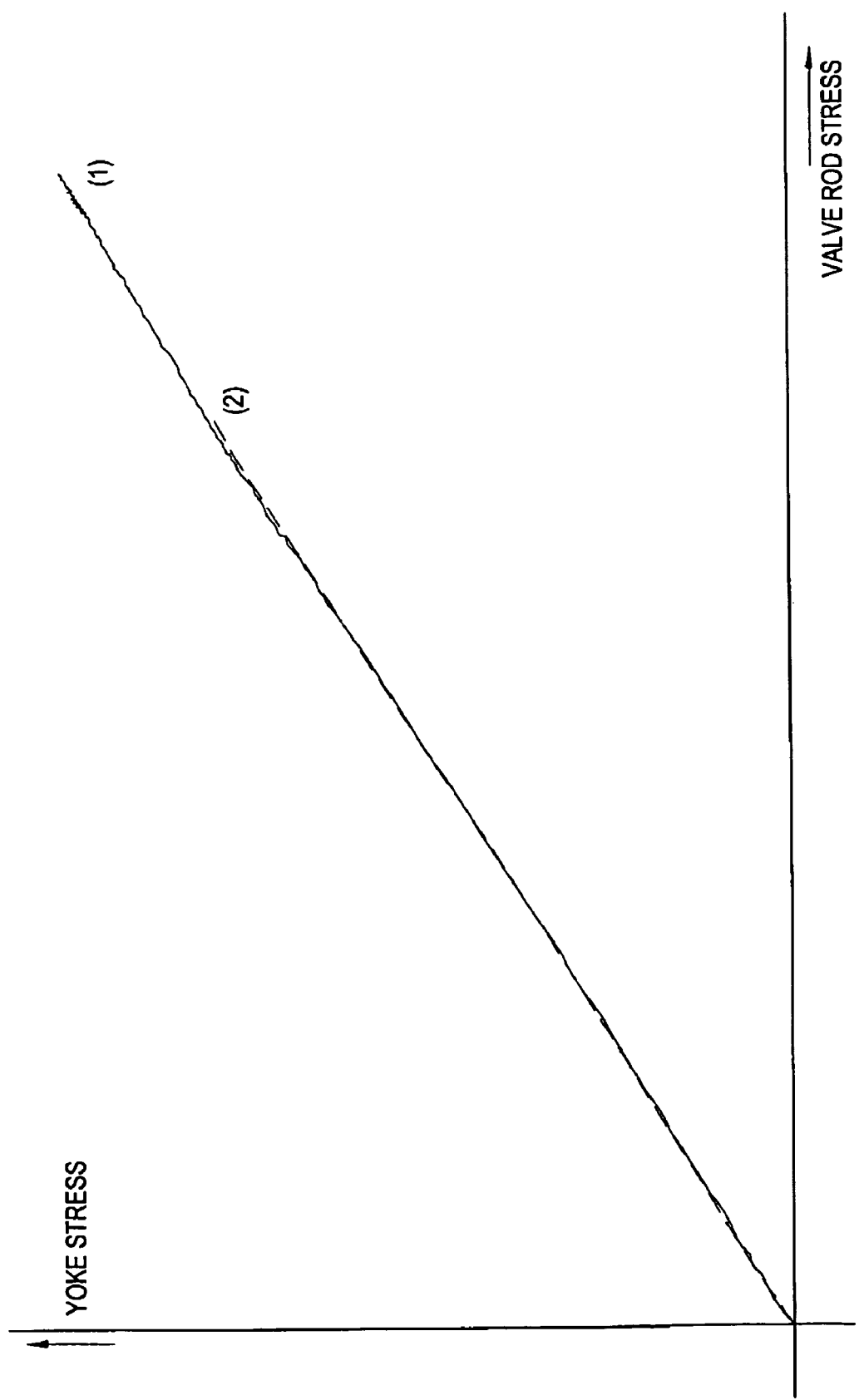
FIG. 36 shows correlation data between a valve rod stress and a yoke stress among correlation data obtained by performing X-Y transformation on acquired data.

From the correlation diagram of "valve rod stress versus yoke stress" shown in FIG. 36, for example, diagnosis can be performed on the poor operation of the drive mechanism and the presence or absence of a deviation in the setting value of the set-up torque of the spring cartridge 13. For example, as shown in FIG. 36, as a result of comparison between the correlation curve (1) acquired at the time of installation of the spring cartridge 13 in the normal state and the correlation curve (2) acquired after the elapse of a predetermined time from the installation, when the curve length of the correlation curve (2) is shorter than that of the correlation curve (1) so that the maximum stresses of both of the valve rod stress and the yoke stress are recognized as having varied and decreased, as one possibility, this can be attributed to decrease in the valve rod driving force (the driving force actually transmitted from the worm side through the stem nut to the valve rod). Here, this decrease in the valve rod driving force is caused by poor operation in the drive (for example, a state that a frictional resistance has increased because of run out of oil in the stem nut part or the like so that the transmission efficiency of the driving force from the worm side to the valve element side has decreased) or alternatively by a deviation in the setting value of the set-up torque of the spring cartridge 13 (i.e., a variation in the setting value toward the low torque side). Thus, accurate diagnosis can be performed on the poor operation of the drive mechanism and the presence or absence of a deviation in the setting value of the set-up torque. Further, when these correlation curves are located on the same straight line, it is checked that no change arises in the sensitivity characteristics of each sensor, and hence the sensors operate in a normal state.

Figure 37:
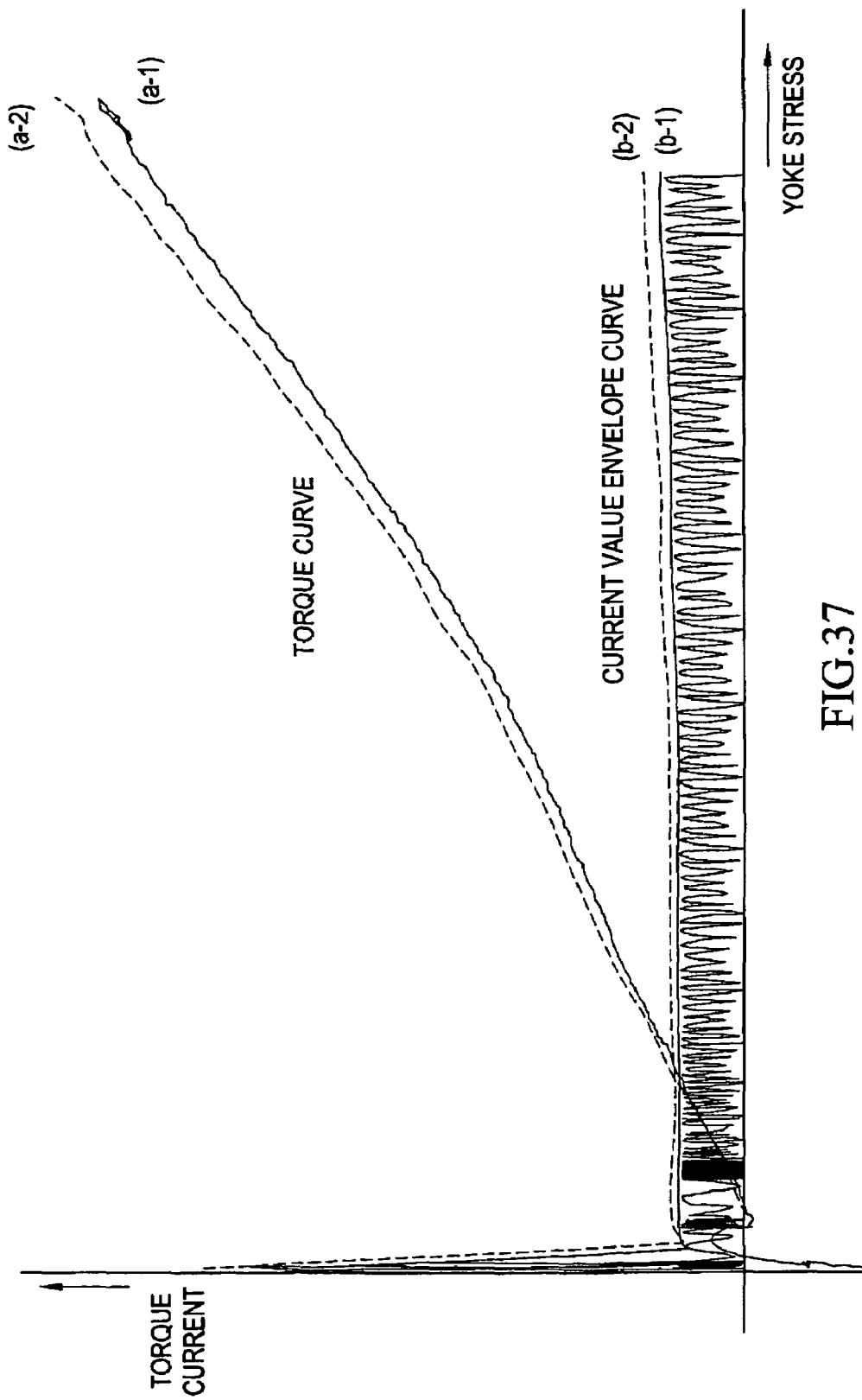
FIG. 37 shows correlation data between a yoke stress (valve rod stress), a torque (spring cartridge compression amount), and a current value envelope among correlation data obtained by performing X-Y transformation on acquired data.

According to the correlation diagram of "yoke stress (valve rod stress) versus torque (TSC compression amount) and current value envelope" shown in FIG. 37, the following diagnosis can be performed. (Here, since the yoke stress has linear correlation with the valve rod stress, "yoke stress" may be read as "valve rod stress". Further, since the torque has linear correlation with the compression amount of the spring cartridge (abbreviated as TSC) in a range at or above the compressed load, "torque" may be read as "compression amount of spring cartridge".)

Here, in a case that the operation of the electrically operated valve is normal, the torque curve is denoted by (a-1), while the current value envelope curve (a curve obtained as the envelope of the peaks of the current values) is denoted by (b-1). Further, in a case that a predetermined time has elapsed, the torque curve is denoted by (a-2), while the current value envelope curve is denoted by (b-2). In this situation, for example, when the torque curve is maintained intact as (a-1) while the current value envelope curve has varied from (b-1) to (b-2), this situation indicates that the current value has varied in the direction of increase in the current value of the motor relative to the normal state. This change tendency indicates, for example, that an appropriate torque is transmitted from the worm part to the valve element side but that the motor is in a state of high load operation. Thus, it is diagnosed that a trouble has arisen in a part from the worm part to the motor side.

In contrast, for example, when the torque curve has varied from (a-1) to (a-2), this situation indicates that a large torque is necessary in correspondence to the same yoke stress in comparison with the normal state. This indicates a decrease in the transmission efficiency of the driving force from the worm side to the valve element side. Thus, as one possibility, a frictional resistance has increased because of run out of oil in the stem nut part or the like so that the transmission efficiency of the driving force has decreased.

Figure 38:
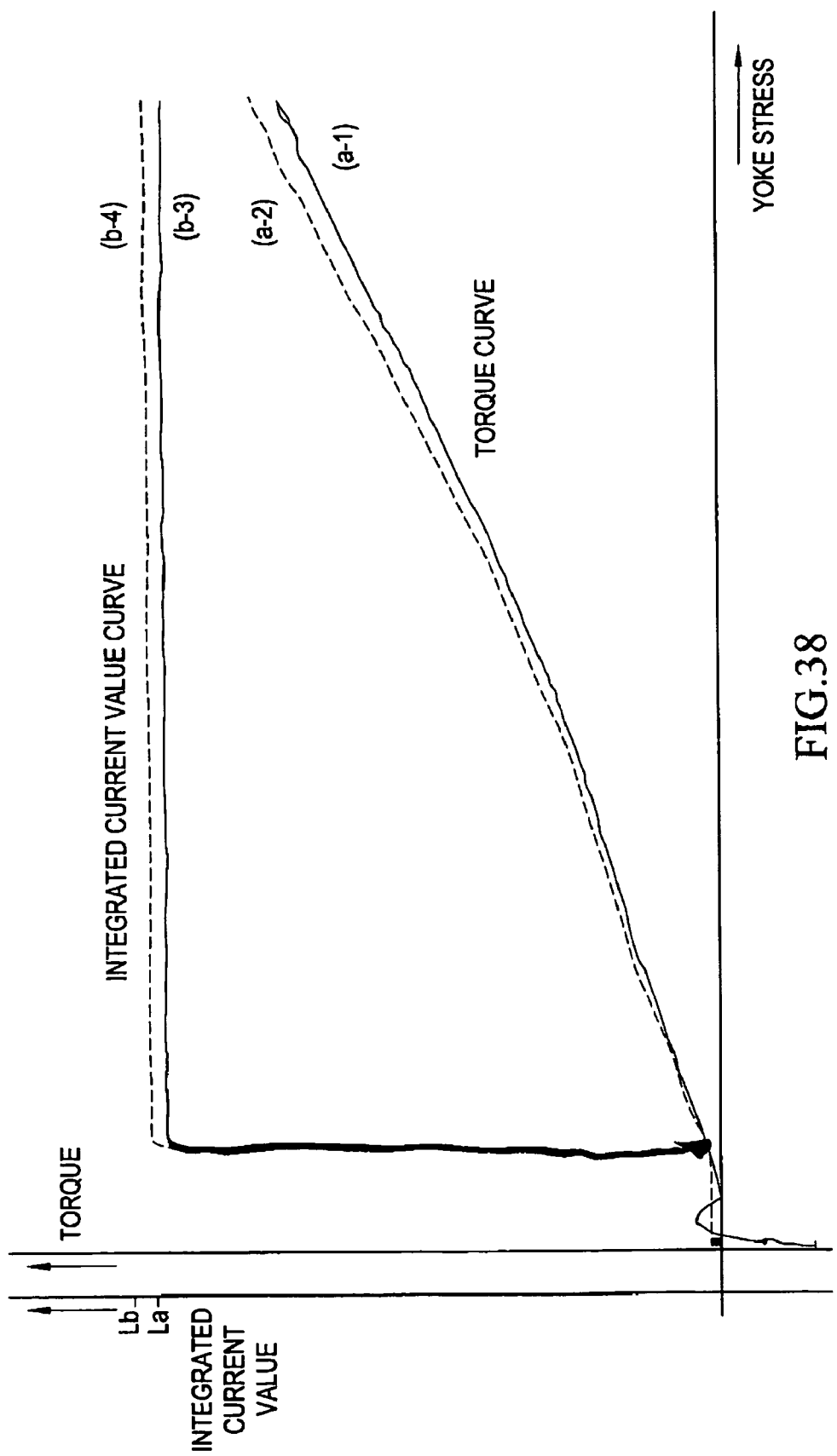
FIG. 38 shows correlation data between a yoke stress (valve rod stress), a torque (spring cartridge compression amount), and a current (integrated value) among correlation data obtained by performing X-Y transformation on acquired data.

FIG. 38 shows a correlation diagram obtained by converting the correlation diagram of "yoke stress (valve rod stress) versus torque (TSC compression amount) and current value envelope" of FIG. 37 into that of "yoke stress (valve rod stress) versus torque (TSC compression amount) and integrated current value (a value obtained by time integration of the current value)". Further, FIG. 38 shows enlargement of apart of the Y-axis of the integrated current value curve (this corresponds to FIG. 34 showing the ending part of close operation in FIG. 33). Here, in a case that the operation of the electrically operated valve is normal, the torque curve is denoted by the curve (a-1), while the integrated current value curve is denoted by the curve (b-1) Further, in a case that a predetermined time has been elapsed, the torque curve is denoted by the curve (a-2), while the integrated current value curve is denoted by the curve (b-2). Then, according to this correlation diagram of "yoke stress (valve rod stress) versus torque (TSC compression amount) and integrated current value", the integrated current value is displayed as the time integration of the current value. This smoothes the variation in the measurement data caused in association with the sampling of the current value that has time-dependent variation. This permits more precise diagnosis on the abnormality on the motor side.

Meanwhile, in a diagnosis technique for an electrically operated valve as shown in FIG. 34, the torque setting value is diagnosed on the basis of the torque at the time of current OFF. That is, when the torque switch is actuated, the motor current goes OFF so that the motor stops. Thus, as shown in the figure, in a case that the torque at the time of current OFF is to be diagnosed as the torque setting value, when the correlation database of "yoke stress versus torque" shown in FIG. 37 is used, the torque setting value can be diagnosed more easily on the basis of the yoke stress. This permits simple, rapid, and labor saving diagnosis work in comparison with the diagnosis on the torque setting value in which the compression force of the spring cartridge is measured directly. Further, in this case, the valve rod stress and the valve element closing force (valve seat force) which are the intrinsic functions of the valve can be diagnosed directly on the basis of the yoke stress.

Here, a criterion value in the torque setting value (allowed value=criterion value±10%) is calculated from various kinds of resistance force: criterion value=constant×valve rod stress=constant×(valve element closing force+packing force+resistance force by fluid).

II: Second Embodiment

Figure 31:
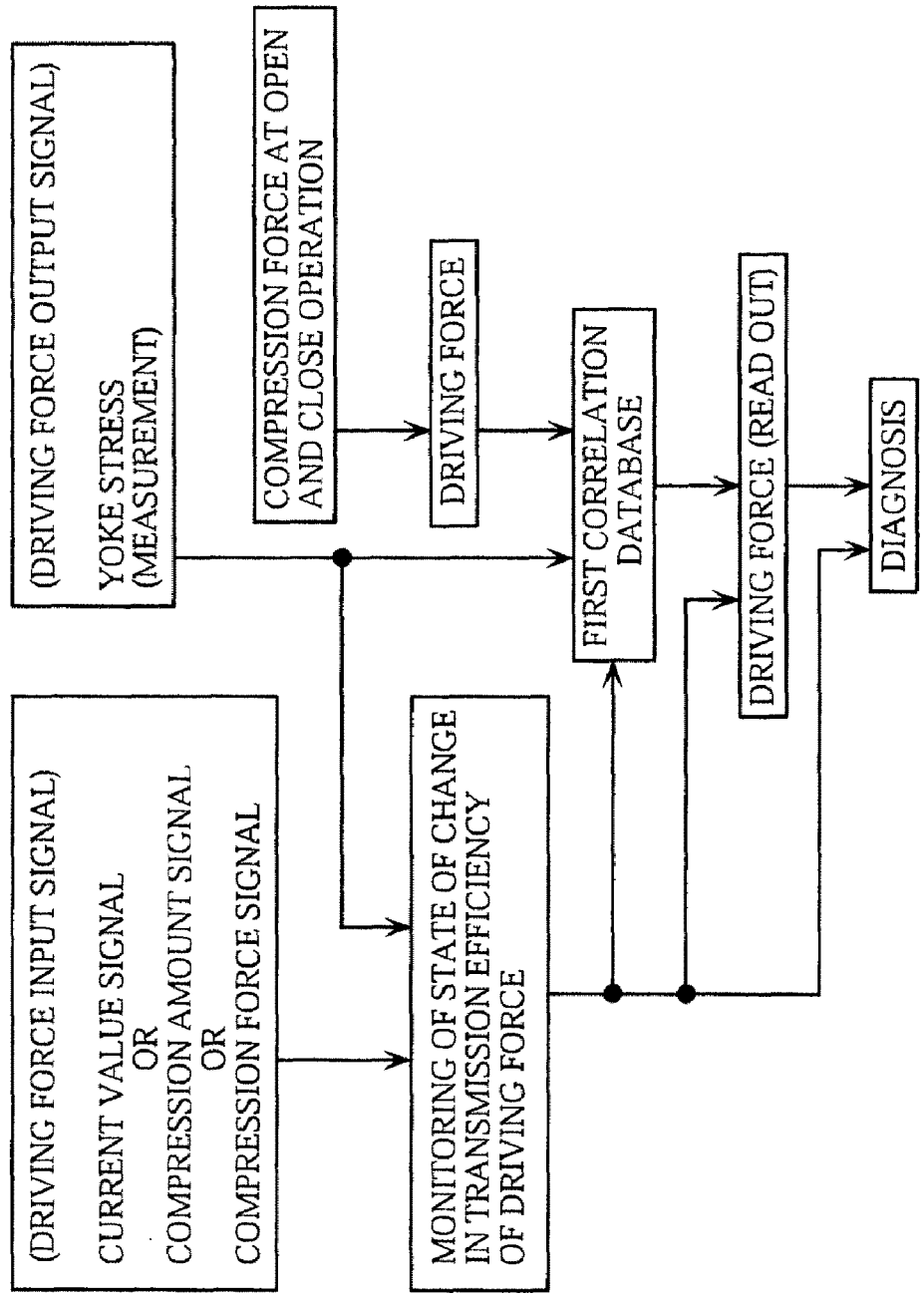
FIG. 31 is a functional block diagram in a diagnosing method for an electrically operated valve according to a second embodiment of the invention of the present application.

A diagnosing method and a diagnosing apparatus according to a second embodiment correspond to aspects 1, 2, 3, 5, and a concerning the diagnosing method and aspects 9, 10, 11, 13, and 16 concerning the diagnosing apparatus. As shown in FIG. 31, similarly to the first embodiment, a first diagnosis mode and a second diagnosis mode simultaneously are provided.

II-A: First Diagnosis Mode

In the first diagnosis mode, a first correlation database between the yoke stress and the driving force is used, while the yoke stress is solely measured, and while a driving force corresponding to the yoke stress is read out from the first correlation database. Then, on the basis of this, the driving force of the electrically operated valve is diagnosed. In this case, especially in the present embodiment, as shown in FIG. 2, an electrically operated valve is treated that has a configuration where a calibrated strain gauge 37 (before the expiration of calibration) is arranged on the spring cartridge 13 side. Then, at the time of diagnosis, the strain gauge 37 measures and acquires the compression force of the spring cartridge 13 at both of close operation and open operation, while the above-mentioned pair of the strain gauges 51 and 52 provided in the yoke 50 measure and acquire the yoke stress at both of close operation and open operation.

Then, in this diagnosing method, on the basis of the compression force actually measured at both of open operation and close operation and the yoke stress at both of open operation and close operation, correlation between the driving force and the yoke stress is obtained and acquired as a first correlation database. In the next and the subsequent occasions of diagnosis, the yoke stress is solely acquired by measurement. Then, a driving force corresponding to the acquired yoke stress is read out from the first correlation database, so that on the basis of this read-out driving force, the driving force of the electrically operated valve is diagnosed.

The above-mentioned diagnosis on the driving force can be performed directly by the strain gauge 37 when the strain gauge 37 is within a validity duration of calibration. That is, as shown in FIG. 2, the diagnosis can be performed in a state similar to the normal operation, that is, in a state that the cap 46 is attached to the outer end side in the axial direction of the spring cartridge 13. Thus, without the necessity of additional work, the normal operation can immediately be shifted into diagnosis work. Further, when required, diagnosis can continuously be performed during the normal operation. Nevertheless, precise diagnose cannot be performed after the expiration of calibration of the strain gauge 37.

Thus, in the diagnosing method of the present embodiment, a driving force corresponding to the yoke stress acquired by measurement is read out from the correlation database, so that on the basis of this read-out driving force, the electrically operated valve is diagnosed. Thus, for example, even after the expiration of calibration of the strain gauge 37 for measuring directly the driving force obtained from the compression force of the spring cartridge 13 at each time of diagnosis, precise diagnosis can be performed by the strain gauges 51 and 52. This accelerates the reduction in the diagnosis cost achieved by the labor saving.

Meanwhile, in the actual operation of the electrically operated valve, for example, owing to the generation of a frictional force in the valve element driving section or the like, the force actually acting on the valve rod does not necessarily have a fixed relation with the driving force. For example, when run out of oil occurs in the stem nut part, even when the driving is performed at a predetermined driving force, the force actually acting on the valve rod becomes smaller than that in a state that the oil is not run out. Thus, as described above, diagnosis based only on the driving force is insufficient from the viewpoint of diagnosis on the force acting on the valve element or the valve rod which is to be diagnosed as the intrinsic function of the electrically operated valve. However, according to the present embodiment, a stress corresponding to the valve rod stress can be recognized from the yoke stress acquired by measurement. Further, the torque can directly be recognized by the strain gauge 37 (within a validity duration of calibration). Thus, on the basis of comparison between the valve rod stress and the torque, the drive transmission mechanism can be diagnosed. As a result, in combination with the diagnosis on the driving force, overall diagnosis can be performed in the electrically operated valve.

Further, before the time (i.e., calibration expiration) arrives that the pair of strain gauges 51 and 52 provided in the yoke 50 should be changed, strain gauges for replacement may be attached near the attaching position of the strain gauges 51 and 52, so that correlation may be recognized between the output characteristics of the existing strain gauges 51 and 52 and the output characteristics of the strain gauges for replacement. Then, after the replacement from the existing strain gauges 51 and 52 into the strain gauges for replacement, the correlation may be reflected into the output characteristics of the strain gauges for replacement, so that calibration may be performed sequentially. According to this, the strain gauge 37 provided on the spring cartridge 13 side can be calibrated on the basis of the correlation database by the strain gauges 51 and 52 provided in the yoke 50.

Here, as an alternative to the method that the strain gauge 37 provided on the spring cartridge 13 side is calibrated by the pair of strain gauges 51 and 52 provided in the yoke 50 as described above, as shown in FIG. 4, the sensor unit 40 having the load cell 33 and the laser sensor 34 may be attached in place of the cap 46. Then, the output value of the load cell 33 calibrated in advance may be compared with the output value of the strain gauge 37, so that the strain gauge 37 may be calibrated by the load cell 33. In this case, the load cell 33 is attached externally, and hence its calibration is easy. Thus, when this calibrated load cell 33 is used, the strain gauge 37 can be calibrated easily. This permits simple and rapid calibration work, for example, in comparison with a case that the strain gauge 37 need be removed from the electrically operated valve before the calibration.

Further, as shown in FIG. 5, in place of the cap 46, a sensor unit 47 having only the laser sensor 34 may temporarily be attached to the outer end side in the axial direction of the spring cartridge 13 by the adaptor 38, so that the compression amount of the spring cartridge 13 may be measured by the laser sensor 34. As a result, the torque curve may be acquired from the correlation with the strain gauge 37. Thus, for example, when the sensor unit 47 is installed permanently so that the torque curve acquired always is displayed, the change by aging in the compressed load of the spring cartridge 13 can be diagnosed easily.

Further, the laser sensor 34 merely measures the compression amount of the spring cartridge 13. Thus, in place of the laser sensor 34, for example, a differential type position measuring mechanism having a differential transformer may also be employed as long as such a function is provided. Further, as the sensor unit 47, the sensor unit 40 may obviously be employed that has the load cell 33 in addition to the laser sensor 34 as shown in FIG. 4.

Further, in the present embodiment, when each of the correlation databases is displayed by display means, determination of each diagnosis item based on the correlation becomes easy in the diagnosis of the electrically operated valve. This permits easy and rapid diagnosis work for the electrically operated valve. Further, this labor saving reduces the diagnosis cost.

II-B: Second Diagnosis Mode

In the second diagnosis mode, similarly to the second diagnosis mode in the first embodiment, on the basis of the driving force inputted to the valve element driving section and the driving force outputted from the valve element driving section, a state of change is monitored in a transmission efficiency of the driving force in the valve element driving section, so that the state of change is reflected into the first diagnosis mode described above.

Here, description is given for: a monitoring technique of the state of change in the transmission efficiency of the driving force; a diagnosis technique where its monitoring result is reflected into various kinds of diagnosis in the first diagnosis mode; and the like.

In FIG. 31, the yoke stress acquired by the strain gauges 51 and 52 by measurement is adopted as the driving force output signal from the valve element driving section, while any of the current value signal, the compression amount signal, and the compression force signals is adopted as the driving force input signal. Here, among these output signals, the current value signal is adopted as the driving force input signal. This current value signal is used for generating a voltage corresponding to the magnitude of magnetism when the magnetic sensor 60 (see FIG. 7) senses magnetism from the electric wire 62 accommodated in the conduit tube 61. Thus, the current value signal does not directly serve as the drive force input signal. Accordingly, for example, correlation between this current value and the compression force of the spring cartridge 13 is obtained in advance. Then, on the basis of this correlation, a driving force corresponding to the current value is acquired and adopted as the driving force inputted to the valve element driving section.

Then, the driving force input signal obtained from this current value signal is compared with the driving force output signal obtained on the basis of the yoke stress, so that a state of change is monitored in the transmission efficiency of the driving force in the valve element driving section.

Here, the diagnostic contents based on the monitoring result of the state of change in the transmission efficiency of the driving force and the technique of reflecting it into the first diagnosis mode are the same as those described with reference to FIGS. 25-29 in the section of the second diagnosis mode in the first embodiment. Thus, the description given above is referred to, so that duplicated explanation is omitted here.

III: Third Embodiment

Figure 32:
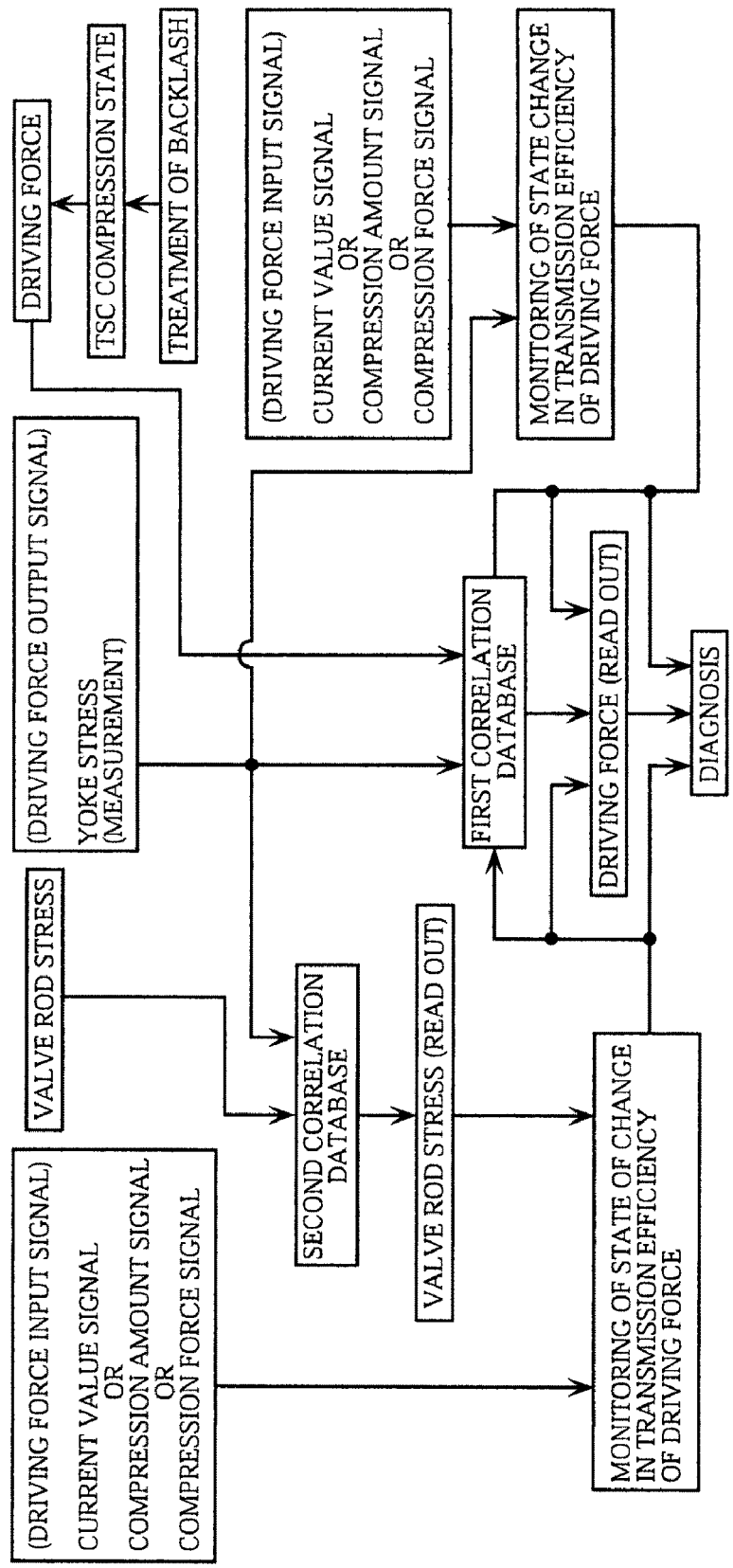
FIG. 32 is a functional block diagram in a diagnosing method for an electrically operated valve according to a third embodiment of the invention of the present application.

A diagnosing method and a diagnosing apparatus according to a third embodiment correspond to aspects 1-5. As shown in FIG. 32, in addition to that a first diagnosis mode and a second diagnosis mode are provided similarly to the first embodiment, a third diagnosis mode is further provided. In the first diagnosis mode, diagnosis on the driving force is performed by using the first correlation database between the yoke stress and the driving force. In the second diagnosis mode, on the basis of the driving force inputted to the valve element driving section and the yoke stress outputted from the valve element driving section, a state of change is monitored continuously in the transmission efficiency of the driving force in the valve element driving section, so that the state of change is reflected into the first diagnosis mode. The contents of these first and second diagnosis modes are the same as that in the first embodiment.

On the other hand, in the third diagnosis mode, the valve rod stress acting on the valve rod 1 is acquired. Then, on the basis of this valve rod stress and the driving force inputted to the valve element driving section, the value of the transmission efficiency of the driving force in the valve element driving section or a state of change in the value is monitored, so that the state of change is reflected into the first diagnosis mode described above.

Further, the reason why the strain gauge is provided directly in the valve rod 1 while the data is not acquired by measurement but is acquired on the basis of the correlation with the yoke stress is as follows.

First, the valve rod stress is the stress acting directly on the valve element and corresponds to the load actually acting on the valve element. Thus, when the electrically operated valve is diagnosed on the basis of the value of the valve rod stress, a remarkably reliable diagnostic result is obtained. Second, the valve rod stress is usually measured by sticking the strain gauge 55 directly on the valve rod 1 as shown in FIG. 6, while the valve rod 1 moves up and down in the axial direction in association with open and close operation of the valve element. Thus, in a case that the strain gauge 55 is installed permanently in the valve rod 1 so that measurement is performed at each time of diagnosis work, when the exposed part of the valve rod is shorter than the up and down movement distance of the valve rod, the strain gauge 55 can bite the packing section on the valve element side so as to disturb the operation of the valve rod 1. Thus, frequency is desired to be reduced as low as possible in the direct measurement of the valve rod stress. Third, the yoke stress is recognized theoretically as a reaction force to the valve rod stress, and hence has remarkably good correlation with the valve rod stress. Further, the yoke stress can be measured in a part exposed to the outside of the electrically operated valve as shown in FIG. 6. Thus, the yoke stress can be measured easily by sticking the strain gauges 51 and 52 in the above-mentioned part. Further, even when installed permanently, the strain gauges 51 and 52 do not disturb the operation of the electrically operated valve.

The contents of each diagnosis mode are described below in detail with reference to FIG. 32.

III-A: First Diagnosis Mode

In the first diagnosis mode, first, at both of open operation and close operation of the electrically operated valve, correlation is acquired between the yoke stress and the driving force that is obtained from the compression state of the spring cartridge 13, and then possessed as a first correlation database.

Here, the first correlation database is acquired between information values having correlation. The yoke stress acting on the yoke 50 is a reaction force of the valve rod stress acting on the valve rod 1, and recognized as driving force output from the valve element driving section. Further, the torque acting on the stem nut 2 is as a product between the compression force of the spring cartridge 13 and the radius dimension of the worm wheel 4, while correlation exists between this driving force (treated as a "torque", here) and the yoke stress. Thus, as shown in FIG. 15, a correlation curve L is set up with adopting the torque and the yoke stress as parameters. This is adopted as the first correlation database.

Here, in the present embodiment, as described above, a strain gauge is not provided on the spring cartridge 13 side, while the sensor unit 30 is provided. Thus, because of the structure of the sensor unit 30, the compression force at open operation cannot be acquired by measurement. Accordingly, the sensor unit 30 acquires the compression force and the compression amount at close operation of the spring cartridge 13 and the compression amount at open operation. Then, after the spring characteristics of the spring cartridge 13 is first acquired on the basis of the compression force and the compression amount at close operation, a compression force corresponding to the compression amount at open operation is read from the spring characteristics. Then, on the basis of this, a compression force at both of open operation and close operation is obtained. Then, on the basis of this compression force, a driving force is acquired by arithmetic operation and then held.

In this case, a dimensional tolerance, that is, a "backlash", unavoidably arises between the axial length of the spring cartridge 13 and the end-face-to-end-face distance of the spring cartridge accommodating section on the valve element driving section side. Thus, in the measurement of the compression amount of the spring cartridge 13, unless the compression amount is acquired in a state that the amount of backlash is removed, an accurate compression amount is not obtained, and hence reliability is not ensured in the first correlation database itself. Thus, in the present embodiment, the invention according to claim 8 is applied. That is, "treatment of backlash" is performed in the acquisition process for the driving force, so that an accurate compression amount is obtained. Then, on the basis of this accurate compression amount, the driving force is acquired. This "treatment of backlash" is the same as that described in the first embodiment.

After the first correlation database is acquired and possessed as described above, in the next and the subsequent occasions of diagnosis, the yoke stress which can always be measured easily from the outside of the electrically operated valve and which serves as the driving force output signal from the valve element driving section is solely acquired by measurement. Then, with reference to the first correlation database, a torque (torque T in FIG. 15) corresponding to the yoke stress (yoke stress σ in FIG. 15) acquired by measurement is read out. Then, on the basis of this read-out torque, the driving force of the electrically operated valve is diagnosed.

As shown in FIG. 6, the yoke stress is acquired by the strain gauges 51 and 52 arranged in the yoke 50. In this case, in the present embodiment, the attaching positions of the strain gauges 51 and 52 relative to the yoke 50 are set up as follows. That is, the yoke 50 has a bifurcated shape provided with a pair of right and left supporting rods 53 and 54 arranged across between the lower flange section 56 abutted against and fixed to the valve box 61 side and the upper flange section 57 abutted against and fixed to the valve element driving section 62 side as described above. Further, the valve rod 1 is arranged at the middle position between the pair of supporting rods 53 and 54 in a state of penetrating in the up and down directions.

Then, the strain gauges 51 and 52 are stuck respectively at positions near the inner centers of the pair of supporting rods 53 and 54 of the yoke 50. The present applicant and the like have confirmed, by experiment, that the inner center positions of the supporting rods 53 and 54 at which the strain gauges 51 and 52 are stuck are sites where a large strain amount is generated stably in the yoke 50. Thus, when the strain gauges 51 and 52 are arranged at these positions, the yoke stress acquired by measurement using the strain gauges 51 and 52 becomes reliable, and so does the torque that is read out in correspondence to the yoke stress with reference to the first correlation database. This improves further the precision and the reliability in the diagnostic result of the electrically operated valve.

Further, the strain gauges 51 and 52 are arranged respectively at symmetrical positions across the valve rod axis center part in the yoke 50, while the average of the output values of the strain gauges 51 and 52 is acquired as the yoke stress. This configuration improves further the reliability in the measured value itself of the yoke stress measured by the strain gauges 51 and 52. As a result, further improvement is expected in the precision and the reliability in the diagnostic result of the electrically operated valve.

In this case, between the strain gauges, a slight variation in the output characteristics is unavoidably caused by the manufacturing tolerance. Thus, it is preferable that the pair of strain gauges 51 and 52 attached to the yoke 50 of the same electrically operated valve are selected from those having similar output characteristics. Such setup improves further the above-mentioned effect, that is, the reliability in the measured value of the yoke stress which is achieved by acquiring the yoke stress as the average of the output values of the strain gauges 51 and 52.

Further, it is preferable that the employed strain gauge has a structure that a metal flange is attached to the sensor element part. In the strain gauge having this structure, when the strain gauge is attached to the yoke 50 of the electrically operated valve, the flange part can be welded to the surface of the yoke 50 by spot welding. This avoids, for example, the necessity that when the strain gauge is to be stuck to the surface of the yoke 50 with adhesive, the next work should be stopped until the adhesive has cured so that an adhesive strength is obtained. This allows the strain gauge to be attached in a remarkably short time, and permits almost simultaneous attachment of a plurality of strain gauges. Thus, this is remarkably advantageous from the viewpoint of simplifying the strain gauge attaching work and speeding up the work. Here, the strain gauge attached to the yoke 50 is often exposed to moisture such as rain. Thus, it is preferable that the employed strain gauge is of a water-proof type in which the sensor element is molded completely.

According to this first diagnosis mode, the first correlation database is possessed as a database (see FIG. 15) indicating the correlation between the yoke stress acting on the yoke and the torque obtained from the compression force of the spring cartridge 13. Then, when the correlation database is referred to, a torque (torque T in FIG. 15) corresponding to the yoke stress (yoke stress σ in FIG. 15) acquired by measurement is read out. Thus, in the subsequent occasions of diagnosis, only the yoke stress may be acquired by measurement. Then, when with reference to the first correlation database, the torque obtained from the compression force of the spring cartridge 13 is read out, the driving force of the electrically operated valve is diagnosed on the basis of this torque. Thus, for example, in comparison with a case that in each occasion of diagnosis on the driving force of the electrically operated valve, the torque obtained from the compression force of the spring cartridge is acquired so that the diagnosis is performed, the diagnosis work becomes remarkably simple. Further, the work can be performed with good workability. This labor saving accelerates reduction in the diagnosis cost.

Further, in this case, the yoke stress is the stress acting on the yoke 50 exposed to the outside of the electrically operated valve, and hence can be measured from the outside of the electrically operated valve. Thus, the measurement that the strain gauges 51 and 52 are attached here so that the stress corresponding the strain amount, that is, the yoke stress, is acquired becomes remarkably easy in comparison with, for example, a case that a part of the electrically operated valve is opened while a strain gauge is installed in the inside so that the stress is measured. This improves further the diagnosis workability. Further, this labor saving reduces further the diagnosis cost.

III-B: Second Diagnosis Mode

In a second diagnosis mode, as described above, on the basis of the driving force inputted to the valve element driving section and the driving force outputted from the valve element driving section, a state of change is monitored in the transmission efficiency of the driving force in the valve element driving section, so that the state of change is reflected into the first diagnosis mode.

In FIG. 32, the yoke stress acquired by the strain gauges 51 and 52 by measurement is adopted as the driving force output signal from the valve element driving section, while any of the current value signal, the compression amount signal, and the compression force signals is adopted as the driving force input signal. Here, among these output signals, the current value signal is adopted as the driving force input signal. This current value signal is used for generating a voltage corresponding to the magnitude of magnetism when the magnetic sensor 60 (see FIG. 7) senses magnetism from the electric wire 62 accommodated in the conduit tube 61. Thus, the current value signal does not directly serve as the drive force input signal. Accordingly, for example, correlation between this current value and the compression force of the spring cartridge 13 is obtained in advance. Then, on the basis of this correlation, a driving force corresponding to the current value is acquired and adopted as the driving force inputted to the valve element driving section.

Then, the driving force input signal obtained from this current value signal is compared with the driving force output signal obtained on the basis of the yoke stress, so that a state of change is monitored in a transmission efficiency of the driving force in the valve element driving section. Then, the result is reflected into the first diagnosis mode. This technique of reflection is similar to that described in the section of the second diagnosis mode in the first embodiment described above. Thus, the description given above is referred to, so that duplicated explanation is omitted here.

III-C: Third Diagnosis Mode

In the third diagnosis mode, the valve rod stress is adopted as the driving force outputted from the valve element driving section. Then, on the basis of the driving force inputted to the valve element driving section and the valve rod stress, the value of the transmission efficiency of the driving force in the valve element driving section or a state of change in the value is monitored, so that the state of change is reflected into the first diagnosis mode described above.

The basic idea and the like of the third diagnosis mode are described below.

In the third diagnosis mode, attention is focused also on the diagnosis on the valve rod stress. Its intention is as follows.

The driving force outputted from the driving source such as a motor is transmitted through the valve element driving section to the valve rod. Thus, when a frictional force arises in the valve element driving section, the driving force inputted to the valve element driving section disagrees with the force transmitted from the valve element driving section to the valve rod, so that a difference arises between these forces. For example, when run out of oil occurs in a stem nut part so that a frictional force arises, this reduces the transmission efficiency of the driving force in the valve element driving section (i.e., the ratio between the input of the valve element driving section and the output from the valve element driving section). Thus, even when a driving force of a predetermined magnitude is inputted, the force actually acting on the valve rod becomes smaller than in a case that the oil is not run out.

Thus, in the third diagnosis mode, the force actually acting directly on the valve element, that is, the valve rod stress acting on the valve rod, is acquired which is a subject matter to be diagnosed as the intrinsic function (such as a closing function) of the electrically operated valve.

Further, the magnitude of the valve rod stress can be obtained numerically accurately. Thus, for example, when the friction coefficient μ between the valve rod and the stem nut is obtained, precise diagnosis is achieved concerning whether the value falls within an appropriate range. Thus, using this friction coefficient μ, when diagnosis is performed on the basis of quantitative comparison with a designed value or the like concerning the electrically operated valve, quantitative and easy determination is achieved whether the situation of friction (situation of lubrication) of the valve element driving section is normal or abnormal. This point is also one of the reasons that the valve rod stress is used in the diagnosis of the electrically operated valve.

The contents of the third diagnosis mode are described below.

In FIG. 32, first, when the electrically operated valve can be operated to the full close side, a known axial force measured by the valve rod stress sensor is applied on the valve rod 1, so that the yoke stress at that time is measured and acquired together with the valve rod stress. Then, correlation between the yoke stress and the valve rod stress is acquired and possessed as a second correlation database.

Then, in a case that the third diagnosis mode is performed so that the transmission efficiency of the present driving force is to be acquired in the valve element driving section, the yoke stress acting on the yoke 50 is acquired by measurement by the strain gauges 51 and 52, while the driving force inputted to the valve element driving section is measured and acquired, for example, by the magnetic sensor 60 (see FIG. 7).

After that, with reference to the second correlation database, a valve rod stress corresponding to the yoke stress acquired by measurement is read out. Then, the read-out valve rod stress is compared with the driving force, so that the transmission efficiency of the driving force at present time is checked.

Then, this checked transmission efficiency of the driving force is reflected into the diagnosis in the first diagnosis mode. This technique of reflection is similar to that described in the section of the second diagnosis mode in the first embodiment described above. Thus, the description given above is referred to, so that duplicated explanation is omitted here.

Further, in the third diagnosis mode, the valve rod stress is acquired numerically. Thus, when this numerically obtained valve rod stress is used so that appropriateness is checked in the correlation between the driving force and the valve rod stress, reliable diagnosis is achieved concerning the lubrication of the valve element driving section. Further, in this case, the valve rod stress is not directly acquired by measurement, but is measured by using the second correlation database on the basis of the yoke stress that can be measured easily. This reduces the diagnosis cost, and improves the reliability of the diagnostic result.

That is, in the third diagnosis mode, the valve rod stress is used in the checking of the transmission efficiency of the driving force. However, since the magnitude of the valve rod stress is acquired numerically, when the valve rod stress is used, the friction coefficient $\mu$ in the valve element driving section can accurately be acquired numerically.

Specifically, the friction coefficient $\mu$ in the valve element driving section of the electrically operated valve is obtained by a well-known friction coefficient formula "=[A×(torque/valve rod stress)−B×d]/[d+C×(torque/valve rod stress)], where d denotes the effective stem diameter and A, B, and C are constants)". Here, in this formula, the factors other than the "torque/valve rod stress" have constant-like values. Thus, when the ratio "torque/valve rod stress" between the torque and the valve rod stress is obtained, the friction coefficient $\mu$ of the valve element driving section can be obtained so that the appropriateness of the value can be diagnosed. In this case, diagnosis can be performed on the basis of quantitative comparison with a designed value or the like concerning the electrically operated valve. This permits quantitative and easy determination whether the situation of friction (situation of lubrication) of the valve element driving section is normal or abnormal.

In a detailed example, the value of "torque/valve rod stress" serves as the criterion at the time of determination of the situation of friction (situation of lubrication). Then, when the value of "torque/valve rod stress" exceeds the allowed upper limit, "abnormality in the situation of lubrication" is concluded. For example, when run out of oil occurs in the stem nut part, so that the frictional resistance becomes large, the valve rod stress becomes small even when the torque does not vary and is constant. Thus, the value of the above-mentioned "torque/valve rod stress" tends to exceed the upper limit. Thus, on the basis of this, abnormality of "run out of oil" can be concluded from the abnormality in the situation of friction (situation of lubrication).

Figure 39:
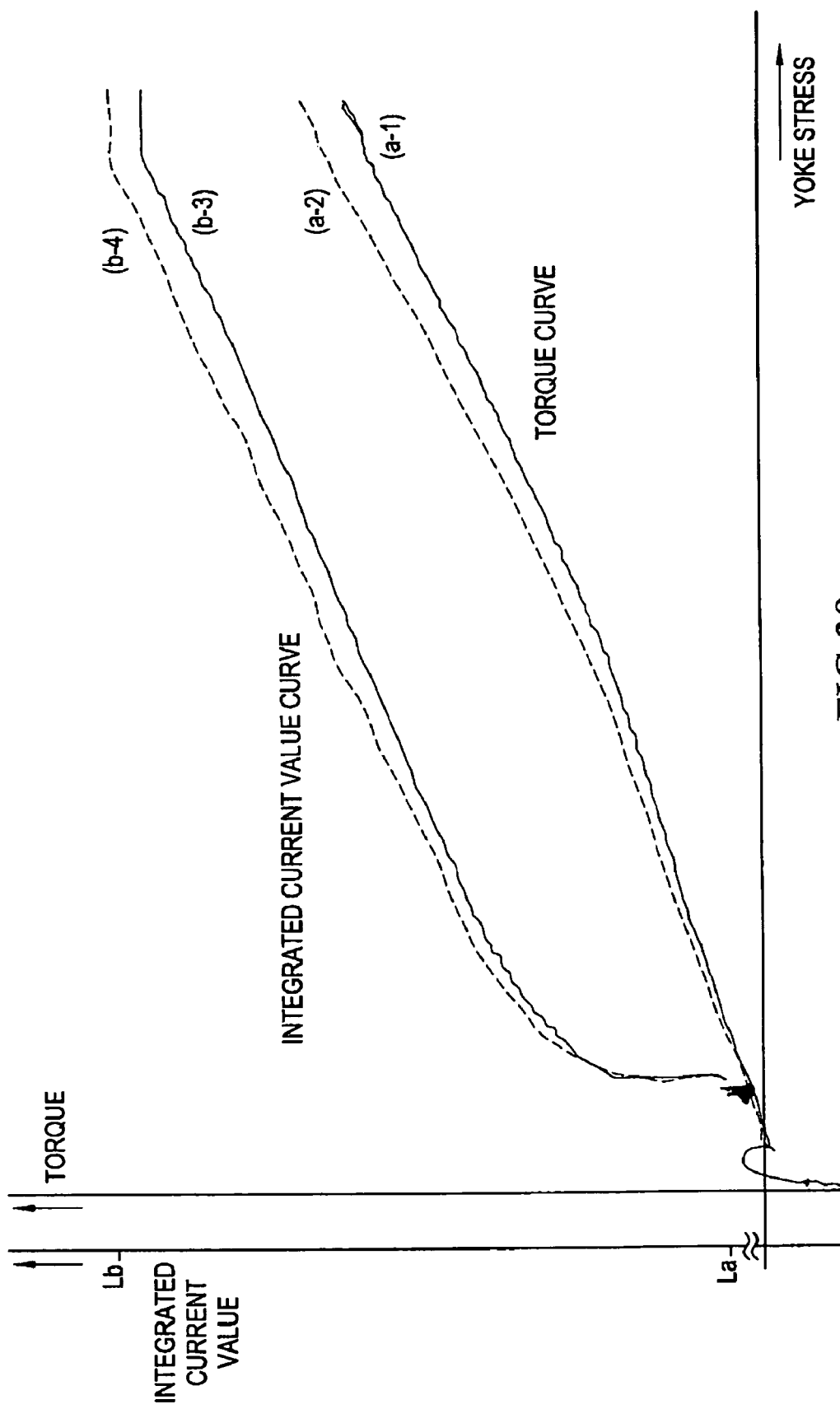
FIG. 39 is an enlarged view of the Y-axis of an integrated current value curve of FIG. 32.
Figure 40:
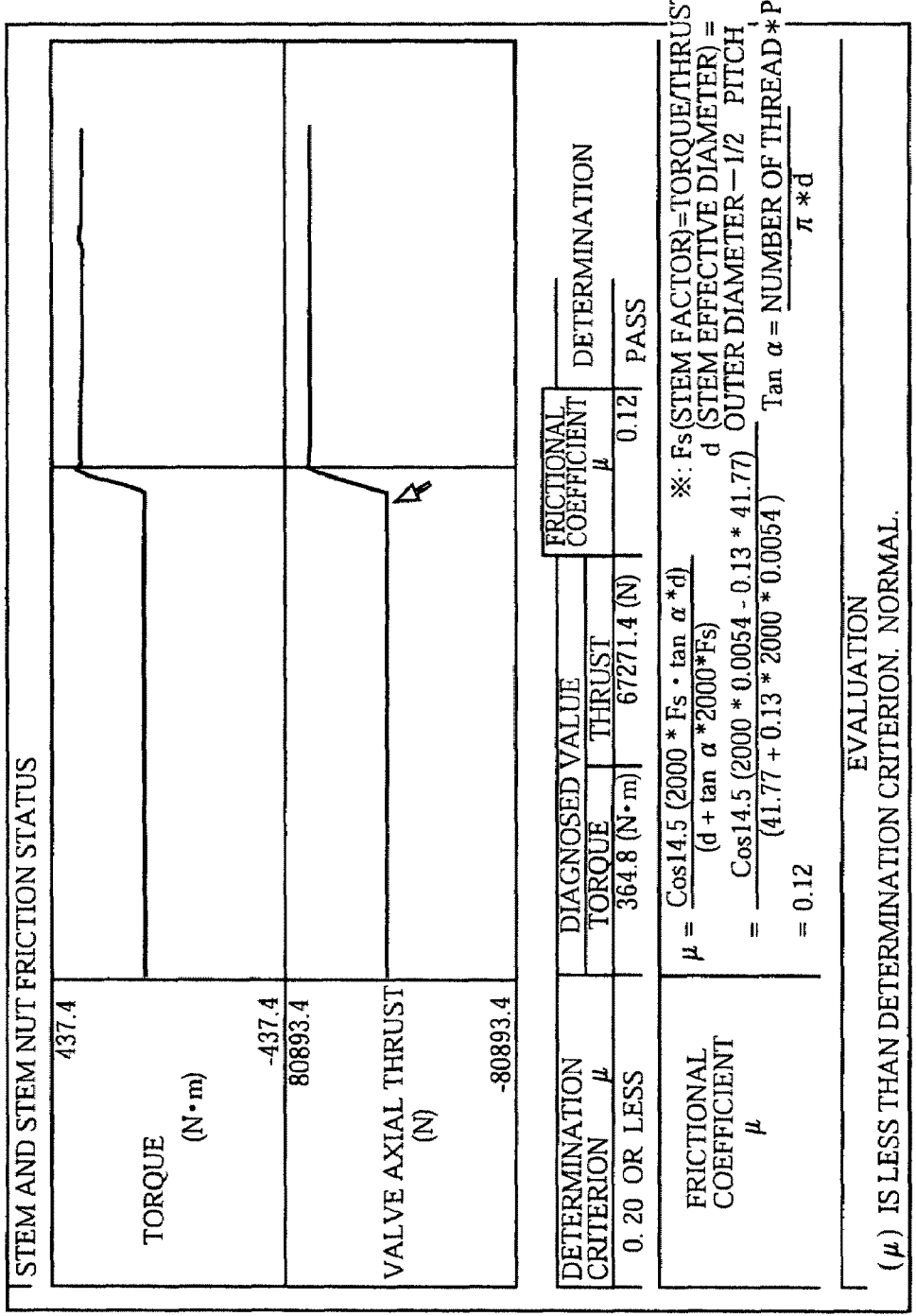
FIG. 40 shows diagnosis data for a situation of friction between a stem (valve rod) and a stem nut.

FIG. 39 shows data of a diagnostic result of appropriateness of the friction coefficient performed on the basis of the driving force (torque) and the valve rod stress (valve rod thrust). In this diagnosis example, the determination criterion for the appropriateness of the friction coefficient is "0.20 or less", while in the diagnosis, a friction coefficient of "0.12" has been obtained. Thus, the friction coefficient of the electrically operated valve is determined as being pass.

DESCRIPTION OF REFERENCE NUMERALS

1 . . . Valve rod
2 . . . Stem nut
3 . . . Drive sleeve
4 . . . Worm wheel
5 . . . Worm
6 . . . Motor shaft
7 . . . Extended cylinder section
8 . . . Circumferential groove
9 . . . Torque switch
10 . . . Bearing
11 . . . Nut
12 . . . Movable shaft
13 . . . Torque spring cartridge
14 . . . Washer
15 . . . Washer
16 . . . Nut
17 . . . Dish spring
18 . . . Torque limit sleeve
19 . . . Smaller diameter hole
20 . . . Larger diameter hole
21 . . . Shoulder part of larger diameter hole
22 . . . End face of casing
23 . . . Packing
24 . . . O-ring
25 . . . O-ring
26 Nut
27 . . . Slit
28 . . . Slit
30 . . . Sensor unit
31 . . . Adaptor
32 . . . Sensor holder
33 . . . Load cell
34 . . . sensor
35 . . . Strain gauge
36 . . . Core
37 . . . Strain gauge
38 . . . Adaptor
39 . . . Adaptor
40 . . . Sensor unit
41 . . . Lead wire
42 . . . Cartridge presser
43 . . . Core
44 . . . Signal line
45 . . . Cartridge presser
46 . . . Cap
47 . . . Sensor holder
48 . . . Connector
50 . . . Yoke
51 . . . Strain gauge
52 . . . Strain gauge
53 . . . Supporting rod
54 . . . Supporting rod
55 . . . Strain gauge
60 . . . Magnetic sensor 61 ... Conduit tube
62 ... Electric wire
65 ... Adaptor
66 ... Cylinder section
67 ... Boss
68 ... O-ring
69 ... Cap
70 ... Contact element
71 ... Abutting body
72 ... C-ring
73 ... Threaded hole
75 ... Stopper
76 ... Pin
80 ... Sensor holder
81 ... Extension rod
82 ... Measurement body
83 ... Spring
84 ... Laser sensor

The invention claimed is:

1. An electrically operated valve diagnosing method for diagnosing a driving force of an electrically operated valve provided with a valve element driving section for driving open and closed a valve element by using a revolving drive force of a worm to which a revolving drive force is imparted by an electromotive power, and with a spring cartridge expanded and contracted in response to a reaction force acting on an axial direction of said worm in the valve element driving section, said method comprising:

providing a first correlation database which records a correlation between a driving force output signal from said valve element driving section and a driving force obtained from a compression state of said spring cartridge for both of an open operation and closed operation of the electrically operated valve;

acquiring a correlation between a driving force input signal to said valve element driving section and said driving force output signal, and monitoring a state of change in a transmission efficiency of the driving force in said valve element driving section on the basis of the acquired correlation;

acquiring a value of the driving force output signal by measurement;

reading out, from said first correlation database, a value of said driving force corresponding to the value of the driving force output signal acquired by measurement; and diagnosing, on the basis of the read out value of the driving force, an appropriateness of the driving force of the electrically operated valve.

2. An electrically operated valve diagnosing method according to claim 1, wherein the monitored state of change is reflected in a calculation of the value of the driving force corresponding to said driving force output signal.

3. An electrically operated valve diagnosing method according to claim 1, wherein said driving force output signal is a yoke stress acting on a yoke.

4. An electrically operated valve diagnosing method according to claim 3, wherein a second correlation database is provided that shows a correlation between a valve rod stress acting on a valve rod and said yoke stress, wherein a value of the valve rod stress corresponding to a measured value of the yoke stress is read out from said second correlation database, and wherein on the basis of the value of said valve rod stress read out from said second correlation database and a value of said driving force input signal acquired by measurement, the state of change is monitored in a transmission efficiency of the driving force in said valve element driving section.

5. An electrically operated valve diagnosing method according to claim 1, 2, 3 or 4, wherein said driving force input signal is a current value signal corresponding to said driving force, a compression amount signal corresponding to a compression amount of said spring cartridge, or a compression force signal corresponding to a compression force of said spring cartridge.

6. An electrically operated valve diagnosing method according to claim 5, wherein said driving force input signal is a current value signal corresponding to the driving force, while the current value signal is acquired on the basis of signal information outputted from a plurality of magnetic sensors attached to an outer surface of a conduit tube accommodating an electric wire.

7. An electrically operated valve diagnosing method according to claim 5, wherein said driving force input signal is a compression amount signal corresponding to a compression amount of said spring cartridge, while the compression amount signal is acquired on the basis of displacement information concerning an axial direction of a contact element that is provided in an adaptor fixed on an outer surface side of the electrically operated valve and that can be in contact or non-contact with an axis end side of said spring cartridge so as to displace and follow compression displacement of said spring cartridge in a contacting state.

8. An electrically operated valve diagnosing method according to claim 3 or 4, further comprising:

recording a compression force and a compression amount of said spring cartridge which are acquired by measurement; and for both of the open operation and closed operation of the electrically operated valve, acquiring and recording a value of said yoke stress and an accurate compression amount where an amount of backlash in expansion and contraction directions of said spring cartridge is removed by arithmetic operation, wherein the correlation recorded in said first correlation database is a correlation between said driving force and said yoke stress at both of said open operation and said closed operation, which is obtained from the recorded compression amount, the recorded compression force, and the acquired value of the yoke stress, and wherein with reference to said first correlation database, a driving force corresponding to a measured value of the yoke stress is read out.

9. An electrically operated valve diagnosing apparatus for diagnosing a driving force of an electrically operated valve provided with a valve element driving section for driving open and closed a valve element by using a revolving drive force of a worm to which a revolving drive force is imparted by an electromotive power, and with a spring cartridge expanded and contracted in response to a reaction force acting on an axial direction of said worm in the valve element driving section, said apparatus comprising:

a first correlation database that records a correlation between a driving force output signal from said valve element driving section and a driving force obtained from a compression state of said spring cartridge at both of open operation and close operation of the electrically operated valve;

a monitoring device for acquiring a correlation between a driving force input signal to said valve element driving section and said driving force output signal and, on the basis of the acquired correlation, monitoring a state of change in a transmission efficiency of the driving force in said valve element driving section; and a diagnosing device for receiving a value of the driving force output signal acquired from the valve element driving section by measurement, reading out from said first correlation database a value of said driving force corresponding to the value of the driving force output signal acquired by measurement, and, on the basis of the read out value of the driving force, diagnosing an appropriateness of the driving force of the electrically operated valve.

10. An electrically operated valve diagnosing apparatus according to claim 9, wherein
the monitored state of change in the transmission efficiency of the driving force is reflected in a calculation of the value of the driving force corresponding to said driving force output signal.

11. An electrically operated valve diagnosing apparatus according to claim 9, wherein
said driving force output signal is a yoke stress acting on a yoke.

12. An electrically operated valve diagnosing apparatus according to claim 11, comprising:
a second correlation database that shows correlation among a valve rod stress acting on a valve rod and said yoke stress, and said valve rod stress, wherein
the monitoring device monitors the state of change in a transmission efficiency of the driving force in said valve element driving section on the basis of a value said valve rod stress in correspondence to the yoke stress acquired by measurement, which is read out from said second correlation database, and a value of said driving force input signal acquired by measurement.

13. An electrically operated valve diagnosing apparatus according to claim 9, 10, 11 or 12, wherein
said driving force input signal is a current value signal corresponding to the driving force, a compression amount signal corresponding to the compression amount of said spring cartridge, or a compression force signal corresponding to the compression force of said spring cartridge.

14. An electrically operated valve diagnosing apparatus according to claim 13, comprising
a driving force input signal acquiring device for acquiring said current value signal serving as said driving force input signal, on the basis of signal information outputted from a plurality of magnetic sensors attached to an outer surface of a conduit tube accommodating an electric wire.

15. An electrically operated valve diagnosing apparatus according to claim 13, wherein
said compression amount signal serving is acquired as said driving force input signal on the basis of displacement information concerning an axial direction of a contact element that is provided in an adaptor fixed on an outer surface side of the electrically operated valve and that can be in contact or non-contact with an axis end side of said spring cartridge so as to displace and follow compression displacement of said spring cartridge in a contacting state.

16. An electrically operated valve diagnosing apparatus according to claim 11 or 12, comprising:
first acquiring means for acquiring, for both of the open operation and closed operation of the electrically operated valve, respective values of said yoke stress and a compression amount, an amount of backlash in expansion and contraction directions of said spring cartridge being removed from the compression amount by arithmetic operation, the respective values of the yoke stress and the accurate compression amount being recorded; and second acquiring means for acquiring by measurement and recording a compression force and a compression amount of said spring cartridge, wherein
the first correlation database records a correlation between said driving force and said yoke stress for both of said open operation and said closed operation, which is obtained from the recorded compression amount, the recorded compression force, and the recorded yoke stress; and
a driving force reading device for reading out from said first correlation database a driving force corresponding to the value of the yoke stress acquired by measurement.

* * * * *